(12) United States Patent
Hilligoss et al.

(10) Patent No.: US 10,797,285 B2
(45) Date of Patent: Oct. 6, 2020

(54) BATTERY PACK INCLUDING PLURAL ELECTROCHEMICAL CELLS ENCAPSULATED BY ENCAPSULANT AND METHOD OF MANUFACTURE

(71) Applicant: Cummins Battery Systems North America LLC, Columbus, IN (US)

(72) Inventors: Lawrence O. Hilligoss, Ashland, OR (US); Paul A. Daniel, Ashland, OR (US); Adrian G. Lamy, Hillsborough, CA (US)

(73) Assignee: Cummins Battery Systems North America LLC, Columbus, IN (US)

( * ) Notice: Subject to any disclaimer, the term of this patent is extended or adjusted under 35 U.S.C. 154(b) by 0 days.

(21) Appl. No.: 15/525,346

(22) PCT Filed: Mar. 23, 2017

(86) PCT No.: PCT/US2017/023776
§ 371 (c)(1),
(2) Date: May 9, 2017

(87) PCT Pub. No.: WO2017/176462
PCT Pub. Date: Oct. 12, 2017

(65) Prior Publication Data
US 2018/0205055 A1    Jul. 19, 2018

Related U.S. Application Data

(60) Provisional application No. 62/412,425, filed on Oct. 25, 2016, provisional application No. 62/317,604, filed on Apr. 3, 2016.

(51) Int. Cl.
*H01M 2/10* (2006.01)
*H01M 10/48* (2006.01)
(Continued)

(52) U.S. Cl.
CPC ....... *H01M 2/1094* (2013.01); *H01M 2/1061* (2013.01); *H01M 2/1077* (2013.01);
(Continued)

(58) Field of Classification Search
CPC ............. H01M 2/1094; H01M 2/1061; H01M 2/1077; H01M 10/425; H01M 10/441;
(Continued)

(56) References Cited

U.S. PATENT DOCUMENTS 6,074,774 A * 6/2000 Semmens ............. H01M 10/02
429/120
8,859,119 B2 10/2014 Robertson
(Continued)

FOREIGN PATENT DOCUMENTS

KR       20110000003 A *  1/2011
WO    WO-2016137303 A1 *  9/2016 .......... H01M 10/653
WO    WO 2016/185961 A1   11/2016

OTHER PUBLICATIONS

International Search Report and Written Opinion for International Application No. PCT/US2017/023776, dated Aug. 2, 2017.

*Primary Examiner* — Sean P Cullen
(74) *Attorney, Agent, or Firm* — Faegre Drinker Biddle & Reath LLP

(57) ABSTRACT

Embodiments of encapsulated battery packs, control circuitry, and their methods of manufacture are described. In one such embodiment, a battery pack includes a plurality of electrochemical pouch cells and an elastomeric encapsulant that forms at least one external surface of the battery pack. In another embodiment, a battery pack includes a plurality of electrochemical pouch cells with a portion of an encapsulant disposed between the electrochemical pouch cells and the outer housing. In yet another embodiment, a method of controlling an operation of a system includes using a current threshold of one or more electrochemical cells determined at (Continued)

least in part on at least one of a temperature and a state of charge of the one or more electrochemical cells.

7 Claims, 37 Drawing Sheets

(51) Int. Cl.
*H01M 10/44* (2006.01)
*H01M 10/42* (2006.01)
*H01M 10/6555* (2014.01)
*H01M 10/615* (2014.01)
*H01M 2/20* (2006.01)

(52) U.S. Cl.
CPC ....... *H01M 10/425* (2013.01); *H01M 10/441* (2013.01); *H01M 10/443* (2013.01); *H01M 10/48* (2013.01); *H01M 10/482* (2013.01); *H01M 10/486* (2013.01); *H01M 2/202* (2013.01); *H01M 10/615* (2015.04); *H01M 10/6555* (2015.04); *H01M 2220/20* (2013.01)

(58) Field of Classification Search
CPC .. H01M 10/443; H01M 10/48; H01M 10/482; H01M 10/486
USPC ........................................ 429/149, 156, 159
See application file for complete search history.

(56) References Cited

U.S. PATENT DOCUMENTS

| | | | |
|---|---|---|---|
| 8,974,928 | B2 | 3/2015 | Robertson |
| 8,974,929 | B2 | 3/2015 | Robertson et al. |
| 9,178,192 | B2 | 11/2015 | Payne |
| 9,196,882 | B2 | 11/2015 | Seong et al. |
| 2003/0170535 | A1* | 9/2003 | Watanabe ........... H01M 2/0207 429/158 |
| 2006/0257723 | A1 | 11/2006 | Tan et al. |
| 2007/0259258 | A1* | 11/2007 | Buck .................... B29C 44/1233 429/120 |
| 2010/0136413 | A1* | 6/2010 | Hermann ............ H01M 2/1077 429/149 |
| 2011/0175571 | A1 | 7/2011 | Renken et al. |
| 2011/0177377 | A1 | 7/2011 | Dube |
| 2012/0183826 | A1 | 7/2012 | Hermann et al. |
| 2013/0189563 | A1 | 7/2013 | Chang et al. |
| 2014/0023894 | A1 | 1/2014 | Jansen et al. |
| 2015/0008887 | A1 | 1/2015 | Kim et al. |
| 2015/0017502 | A1* | 1/2015 | Brenner ................. F16B 3/005 429/99 |
| 2015/0236313 | A1 | 8/2015 | Stuetz et al. |
| 2015/0325892 | A1 | 11/2015 | Yue et al. |
| 2016/0056425 | A1 | 2/2016 | Kim et al. |
| 2016/0056427 | A1 | 2/2016 | Kim et al. |
| 2016/0072116 | A1 | 3/2016 | Yanagihara et al. |
| 2016/0172636 | A1 | 6/2016 | Okahata |
| 2018/0076493 | A1* | 3/2018 | Park .................... H01M 2/1077 |

* cited by examiner

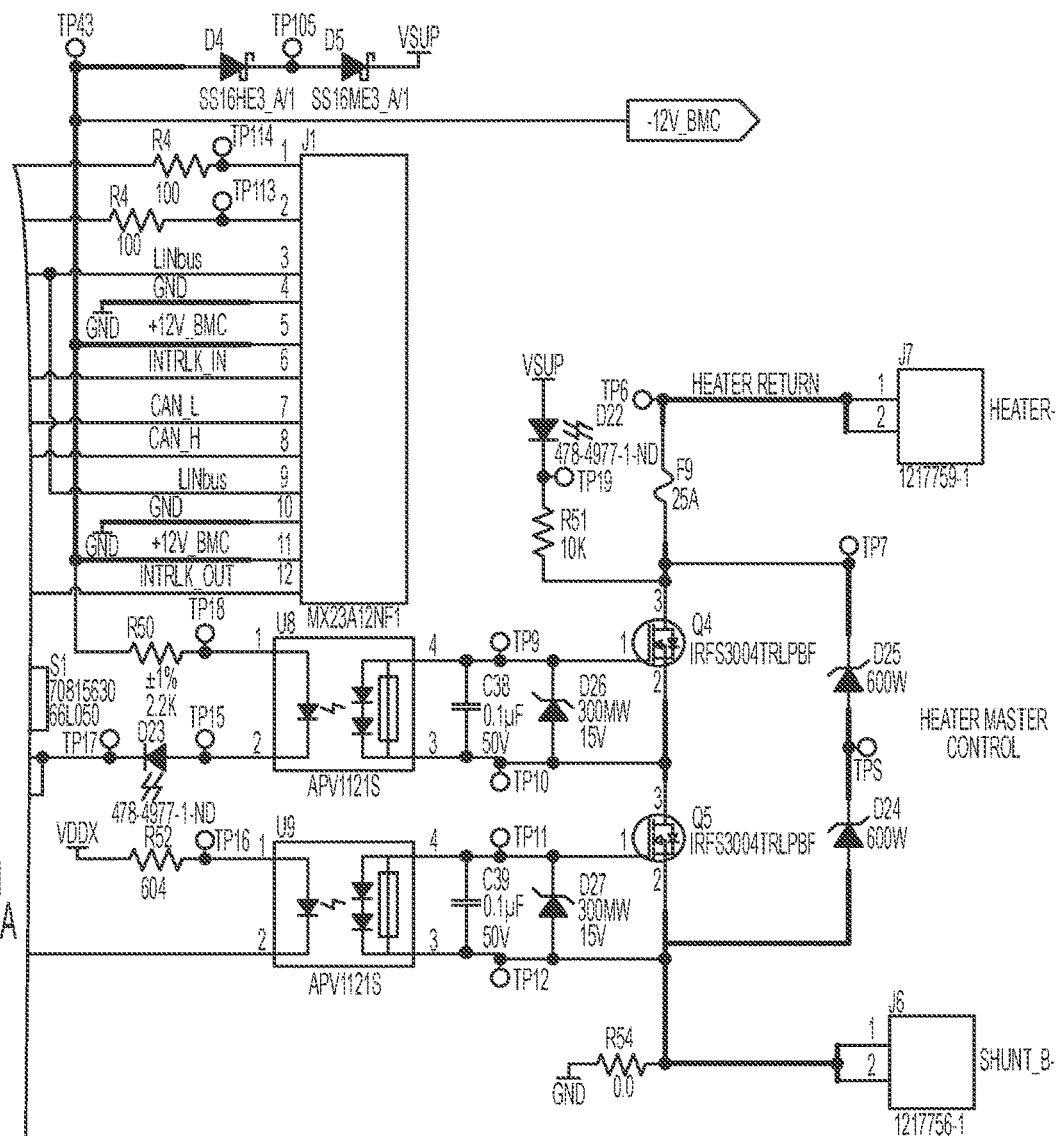
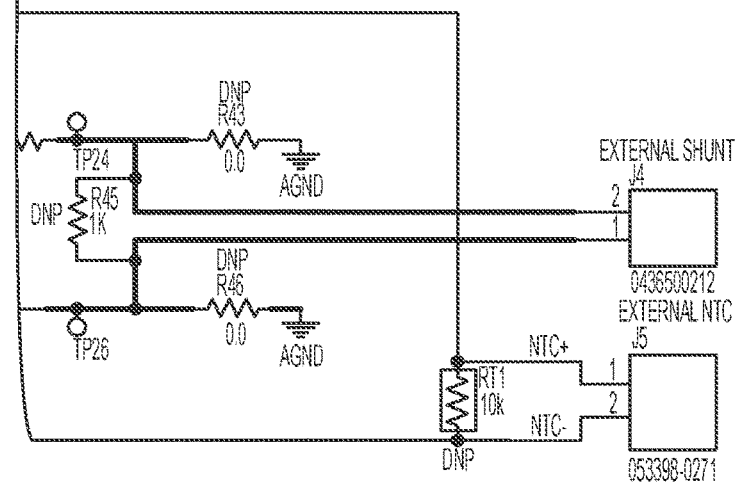
FIG. 31B

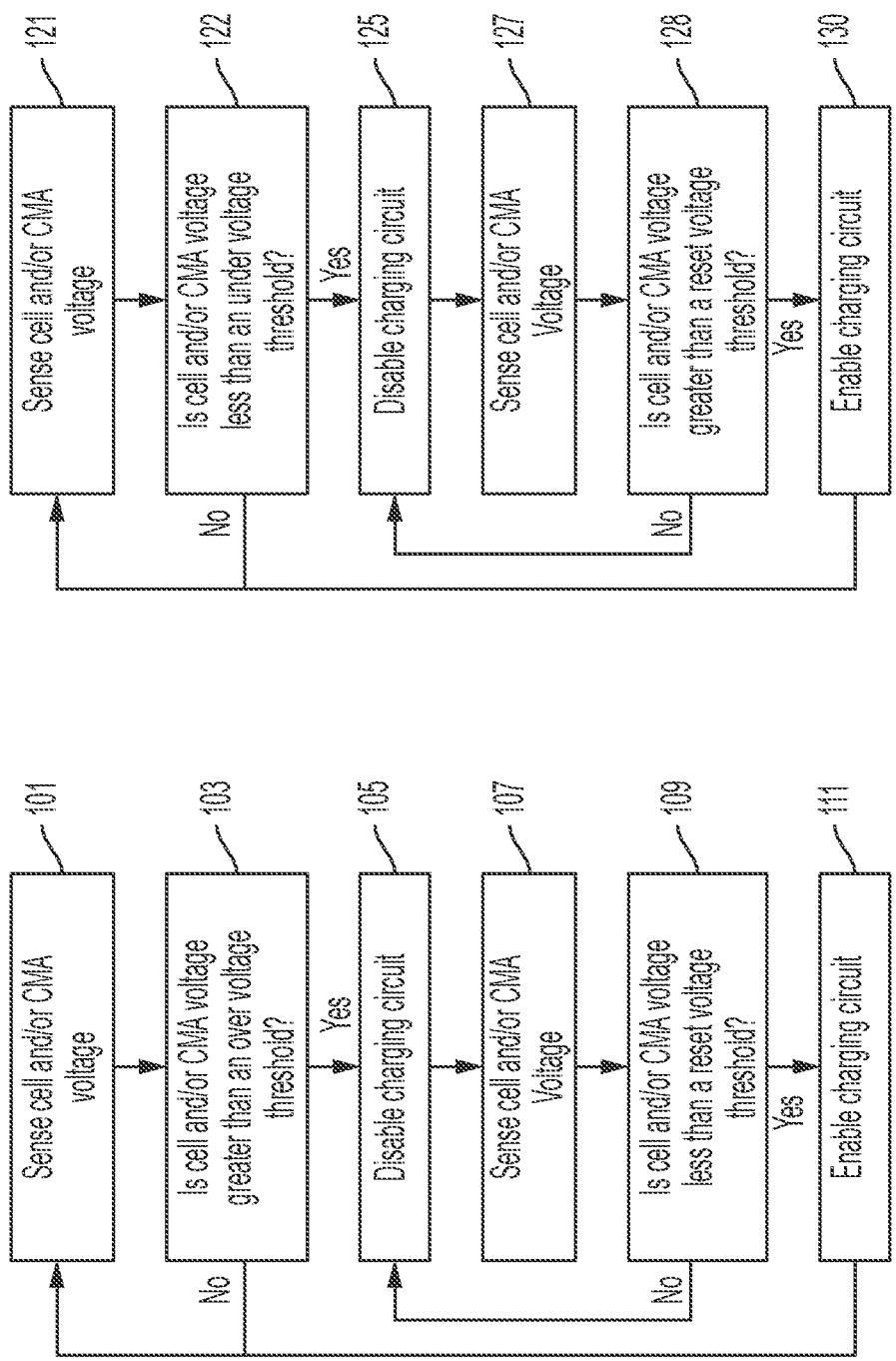

| Discharge Current [A] | | | | | | | | | | | | | | | | | | | |
|---|---|---|---|---|---|---|---|---|---|---|---|---|---|---|---|---|---|---|---|
| | | Temperature [C] | | | | | | | | | | | | | | | | | |
| | | -30 | -20 | -10 | -5 | 0 | 5 | 10 | 15 | 20 | 25 | 30 | 35 | 40 | 45 | 50 | 55 | 60 |
| SOC [%] | 0 | 0 | 0 | 0 | 0 | 0 | 0 | 0 | 0 | 0 | 0 | 0 | 0 | 0 | 0 | 0 | 0 | 0 |
| | 10 | 81 | 210 | 324 | 375 | 375 | 375 | 375 | 375 | 375 | 375 | 375 | 375 | 375 | 375 | 100 | 0 | 0 |
| | 20 | 0 | 210 | 324 | 375 | 375 | 375 | 375 | 375 | 375 | 375 | 375 | 375 | 375 | 375 | 200 | 0 | 0 |
| | 30 | 0 | 0 | 324 | 375 | 375 | 375 | 375 | 375 | 375 | 375 | 375 | 375 | 375 | 375 | 200 | 0 | 0 |
| | 40 | 0 | 0 | 375 | 375 | 375 | 375 | 375 | 375 | 375 | 375 | 375 | 375 | 375 | 375 | 200 | 0 | 0 |
| | 50 | 0 | 0 | 0 | 375 | 375 | 375 | 375 | 375 | 375 | 375 | 375 | 375 | 375 | 375 | 200 | 0 | 0 |
| | 60 | 0 | 0 | 0 | 0 | 0 | 375 | 375 | 375 | 375 | 375 | 375 | 375 | 375 | 375 | 200 | 0 | 0 |
| | 70 | 0 | 0 | 0 | 0 | 0 | 0 | 375 | 375 | 375 | 375 | 375 | 375 | 375 | 375 | 200 | 0 | 0 |
| | 80 | 0 | 0 | 0 | 0 | 0 | 0 | 375 | 375 | 375 | 375 | 375 | 375 | 375 | 375 | 200 | 0 | 0 |
| | 90 | 0 | 0 | 0 | 0 | 0 | 0 | 375 | 375 | 375 | 375 | 375 | 375 | 375 | 375 | 200 | 0 | 0 |
| | 95 | 0 | 0 | 0 | 0 | 0 | 0 | 375 | 375 | 375 | 375 | 375 | 375 | 375 | 375 | 200 | 0 | 0 |
| | 100 | 0 | 0 | 0 | 0 | 0 | 0 | 375 | 375 | 375 | 375 | 375 | 375 | 375 | 375 | 200 | 0 | 0 |

FIG. 45

| | Regen Current [A] | | | | | | | | | | | | | | | | |
|---|---|---|---|---|---|---|---|---|---|---|---|---|---|---|---|---|---|
| | Temperature [C] | | | | | | | | | | | | | | | | |
| SOC [%] | -30 | -20 | -10 | -5 | 0 | 5 | 10 | 15 | 20 | 25 | 30 | 35 | 40 | 45 | 50 | 55 | 60 |
| 0 | 200 | 200 | 200 | 200 | 200 | 200 | 300 | 375 | 375 | 375 | 375 | 375 | 375 | 375 | 0 | 0 | 0 |
| 10 | 200 | 200 | 200 | 200 | 200 | 200 | 300 | 375 | 375 | 375 | 375 | 375 | 375 | 375 | 0 | 0 | 0 |
| 20 | 0 | 200 | 200 | 200 | 200 | 200 | 300 | 375 | 375 | 375 | 375 | 375 | 375 | 375 | 0 | 0 | 0 |
| 30 | 0 | 0 | 200 | 200 | 200 | 200 | 300 | 375 | 375 | 375 | 375 | 375 | 375 | 375 | 0 | 0 | 0 |
| 40 | 0 | 0 | 200 | 200 | 200 | 200 | 300 | 375 | 375 | 375 | 375 | 375 | 375 | 375 | 0 | 0 | 0 |
| 50 | 0 | 0 | 200 | 200 | 200 | 200 | 300 | 375 | 375 | 375 | 375 | 375 | 375 | 375 | 0 | 0 | 0 |
| 60 | 0 | 0 | 0 | 0 | 0 | 200 | 241 | 300 | 375 | 375 | 375 | 375 | 375 | 375 | 0 | 0 | 0 |
| 70 | 0 | 0 | 0 | 0 | 0 | 0 | 241 | 290 | 337 | 375 | 375 | 375 | 375 | 375 | 0 | 0 | 0 |
| 80 | 0 | 0 | 0 | 0 | 0 | 0 | 241 | 290 | 337 | 375 | 375 | 375 | 375 | 375 | 0 | 0 | 0 |
| 90 | 0 | 0 | 0 | 0 | 0 | 0 | 241 | 290 | 337 | 375 | 375 | 375 | 375 | 375 | 0 | 0 | 0 |
| 95 | 0 | 0 | 0 | 0 | 0 | 0 | 181 | 217 | 253 | 281 | 281 | 281 | 281 | 281 | 0 | 0 | 0 |
| 100 | 0 | 0 | 0 | 0 | 0 | 0 | 121 | 145 | 169 | 188 | 188 | 188 | 188 | 188 | 0 | 0 | 0 |

FIG. 46

| Charge Current [A] | | | | | | | | | | | | | | | | | | | |
|---|---|---|---|---|---|---|---|---|---|---|---|---|---|---|---|---|---|---|---|
| | | Temperature [C] | | | | | | | | | | | | | | | | | |
| | | -30 | -20 | -10 | -5 | 0 | 5 | 10 | 15 | 20 | 25 | 30 | 35 | 40 | 45 | 50 | 55 | 60 |
| SOC [%] | 0 | 15 | 7 | 19 | 28 | 38 | 58 | 78 | 78 | 78 | 78 | 150 | 150 | 78 | 28 | 0 | 0 | 0 |
| | 10 | 15 | 7 | 19 | 28 | 38 | 58 | 78 | 78 | 78 | 78 | 150 | 150 | 78 | 28 | 0 | 0 | 0 |
| | 20 | 15 | 7 | 19 | 28 | 38 | 58 | 78 | 78 | 78 | 78 | 150 | 150 | 78 | 28 | 0 | 0 | 0 |
| | 30 | 15 | 7 | 19 | 28 | 38 | 58 | 78 | 78 | 78 | 78 | 150 | 150 | 78 | 28 | 0 | 0 | 0 |
| | 40 | 15 | 7 | 19 | 28 | 38 | 58 | 78 | 78 | 78 | 78 | 150 | 150 | 78 | 28 | 0 | 0 | 0 |
| | 50 | 15 | 7 | 19 | 28 | 38 | 58 | 78 | 78 | 78 | 78 | 150 | 150 | 78 | 28 | 0 | 0 | 0 |
| | 60 | 15 | 7 | 19 | 28 | 38 | 58 | 78 | 78 | 78 | 78 | 150 | 150 | 78 | 28 | 0 | 0 | 0 |
| | 70 | 15 | 7 | 19 | 28 | 38 | 50 | 78 | 78 | 78 | 78 | 78 | 78 | 78 | 28 | 0 | 0 | 0 |
| | 80 | 15 | 7 | 7 | 19 | 28 | 25 | 50 | 25 | 25 | 25 | 25 | 25 | 25 | 25 | 0 | 0 | 0 |
| | 90 | 15 | 7 | 7 | 19 | 25 | 25 | 25 | 10 | 10 | 10 | 10 | 10 | 10 | 10 | 0 | 0 | 0 |
| | 95 | 15 | 7 | 7 | 10 | 10 | 10 | 10 | 0 | 0 | 0 | 0 | 0 | 0 | 0 | 0 | 0 | 0 |
| | 100 | 0 | 0 | 0 | 0 | 0 | 0 | 0 | 0 | 0 | 0 | 0 | 0 | 0 | 0 | 0 | 0 | 0 |

FIG. 47

BATTERY PACK INCLUDING PLURAL ELECTROCHEMICAL CELLS ENCAPSULATED BY ENCAPSULANT AND METHOD OF MANUFACTURE

CROSS-REFERENCE TO RELATED APPLICATIONS

This application is a national stage filing under U.S.C. § 371 of PCT International Application PCT/US2017/023776, filed Mar. 23, 2017, which claims the benefit of priority under 35 U.S.C. § 119(e) of U.S. provisional application Ser. No. 62/317,604, filed Apr. 3, 2016, and U.S. provisional application Ser. No. 62/412,425, filed Oct. 25, 2016, the disclosures of each of which are incorporated by reference herein in their entirety.

FIELD

Disclosed embodiments relate generally to battery packs and methods of manufacture of battery packs.

BACKGROUND

In general, battery packs or modules are comprised of multiple individual batteries, also referred to as cells, contained within a housing. For example, battery packs are typically constructed using parallel and/or series combinations of individual battery cells to form a Cell Module Assembly (CMA). A battery pack may also include various types of electrical connections between the CMA and an electrical system or other associated battery packs. For example, in many applications, a Battery Monitoring Unit (BMU) may be used to manage State of Charge (SOC) and State of Health (SOH) during the charge and discharge of a CMA, as well as monitor and manage the CMA's individual parallel cell voltages, series current, and temperature. In most architectures, the BMU may serially communicate these managed CMA conditions to, and receive control from, a system's Battery Management Controller (BMC) using any appropriate method for placing these components in electrical communication with one another including, for example, a local and/or area network communication link.

SUMMARY

In one embodiment, a battery pack includes a plurality of electrochemical pouch cells and an elastomeric encapsulant encapsulating at least a portion of the electrochemical pouch cells. The elastomeric encapsulant forms at least one external surface of the battery pack.

In another embodiment, a battery pack includes a plurality of electrochemical pouch cells and a first encapsulant encapsulating at least a portion of the electrochemical pouch cells. The battery pack also includes a housing at least partially embedded in the first encapsulant. The housing includes an interior space isolated from the first encapsulant.

In yet another embodiment, a battery pack includes a plurality of electrochemical cells and an encapsulant flow path extending from a first portion of the battery pack to a second portion of the battery pack.

In another embodiment, a method of encapsulating a battery pack includes: flowing encapsulant from a first portion of the battery pack to a second portion of the battery pack; and flowing the encapsulant from the second portion of the battery pack towards the first portion of the battery pack, wherein the encapsulant encapsulates a plurality of electrochemical cells as the encapsulant flows towards the first portion of the battery pack.

In still another embodiment, a battery pack includes a plurality of electrochemical pouch cells and an outer housing surrounding at least a portion of the plurality of electrochemical pouch cells. An elastomeric encapsulant encapsulates at least a portion of the electrochemical pouch cells, and at least a portion of the encapsulant is disposed between the electrochemical pouch cells and the outer housing.

In yet another embodiment, a battery pack includes a plurality of electrochemical pouch cells arranged in a plurality of cell blocks. The cell blocks are stacked in one or more complete rows and one or more incomplete rows. An intermediate plate is disposed between the one or more complete rows and the one or more incomplete rows of cell blocks.

In still another embodiment, a battery pack includes a plurality of electrochemical pouch cells arranged in a plurality of cell blocks with the cell blocks stacked in at least two rows. A housing at least partially surrounds the plurality of electrochemical pouch cells and an intermediate plate is connected to and extends between at least two opposing sides of the housing. Additionally, the intermediate plate is disposed between the at least two rows.

In another embodiment, a battery pack includes a plurality of electrochemical cells and a battery monitoring unit (BMU) in electrically communication with the electrochemical cells. The BMU includes a processor and a flash memory. In this embodiment, the flash memory is configured to load updates into the flash memory prior to reflashing the microprocessor.

In yet another embodiment, a battery pack includes a plurality of electrochemical cells and one or more heaters associated with the plurality of electrochemical cells. The battery pack also includes a processor and a thermostat associated with the plurality of electrochemical cells. The thermostat is configured to open above a threshold temperature. The battery pack also includes first and second MOSFETs arranged in series and in electrical communication with the one or more heaters. The processor is configured to selectively open and close the first MOSFET. The thermostat is configured to close the second MOSFET when the plurality of electrochemical cells are below the threshold temperature, and open the second MOSFET when the plurality of electrochemical cells are above the threshold temperature.

In another embodiment, a battery system includes a battery system controller and at least one battery pack. In this embodiment, the at least one battery pack includes one or more electrochemical cells, one or more voltage sensors associated with the one or more electrochemical cells, and at least one battery monitoring unit (BMU). The BMU includes a system interface configured to communicate with the battery system controller and an interlock MOSFET in electrical communication with the system interface. The battery system controller is configured so that if the one or more voltage sensors sense an overvoltage condition in the one or more electrochemical cells, the MOSFET changes state causing the system interface to prevent further charging of the at least one battery pack.

In yet another embodiment, a method of controlling a system including one or more electrochemical cells includes: determining a current threshold of the one or more electrochemical cells based at least in part on at least one of a temperature and a state of charge of the one or more electrochemical cells; and controlling an operation of the system using the current threshold.

In still another embodiment, a system includes one or more electrochemical cells, at least one controller associated with the one or more electrochemical cells, and one or more sensors constructed and arranged to detect one or more operating conditions of the one or more electrochemical cells. The sensors may output a signal to the at least one controller. The at least one controller may determine a current threshold of the one or more electrochemical cells based at least in part on at least one of a temperature and a state of charge of the one or more electrochemical cells. Additionally, the at least one controller may control an operation of the system using the current threshold.

It should be appreciated that in various embodiments the foregoing concepts, and additional concepts discussed below, may be arranged in any suitable combination. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIGS. 31A-31D are a schematic of a BMU Controller including Cell Voltage, Current, and Temperature measurement circuits;

FIG. 37 is a flow diagram of one embodiment of a method for providing over voltage protection for a battery;

FIG. 38 is a flow diagram of one embodiment of a method for providing under voltage protection for a battery;

FIG. 45 is a table of exemplary discharge current thresholds versus temperature and state of charge;

FIG. 46 is a table of exemplary regenerative charging current thresholds versus temperature and state of charge; and FIG. 47 is a table of exemplary continuous charging current thresholds versus temperature and state of charge.

DETAILED DESCRIPTION

Figure 1:
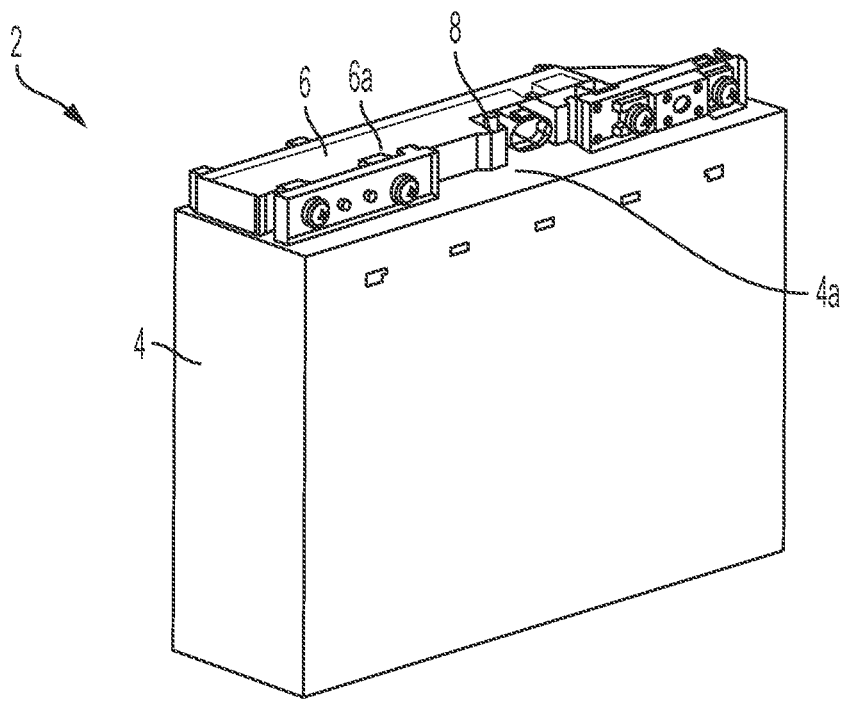
FIG. 1 is a schematic view of a battery pack.

The inventors have recognized that typical battery packs include expensive complicated external enclosures that are susceptible to water intrusion, damage from shock and vibration, as well as poor performance at low temperatures. Therefore, the inventors have developed innovative solutions to provide a low cost ruggedized battery pack that is easily manufactured while providing improved shock, vibration, and/or low temperature performance as well as accommodation of cell swelling in certain embodiments.

In view of the above, the inventors have developed encapsulation techniques and at least partially encapsulated battery pack configurations that, as described below, result in certain cases in certain benefits and solutions to one or more of the above noted problems/shortcomings with conventional designs and methods. For example, in some embodiments, a battery pack including encapsulated electrochemical cells may not include any additional external enclosure. In such an embodiment, the encapsulant would form at least a portion of the exterior surface of the battery pack. Further, embodiments in which the encapsulant fully encapsulates the electrochemical cells with the electrode leads of the cells extending through the encapsulant are also described. However, embodiments in which the electrochemical cells are at least partially encapsulated and are located within a rigid outer housing are also detailed herein. In addition to other benefits, these various designs including at least partially, and/or fully encapsulated, electrochemical cells may result in batteries that exhibit improved shock and vibration performance as compared to batteries that do not include encapsulated electrochemical cells.

The above noted embodiments that do not include a rigid outer housing may be of benefit in some applications where electrochemical pouch cells are used. Specifically, flexible electrochemical pouch cells typically experience swelling during use due to changes in the state of charge of the cells, temperature changes, as well as swelling due to aging of the cells. Consequently, in such an embodiment, the encapsulant may be flexible enough to accommodate the expected swelling of the electrochemical pouch cells while maintaining a pressure applied to an exterior of the electrochemical pouch cells within a predetermined operating pressure range. Therefore, the battery pack may include environmental protection while still permitting the electrochemical pouch cells to expand and/or contract. This accommodation of swelling while maintaining the desired compression pressure applied to the cells may help extend the battery life of the cells.

The amount of swelling a particular electrochemical pouch cell will undergo during operation depends on the type of chemistry, the operating voltage ranges, the age, and other appropriate parameters used during operation of the cell. However, in certain embodiments, the amount of swelling an electrochemical pouch cell undergoes during cycling, and that the encapsulant flexes to accommodate, is greater than or equal to 2%, 3%, 5%, 10%, or any other appropriate percentage. Additionally, the amount of swelling may be less than or equal to about 15%, 10%, 5%, or any other appropriate percentage. Combinations of the above ranges can also be used in certain embodiments, including, for example, an encapsulant flexing to accommodate volumetric swelling of one or more electrochemical pouch cells between 2% and 15% while maintaining a compression pressure of the electrodes within a desired pressure range. In certain embodiments, different combinations of the above ranges as well as amounts of swelling both less than, and greater than, those noted above are employed.

The inventors have recognized that it may be desirable in certain embodiments to encapsulate a battery monitoring unit (BMU), or other component, in a subsequent encapsulation process after the electrochemical cells have been encapsulated. This may permit cell module assemblies (CMA's) that are defective to be identified prior to installing associated electronics thus reducing the overall manufacturing costs of the battery packs. In such embodiments, a plurality of electrochemical cells may be encapsulated using a first encapsulant during a first process. The battery pack may include a housing that is at least partially embedded in this first encapsulant and include a housing interior that is isolated from (i.e. free of contact with) the encapsulant outside of the housing. After determining the electrochemical cell assembly is not defective (e.g. excessively imbalanced cells, swollen cells, excessive self-discharge rates, etc.), a BMU, or other type of circuitry or component, is assembled into the housing interior. Depending on the particular embodiment, the housing interior, and associated component disposed therein, may then be encapsulated during a second encapsulation process using a second encapsulant. In some instances, the first and second encapsulant are the same type of encapsulant. In certain embodiments, however, a different type of encapsulant is used. In other embodiments, a BMU, or other type of circuitry, can be overmolded and subsequently assembled into the housing interior.

While the embodiments above describe battery packs where the encapsulant forms an external surface of a battery pack, it should be understood that in other embodiments, a separate exterior enclosure, such as the outer housings described further below, may form the exterior of a battery pack with the encapsulant and the CMA disposed within the separate exterior enclosure. Additionally, in certain embodiments, the battery packs described herein may be used individually, assembled with one another in series and/or parallel, and/or may be assembled into a separate larger exterior housing.

In some embodiments, a battery pack fixture is used to hold electrochemical cells, the associated busbars, and/or other electrical interconnects during a welding process. The same battery pack fixture may then be used as a mold for encapsulating the entire pack in in an encapsulant during an encapsulating process. Of course it should be understood that such a battery pack fixture may be combined/used with any of the battery packs, methods, molds, and/or fixtures described further below.

In certain embodiments, it may be desirable to apply a compressive force to a cell module assembly during an encapsulation process to ensure that the appropriate compressive pressure is applied to the electrical cells. In such embodiments, an encapsulation mold may hold the various portions of an electrochemical cell module assembly in a desired position and orientation while applying a pressure to hold the stack of components together using one or more pressing surfaces during the encapsulating process. Consequently, after the encapsulant is introduced into the mold and cured, the encapsulant maintains the electrochemical cells under a state of compression which applies the desired compressive pressure to the electrochemical cells' electroactive surfaces even after removal from the mold. This may help to extend the life of the electrochemical cells within the battery pack.

To help avoid introduction of voids within an encapsulated battery pack, in some applications, it may be desirable to draw an encapsulate up and around a CMA which may correspond to one or more stacks of electrochemical cells which may be arranged in one or more corresponding cell blocks. While this may be accomplished in any number of ways, in one embodiment, an encapsulant flow path is formed between a first portion of a battery pack and/or CMA and a second opposing portion of the battery pack and/or CMA such as an upper portion and lower opposing portion of the battery pack and/or CMA. Encapsulant is then flowed through this flow path such that it exits the flow path within the second portion of the battery pack and/or CMA and then flows back towards the first portion of the battery pack and/or CMA. For example, in one embodiment, encapsulant is introduced either near or below a bottom surface of the electrochemical cells of a CMA. The encapsulant then flows up towards, and in some instances past, the opposing top surface of the electrochemical cells. While a pressurized flow of encapsulant may be sufficient to encapsulate a CMA, in some embodiments, a vacuum applied to the first portion of the battery pack may help urge the encapsulant to fully encapsulate the battery pack. Depending on the embodiment, a flow path may be embodied as a tube, a conduit, a channel formed in a component of the battery pack and/or CMA, or any other structure capable facilitating flow of an encapsulant through the battery pack and/or CMA prior to being introduced to the battery pack and/or CMA interior in the desired location. Additionally, in some embodiments the structure forming the flow path may be removable from the battery pack and/or CMA after encapsulant has been introduced.

The terms electrochemical cells, cells, and similar terms are meant to refer to individual battery cells such as coin cells, prismatic cells of various shape, jelly roll cells, pouch cells, or any other appropriate electrochemical device capable of acting as a battery. Additionally, a pouch cell, electrochemical pouch cell, and other similar terms are meant to refer to cells that include a deformable outer layer that typically includes layers of laminated polymers and metal foils surrounding an internal electrode stack or roll. Typically, pouch cells include larger flat opposing front and back surfaces and smaller side surfaces. Further, when forming stacks of pouch cells, the flat surfaces are typically stacked one on top of the other. However, certain embodiments may use multiple adjacent cell stacks within a CMA where the cells are either in series and/or in parallel. In certain embodiments, other ways of arranging the cells may also be employed.

While any appropriate material may be used as an encapsulant, appropriate encapsulants include but are not limited to elastomers (e.g. silicones), epoxies, and/or any other appropriate material. In one specific embodiment, an encapsulant is a flexible polyurethane/polyurea blend.

In some applications an encapsulant may exhibit one or more of the following properties: elongation to failure greater or equal to 250% and in some instances less than 1000%; a glass transition temperature between or equal to −70° C. and −40° C.; a dielectric strength greater than or equal to 300 V/mil; compatibility with Nylon, polybutylene terephthalate (PBT), polycarbonate, acrylonitrile butadiene styrene (ABS), copper, aluminum, nickel, and/or tin; a hardness between or equal to shore 60A and 60D, stable long term operating temperatures between or equal to −40° C. to 80° C.; a relatively low viscosity prior to curing (e.g. less than or equal to 2000 cP/2 Pascal seconds); gel times between or equal to about 4 minutes and 20 minutes; low to no off gassing from the encapsulant; low to no emission of volatile organic compounds (VOC's) during curing; high tear resistance; flammability resistance; and other appropriate properties. While specific properties are noted above, it should be understood that encapsulants that do not use all of the above noted properties, and/or have different properties, may also be used for certain applications.

In addition to the various battery pack configurations and arrangements noted above, in some embodiments, a battery pack may include a battery monitoring unit (BMU) and/or other associated electronics that provide various types of desired functionality. For example, in certain embodiments, a BMU may include circuitry that expands the number of cells for which the BMU may perform cell voltage sensing and balancing. In certain embodiments, the BMU may include a secondary overvoltage protection monitoring and interlock functionality. Additionally, a BMU may include circuitry and/or be programmed to implement a method of active and standby power supply adaption that provides lower active power dissipation. A BMU may also include external Flash Memory for more secure program bootloading. Of course, in certain embodiments BMU's may include combinations of the above noted functionalities and/or different functionalities.

The embodiments described herein may refer to cell module assemblies and/or battery packs. However, it should be understood that these terms may be used interchangeably in the various embodiments to refer to a grouping of one or more electrically interconnected electrochemical cells.

Turning now to the figures, several non-limiting embodiments are described in further detail.

FIG. 1 presents one embodiment of a battery pack 2. The battery pack includes an encapsulated cell module assembly 4 (CMA) that includes a plurality of electrochemical cells that are at least partially, and in some instances fully, encapsulated in an appropriate encapsulant. The battery pack includes a housing such as a battery monitoring unit (BMU) housing 6 that may contain various components such as a BMU disposed within the BMU housing. The BMU housing is disposed on an exterior surface 4a of the encapsulated CMA where the electrode leads of the cells within the assembly are located. While the BMU housing may be attached to the encapsulated CMA in any appropriate manner, in some embodiments, at least a bottom portion of the BMU housing facing the encapsulated CMA is encapsulated in the same encapsulant material as the encapsulated CMA. Alternatively, the BMU housing may be attached to the encapsulated CMA using methods such as threaded fasteners, clips, mechanically interlocking features, welding, brazing, adhesives, or in any other appropriate manner.

In addition to the above, in some embodiments, a housing such as the depicted BMU housing 6 associated with an encapsulated CMA 4, may include an interior space 6a that is isolated from the encapsulant. For example, in the depicted embodiment, the interior space of the BMU housing corresponds to interconnected walls that form a depression or cavity that is isolated from the surrounding encapsulant of the encapsulated CMA. Of course, any other feature that forms an open topped reservoir that is isolated from the encapsulant of the encapsulated CMA may also be used. As noted previously, such an arrangement may enable the testing of the encapsulated CMA prior to assembling electronics and other components such as a BMU 18 with the CMA, see FIG. 3. Once the appropriate components are assembled into the isolated interior space of the BMU housing, a separate encapsulating step may be conducted to encapsulate the BMU and open portion of the BMU housing.

In such a secondary encapsulating process the encapsulant may be added until it fills up to an upper edge of the interior space or it may extend above or below the BMU housing upper edge.

Figure 2:
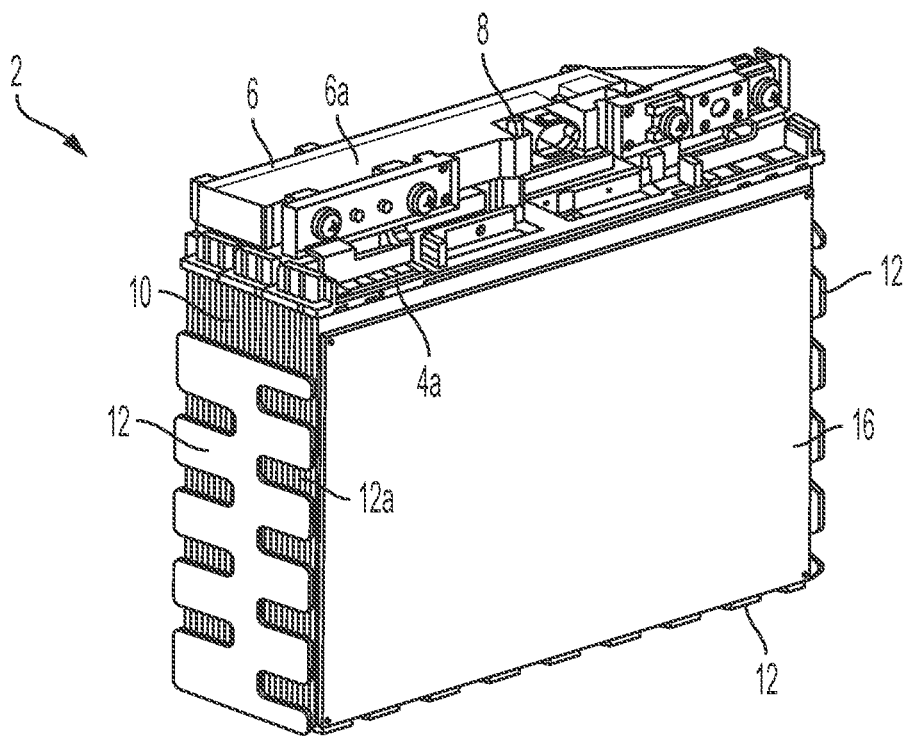
FIG. 2 is a schematic view of the pack of FIG. 1 prior to encapsulation.
Figure 3:
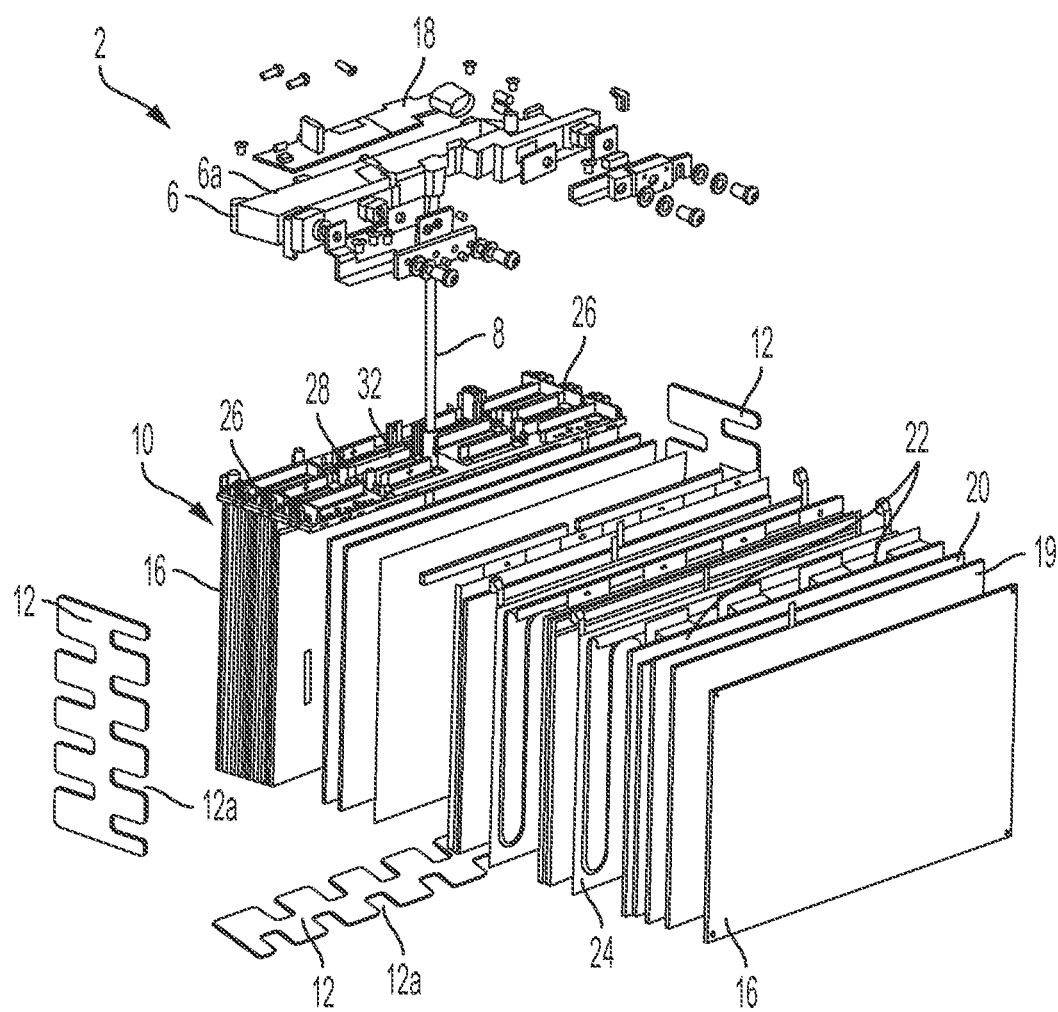
FIG. 3 is an exploded schematic view of the pack of FIG. 1 prior to encapsulation.

FIGS. 2 and 3 illustrate a cell assembly and the associated components prior to the battery pack undergoing an encapsulating process. In the depicted embodiment, the battery pack includes a plurality of electrochemical cells arranged in one or more cell stacks to form a CMA. In some instances, and as shown in the figures, there may be two or more cell stacks arranged side by side. Further, in instances where flat pouch and/or prismatic cells are used, the cells may be stacked with their flat sides in contact with one another, which may aid in building a substantially flat battery pack assembly. Once appropriately arranged, the CMA 10 may be positioned between two opposing end plates 16 that are located on the opposing sides of the CMA. Spacers 12 may then be placed on one or more of the sides of the CMA. For example, as shown in the figure, the spacers are placed on the opposing sides and bottom of the CMA defined between the end plates. As described in more detail below, the spacers may be used to space the CMA, and the electrochemical cells therein, from the interior walls of an encapsulation mold during an encapsulating process which may help ensure that the encapsulant fully encapsulates the CMA. In some embodiments, the spacers may include one or more cutouts 12a along their lengths. As shown in the figures, these cutouts may have elongated shapes that extend inward from the two opposing elongated exterior edges of the spacers toward an interior portion of the spacers. In some instances, the cutouts may be arranged in an alternating pattern on the opposing sides of the spacer. The cutouts may help reduce the pressures needed to flow an encapsulant around the CMA during an encapsulating process due to the increased area available for flow exposed by these cutouts.

As best illustrated in FIGS. 3 and 5-7, a cell module assembly 10 (CMA) may include a number of different components disposed between two opposing end plates 16. For example, in certain embodiments, a plurality of planar foam layers 19, heat distribution plates 20, electrochemical cells 22, and/or heaters 24 may be arranged in alternating fashion within the cell module assembly. In the particular embodiment shown in the figures, the cell module assembly includes a foam layer disposed between an end plate and adjacent heat distribution plate. The heat distribution plate may then be located between the heat distribution plate and a layer of one or more electrochemical cells which in turn are adjacent to a heater that is located between two adjacent electrochemical cells. This pattern, or another appropriate pattern, of the components may then be repeated throughout the cell module assembly until the opposing end plate is reached.

In the above noted embodiment, any appropriate foam including both open and closed cell foams may be used for the plurality of planar foam layers. However, in certain embodiments, it may be desirable to avoid introducing an encapsulant into the foam as might occur with an open cell foam subjected to an encapsulating process. Consequently, in some embodiments, a foam used for the plurality of planar foam layers in the cell module assembly may be a closed cell foam. Appropriate materials for the close cell foam include, but are not limited to, polyurethane, silicone foam, or any other appropriate foam material.

While any number of different heaters and heat distribution plates may be used, in certain embodiments, the heaters and distribution plates illustrated in the embodiment depicted in the figures are planar in shape and have a size that covers a majority, if not all of, the area of an electrochemical cell it is adjacent to. The inclusion of planar heat distribution plates between adjacent electrochemical cells may reduce the number of heaters needed within a CMA. Without wishing to be bound by theory, this may be due to the heat distribution plates helping to distribute and equalize temperature gradients between adjacent cells and different portions of the same cell. Additionally, in some embodiments, the heaters may generate heat and/or conduct heat across their faces which may also help to reduce these same temperature gradients.

In certain embodiments, a heat distribution plate may correspond to any thermally conductive planar structure disposed between two flat cells. For example, a metal plate such as a copper or aluminum metal plate may be used. Further, in some embodiments, a thermal conductivity of the heat distribution plates may be greater than that of the electrochemical cells it is associated with.

Figure 4:
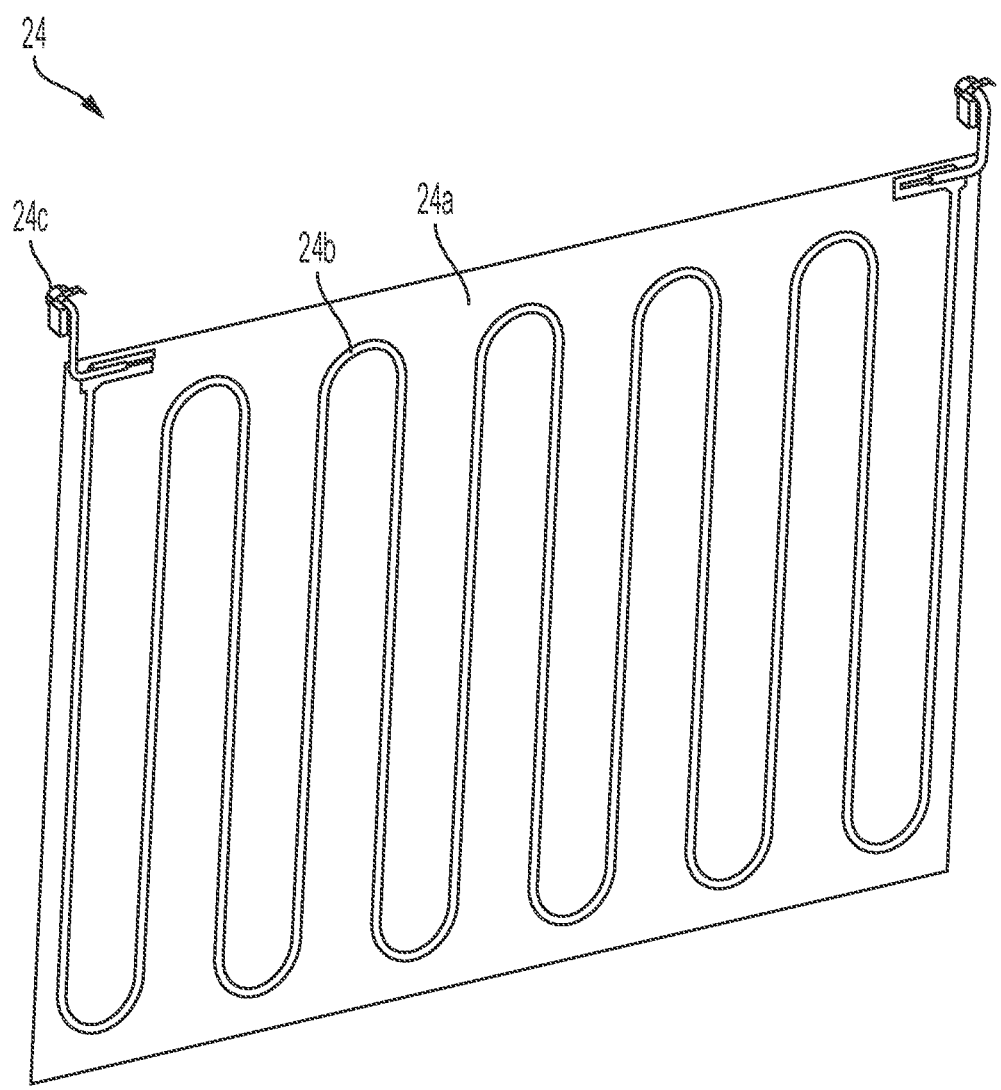
FIG. 4 is a schematic view of a heater.

Depending on the particular embodiment, the one or more heaters used in a CMA may correspond to any appropriate component capable of generating heat. In certain embodiments, and as shown in FIG. 4, a heater 24 may be an etched plate, such as an etched plate 24a including a laminated copper foil heating element 24b. Again, in instances where flat cells, such as flat electrochemical pouch cells, are used, the heater may be located between the cell rows covering a majority, or all, of the large flat surface area of the one or more associated electrochemical cells. This type of arrangement may beneficially result in the heater applying heat directly to the associated cells across their surface areas and in some embodiments may extend across the faces of multiple cells arranged in adjacent stacks. For example, two rows of cells 22 may be used as shown in the figures, though in other embodiments, any number of cell rows may be used.

Figure 5:
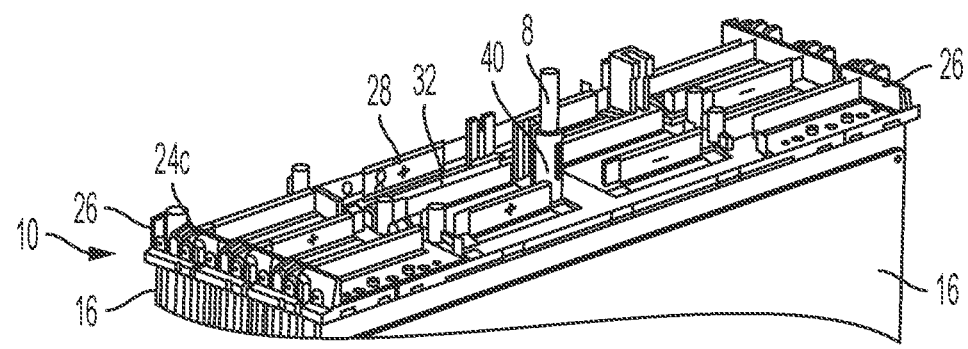
FIG. 5 is a schematic top perspective view of a battery pack before encapsulating.
Figure 6:
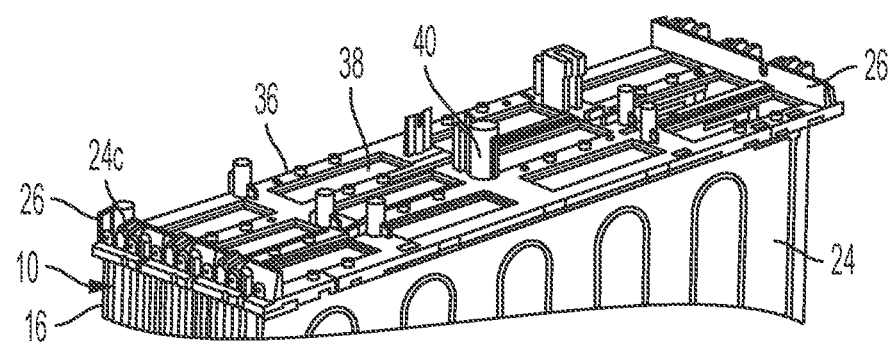
FIG. 6 is a schematic top perspective view of the heaters and heater connections of a battery pack assembly.
Figure 7:
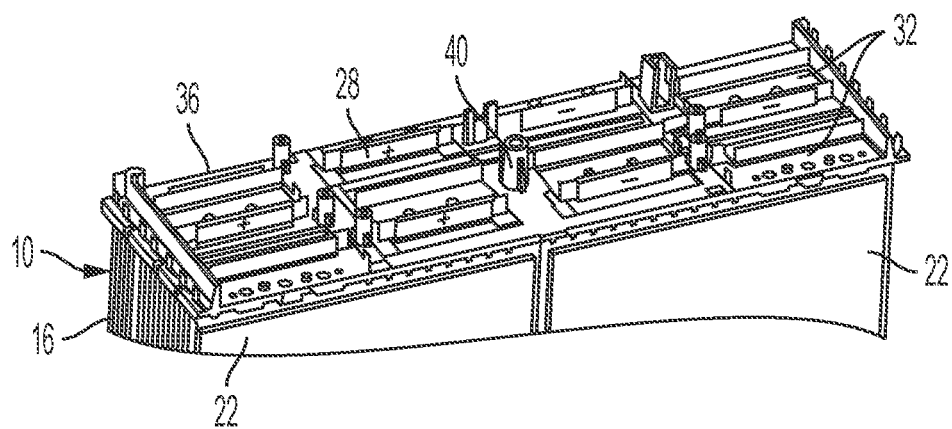
FIG. 7 is a schematic top perspective view of the busbars and cell tab connections battery pack assembly.

As shown best in FIGS. 5-7, in certain embodiments, a plurality of heaters 24 located within a CMA may include electrical connections 24c that are connected to two common busbars 26 located on opposing sides of the battery pack. In such an arrangement, the heaters may be electrically connected in parallel with one another; however, in other embodiments, heaters electrically connected in series are used. Further, in certain embodiments, by using just a single pair of busbars, the heaters may be controlled using a single electrical control which may beneficially simplify both the control electronics and algorithms associated with the heaters. For example, one or more temperature sensors may be used to monitor the temperature of the electrical cells, heaters, and/or battery pack such that the heaters are operated to maintain a temperature of the battery pack at a desired threshold temperature. Various considerations that may also be taken into account when controlling the amount of heat provided to a cell module assembly by a heater include, but are not limited to, state of charge of the electrochemical cells, ambient temperature, and other appropriate parameters. The one or more temperature sensors may be associated with any appropriate structure within the battery pack. However, in certain embodiments, one or more temperature sensors may be connected to a busbar of the system such a busbar 32 connected to the electrochemical cells. Appropriate temperature sensors include, but are not limited to, thermistors, thermocouples, or any other appropriate sensor capable of being used to detect the temperature of a battery pack.

Figure 8:
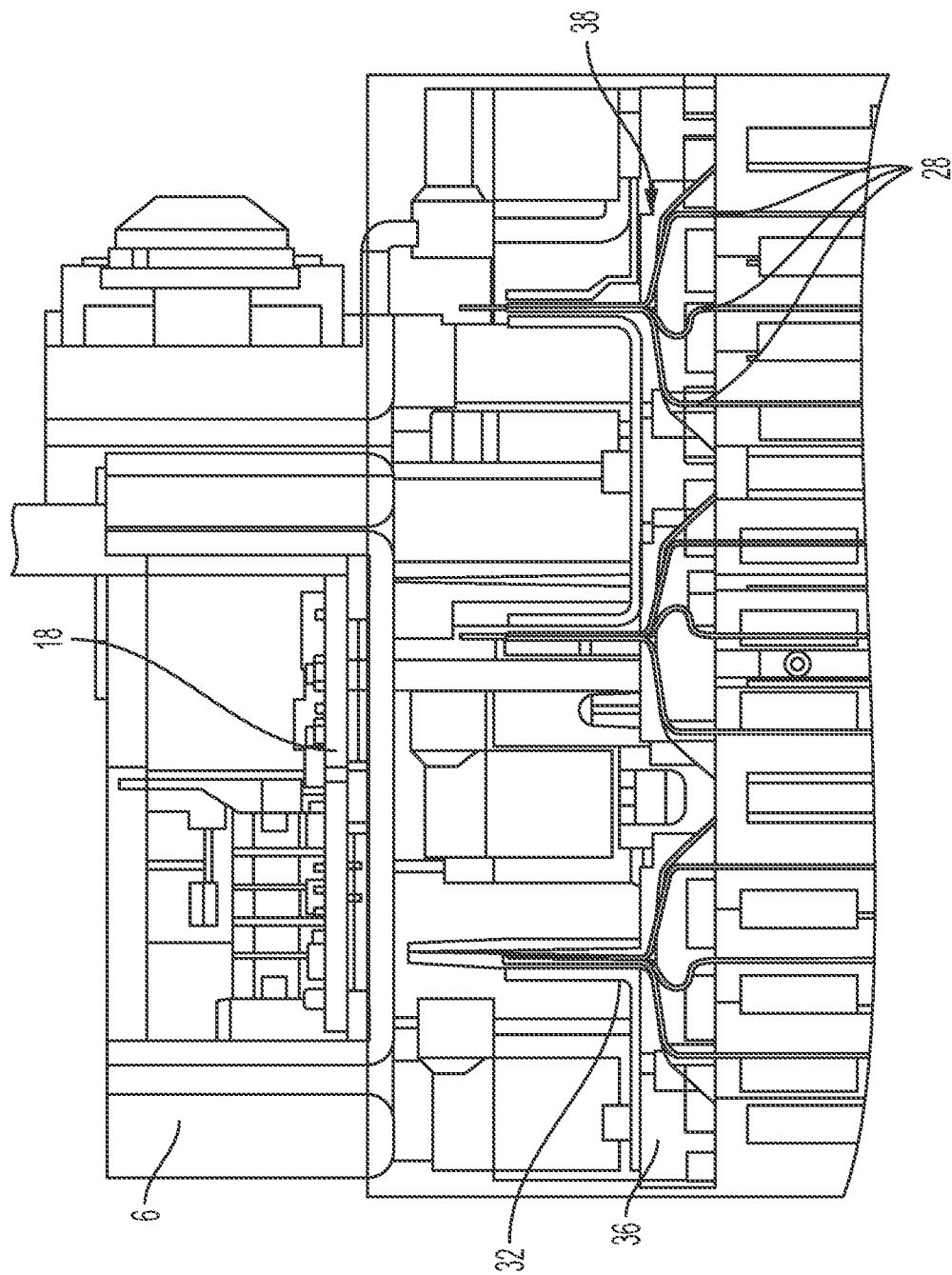
FIG. 8 is a schematic cross-sectional view of a cell module assembly with the electrode leads extending through the openings of an associated interconnect board.

In some instances, during the assembly of a battery pack, it may be desirable to help control routing and connection of the electrode leads 28 of the electrochemical cells in a battery pack. Consequently, in some embodiments, the battery pack may include a structure such as an insertion plate 36. During the assembly process, the insertion plate may be assembled onto a top edge of a cell module assembly from which the electrode leads extend. In the depicted embodiment, the insertion plate is an elongated plate structure that includes one or more elongated openings 38 arranged in rows corresponding to the locations of electrode lead groupings. As shown in the cross-section of FIG. 8, the electrode leads are bent towards and are routed upwards through a central region of the elongated openings towards the corresponding busbars. Once appropriately arranged together, the electrode leads are electrically connected to the corresponding busbars in any appropriate manner including, but not limited to, ultrasonic welding, soldering, or any other appropriate electrical connection.

Figure 9:
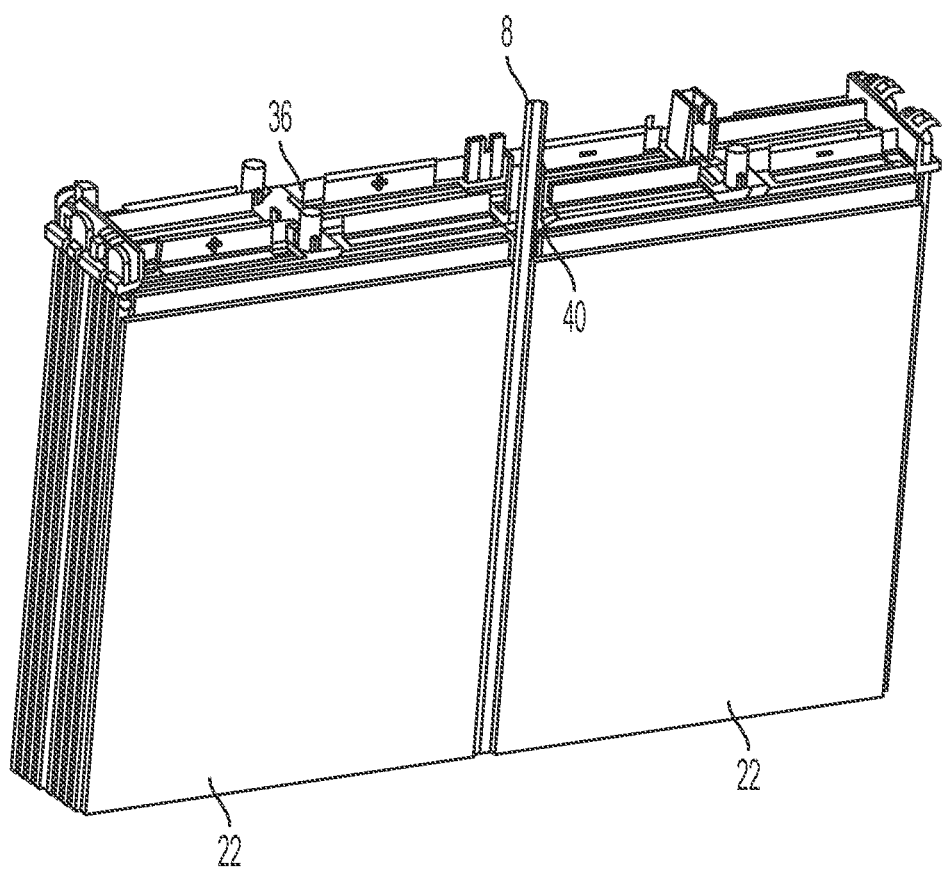
FIG. 9 is a schematic cross sectional view of a battery pack with an encapsulant delivery tube.

As noted previously, in some embodiments, it may be desirable to encapsulate a CMA by flowing encapsulant from a bottom side of the cell module assembly up and around to a top opposing side of the CMA. Referring now to FIG. 9, to help facilitate such an encapsulation process, a battery pack may include an encapsulant flow path, such as an encapsulant tube 8 received in, and/or in fluid communication with, an encapsulant tube receiver 40 connected to the BMU housing described above, which in this embodiment corresponds to a through hole and associated support structure formed in or otherwise connected to the BMU housing. The encapsulant tube may extend from an upper portion of the battery pack, such as from above the CMA, to a lower portion of the battery pack, such as a bottom edge of the CMA. While the flow path may be located in any appropriate location, in the depicted embodiment, the flow path extends along a central axis of the battery pack. In certain embodiments, the flow path may be located in a corner of the battery pack, or any other appropriate location and/or multiple flow paths in one or multiple locations may be employed.

Figure 10:
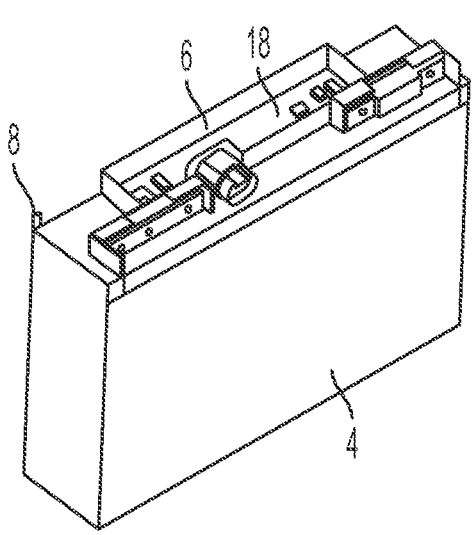
FIG. 10 is a schematic perspective view of an encapsulated battery pack prior to encapsulating the BMU housing.
Figure 11:
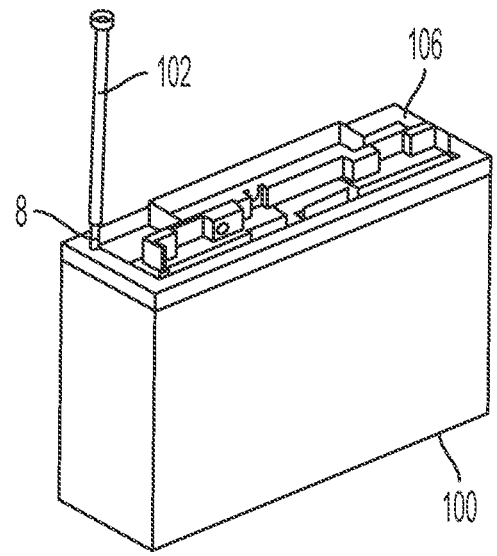
FIG. 11 is a schematic perspective view of a battery assembly in an encapsulation mold prior to encapsulation.
Figure 12:
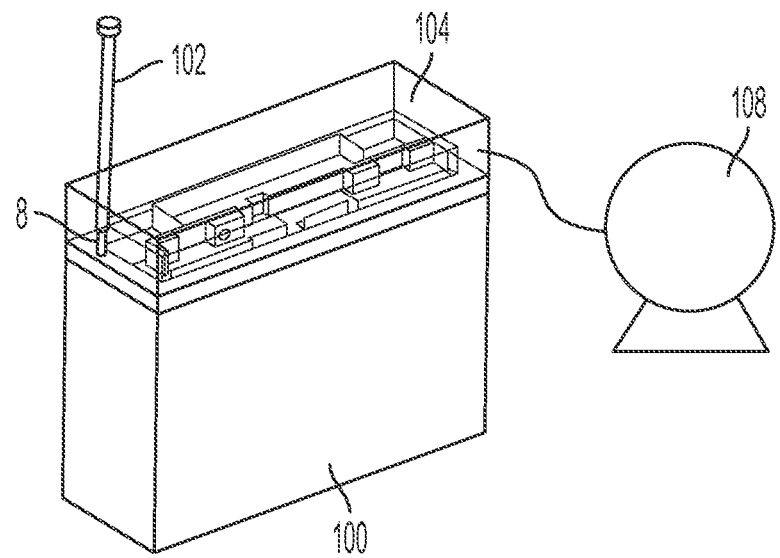
FIG. 12 is a schematic perspective view of a battery assembly in an encapsulation mold during encapsulation.

Referring now to FIGS. 10-12, one embodiment of an initial encapsulating process to form an encapsulated cell module assembly 4 with a BMU housing disposed thereon is illustrated. In the depicted embodiment, a CMA along with the associated spacers, end plates, and BMU housing, are inserted into a mold 100. The mold maintains the various components in a desired arrangement during the encapsulating process. Additionally, the spacers maintain the cell module assembly and other components spaced from the sides of the mold. An encapsulant source 102 is then connected to an encapsulant flow path such as encapsulant tube 8. The encapsulant source may correspond to any appropriate structure including, but not limited to, a tube or other structure connected to a pressurized source of encapsulant and/or a pump capable of providing pressurized encapsulant. In some embodiments, a mold may include the use of a vacuum chamber 104 sealed against a sealing surface 106 of the mold. The vacuum chamber is connected to a pump 108.

Once appropriately connected to the optional vacuum source 108 and encapsulant source 102, encapsulant is fed through encapsulant tube 8 and into the mold. The encapsulate tube, or other flow path, may transfer the encapsulant to a bottom side of the CMA where it is ejected into the space between the CMA and the mold wall defined by the associated spacers described above. As encapsulant continues to be fed into the mold, a vacuum may be drawn on the vacuum chamber 104 using pump 108. In addition to helping to reduce the presence of air bubbles within the encapsulant, the applied vacuum may also help to draw the encapsulant from a bottom side of the CMA up and around to a top of the battery pack. This process of feeding encapsulant into the mold and drawing vacuum may be continued until the CMA is completely encapsulated and the BMU housing is partially encapsulated without filling the isolated interior space of the BMU housing. The encapsulant is then permitted to at least partially cure prior to ejecting the encapsulated battery pack from the mold.

Figure 13:
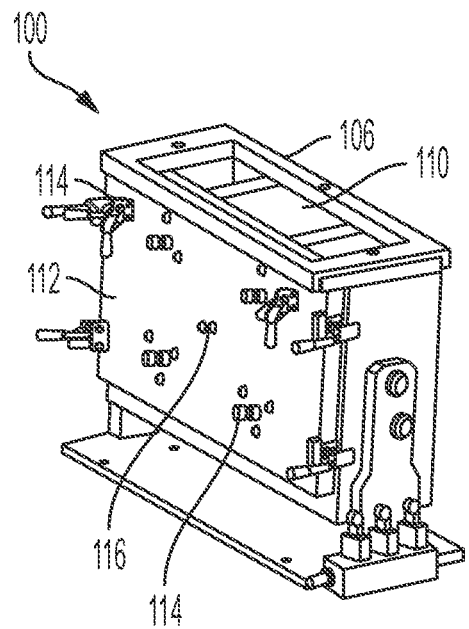
FIG. 13 is a schematic perspective view of an encapsulation mold.
Figure 14:
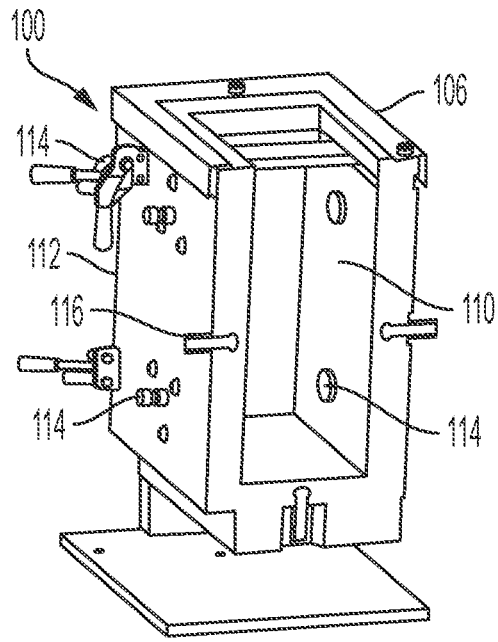
FIG. 14 is a schematic perspective cross-sectional view of the encapsulation mold of FIG. 13.
Figure 15:
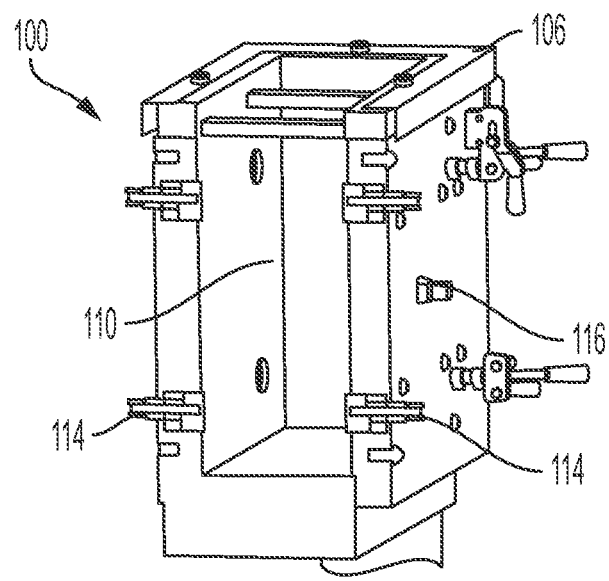
FIG. 15 is a schematic perspective cross-sectional view of the encapsulation mold of FIG. 13.

FIGS. 13-15 show another embodiment of an encapsulating mold 100. In the figures, the mold includes a chamber 110 that is sized and shaped to accept an unencapsulated cell module assembly along with the associated housings, spacers, and other components described above with the electrode leads extending up and out of the chamber. While a chamber with a rectangular cross section has been shown, any other appropriate shape may be used including but not limited to squares, circles, ovals, etc. To help with assembling the various components of a battery pack within the chamber, in some embodiments, a chamber may include one or more removable, or otherwise openable, covers 112 that may function as one or more walls of the mold assembly during use. In the depicted embodiment, the cover is selectively attached to the mold using one or more connectors 114. Appropriate connectors include the depicted latches as well as threaded fasteners, interlocking features, quick release connectors, retractable bolts, or any other appropriate connector.

To aid in assembling a battery pack within a mold chamber 110, it may be desirable to include a removable sealing surface 106, similar to the rectangular insert shown in the figures. In such an embodiment, the assembly and welding of a cell module assembly and associated components may be completed prior to assembling the separately formed and removable sealing surface, which may be in the form of a rectangular gasket, onto a side of the closed mold chamber including an opening through which the desired vacuum may be applied to the mold chamber. The encapsulating process may then be conducted as described previously.

In some embodiments it may also be desirable to tilt a mold to aid in assembling a battery pack within the mold interior. Therefore, as shown in the embodiment of FIG. 13, a mold may be connected to a hinge, or other rotation arrangement, that permits the mold to be tilted during use to aid in assembling the battery pack components within the mold's interior chamber. For example, the hinge may permit the mold to tilt between 15° and 60°, between 25° and 35°, or between or at any other appropriate angle(s). In certain embodiments, angles both greater than and larger than those noted above are employed.

In some embodiments, a mold may include one or more displaceable pressing surfaces, such as ejector pins 114, and/or air fittings 116 for aiding in removing an encapsulated battery pack from a mold chamber. For instance, once an encapsulating process has been completed, the encapsulated battery pack may be pressed out of mold by the ejector pins while air is also forced between an inner surface of the mold and the encapsulated battery pack using the air fittings. In addition to the above, in some embodiments the ejector pins may also be used to position and compress a CMA and the associated components during an encapsulating process. This may help in creating the appropriate compression of the electrochemical cells for subsequent use and operation. In one such embodiment, a cell module assembly and the associated end plates are positioned between one or more sides of the mold chamber 110 such that the ejector pins 114 may be displaced to position the end plates and cell module assembly at a desired distance from the chamber walls while also applying a compressive force to the end plates. Once the encapsulant has been fed into the mold, and the battery pack is encapsulated, the encapsulant will maintain this compressive force on the end plates and associated CMA even after the ejection pins and air fittings have been used to remove the battery pack from the mold.

While the use of ejector pins for applying a compressive force to a CMA within a mold is described above, it should be understood that in other embodiments any appropriate pressing surface and/or method capable of applying a compressive force to a battery pack while it is being encapsulated inside of a molding chamber may be used. For example, in certain embodiments, protrusions located on opposing inner surfaces of a mold chamber may compress a cell module assembly there between when the mold is closed. In certain embodiments, one or more inserts with a preselected thickness may be positioned between the two end plates of a cell module assembly and the opposing sides of the mold. In such embodiments, a preselected thickness of these inserts may be selected to provide a desired amount of compression when the mold chamber is closed. Further, the inserts may have any appropriate shape, size, and/or arrangement. However, in certain embodiments, the inserts may cover only a portion of the end plates such that encapsulant covers a majority of the end plate surface. Of course other methods of creating a compressive force on a cell module assembly within a mold chamber may also be employed.

Figure 16:
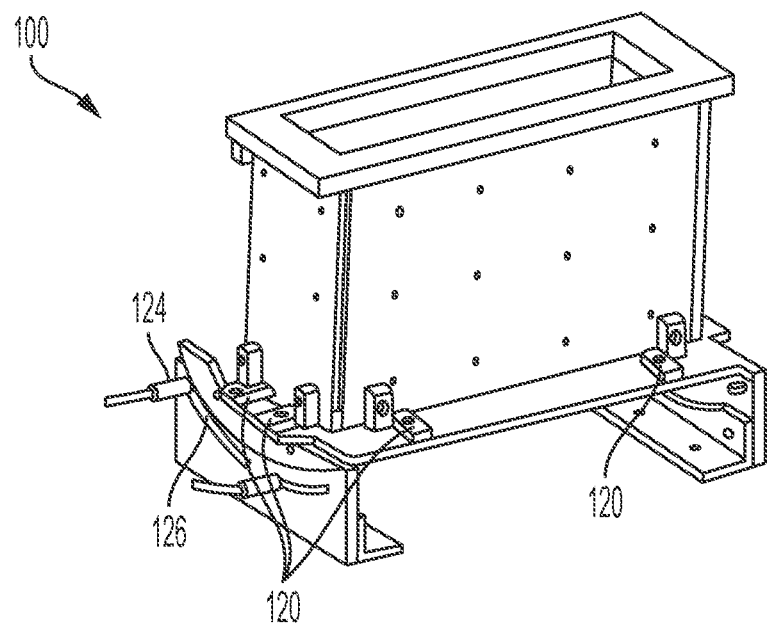
FIG. 16 is a schematic perspective view of an encapsulation mold.
Figure 17:
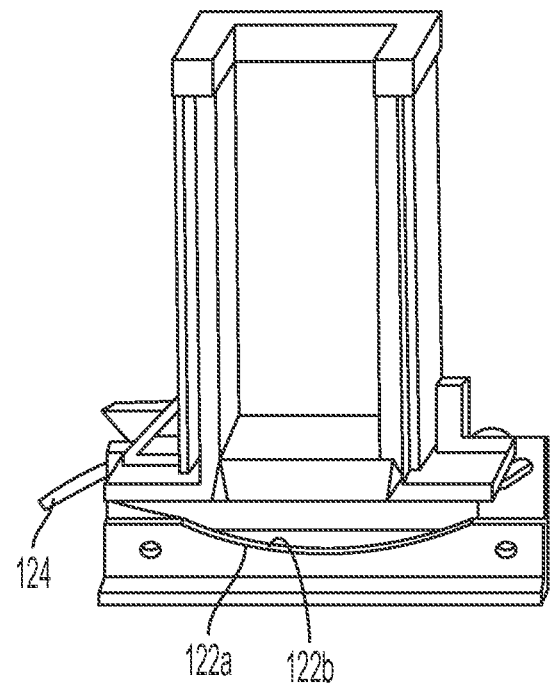
FIG. 17 is a schematic perspective cross-sectional view of the encapsulation mold of FIG. 16.

FIGS. 16 and 17 show another embodiment of a mold for completing an encapsulating process of a battery pack. In the depicted embodiment, the mold includes three sides that are attached to hinges 120. This arrangement permits the three sides to be opened about the hinges after an encapsulating process has been completed, which may aid in the removal of the battery from the mold. Additionally, another tiling system for tilting the mold is depicted in these figures. In this particular embodiment, the tiling system includes two complementarily shaped curved surfaces 122*a* and 122*b*. The tiling system also includes one or more locks 124 that engage corresponding curved channels 126. During operation, the locks are moved to an unlocked position and the mold is tilted moving the complementary surfaces relative to one another to a desired position. As the mold is tilted, the locks move within the corresponding curved channels to the desired position. Once appropriately positioned, the locks are moved to a locked position where they are engaged with the curved channels and/or any other appropriate feature such as a bearing surface associated with the channels. Once it is desired to move the mold back to the original position, such as may be desired after assembling the components within the mold, the locks may be moved to the unlocked position. The mold is then moved back to the original orientation. The locks are then re-engaged to lock the mold in place for the subsequent encapsulating operation.

Figure 18A:
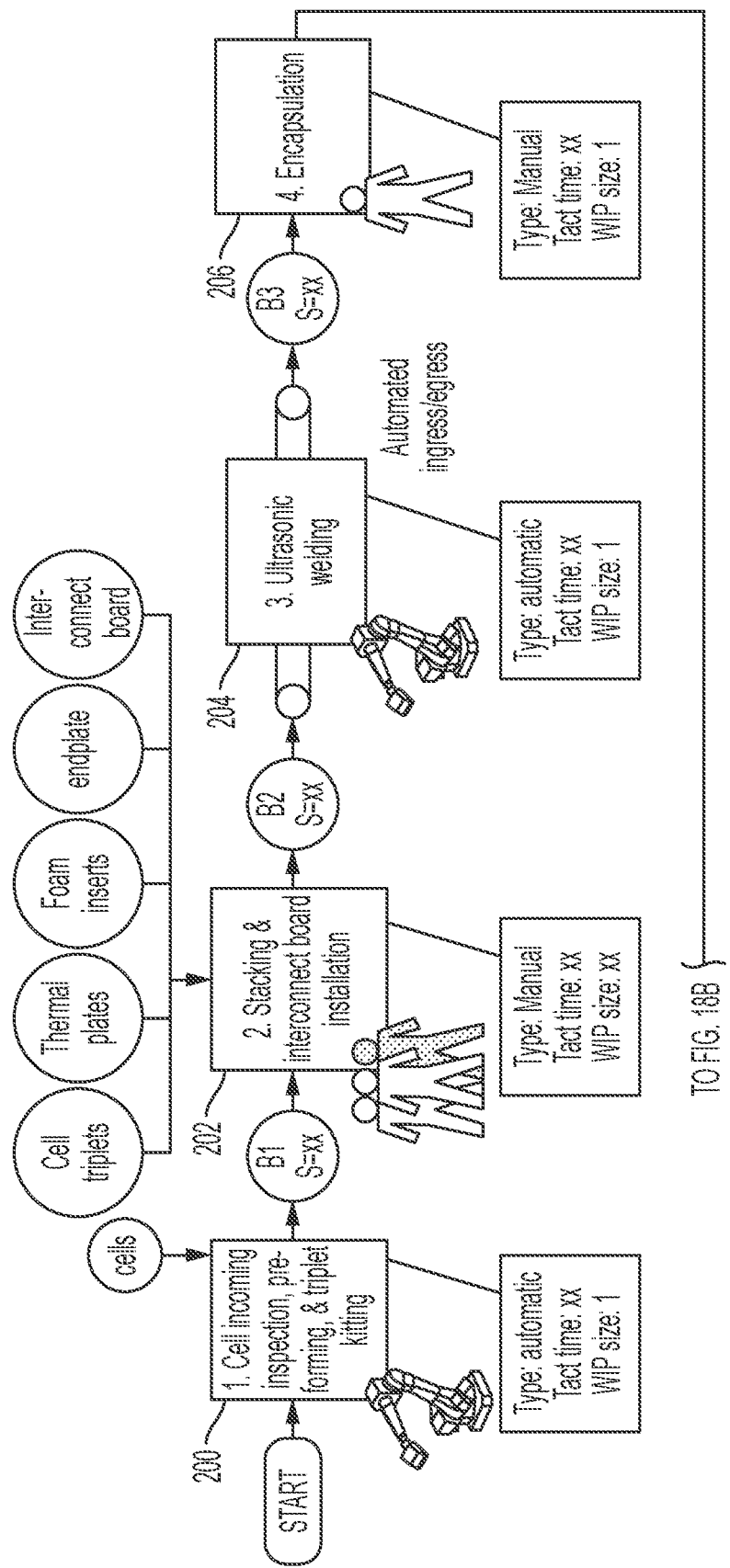
FIGS. 18A-18B are a flow diagram of a manufacturing process.
Figure 18B:
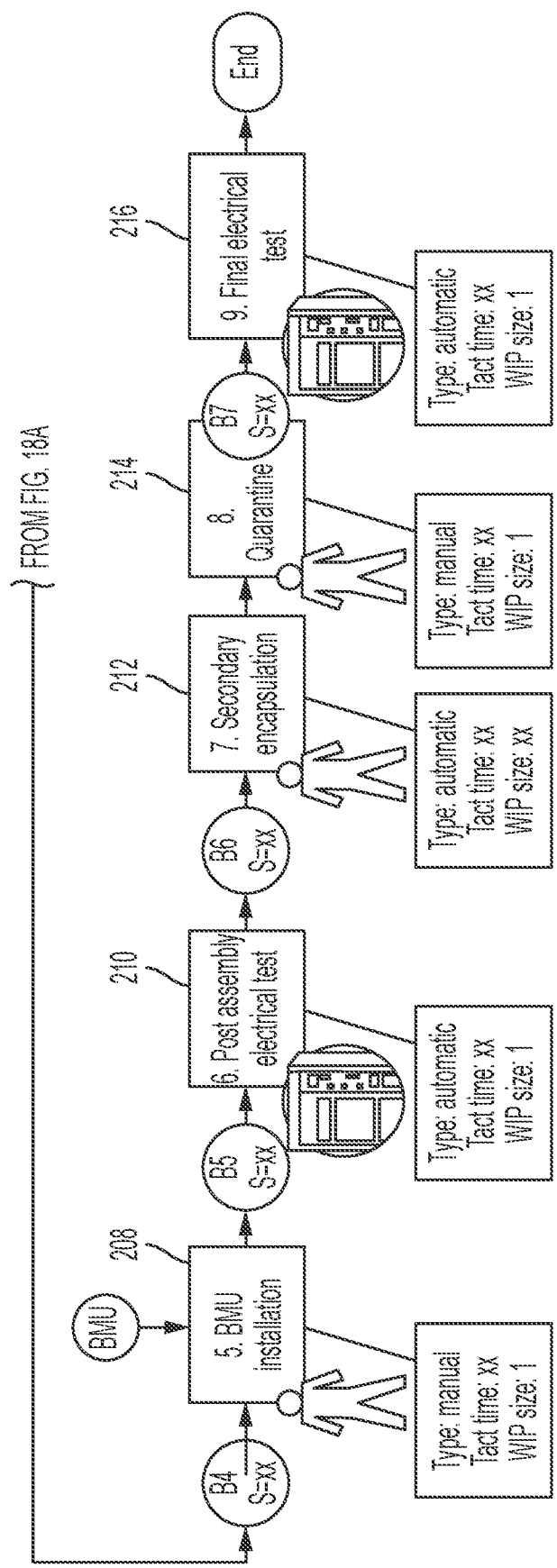

FIGS. 18A-18B are a schematic flow diagram of an exemplary assembly process for a battery pack according to the above noted embodiments. As shown in the figure, incoming electrochemical cells are inspected and are subject to preforming processes and triplets kitting at 200. Subsequently, cells, thermal plates, heaters, foam inserts, end plates, and/or the associated interconnect board are assembled at 202. In step 204, the stack assembly and interconnect board undergo ultrasonic welding, or any other appropriate connection process, to connect the electrodes of the electrochemical cells, heater electrical connections, and/or sensors with the appropriate busbars, wiring, and/or other electrical contacts. After forming the electrical connections, the assembly is placed into a corresponding encapsulating mold for a first encapsulation process at 206. As noted above, this encapsulation process may leave an interior of a housing associated with the CMA, such as a BMU housing, unencapsulated for subsequent processing steps. Once it is confirmed that the encapsulated CMA is within desired operating parameters, a BMU, or other component, may be installed into the unencapsulated interior space of the housing, at 208. The resulting assemblies are then subjected to electrical tests at 210 prior to undergoing a second encapsulation process at 212 to encapsulate the BMU and associated interior of the housing. The resulting encapsulated battery packs are then quarantined for a predetermined amount of time at 214 prior to undergoing final electrical testing at 216.

Having generally described various types of pack geometries and methods for their manufacture, the layout and operation of an exemplary battery monitoring unit (BMU) used to control a cell module assembly (CMA) is described further in regards to FIGS. 19A-27. In these figures, a 6 cell lithium ion battery arranged in series to provide a nominal 22 V operating voltage is used. Specifically, each lithium-ion cell operates in the range of 3 Vdc to 4.15 Vdc for a module voltage ranging from 18V (0% SOC) to 24.9V (100% SOC). Such an arrangement may be useful for replacing lead-acid batteries that have 24V nominal operating voltages used in existing 24V material handling equipment without needing to alter the functionality of the equipment. While a particular arrangement of cells and associated electronics are depicted in these figures, other embodiments may employ a different number of cells, different types of cell chemistries, and/or different arrangements of the cells in series and/or parallel to provide different operating voltages.

In addition to primary over voltage protection and typical heater control, in some embodiments, the presently described battery packs may further include a secondary overvoltage protection monitoring and interlock circuit and/or a dual redundant heater control circuit. In addition to the above, the BMU depicted in the figures may also be used to modify a BMU that is intended to monitor, balance, and control a first number of cells (e.g. four cells) to enable it to handle a second larger number of cells (e.g. six cells, or more). The BMU may also be configured to provide active and standby power supply adaption capability permitting lower active power dissipation in some cases. The exemplary BMU described below may also be used to provide external Flash Memory for enabling more secure program bootloading. Of course depending on the embodiment, BMU(s) may be employed that include all, a combination of some, or in some instances, different functionalities than those noted above.

Figure 19A:
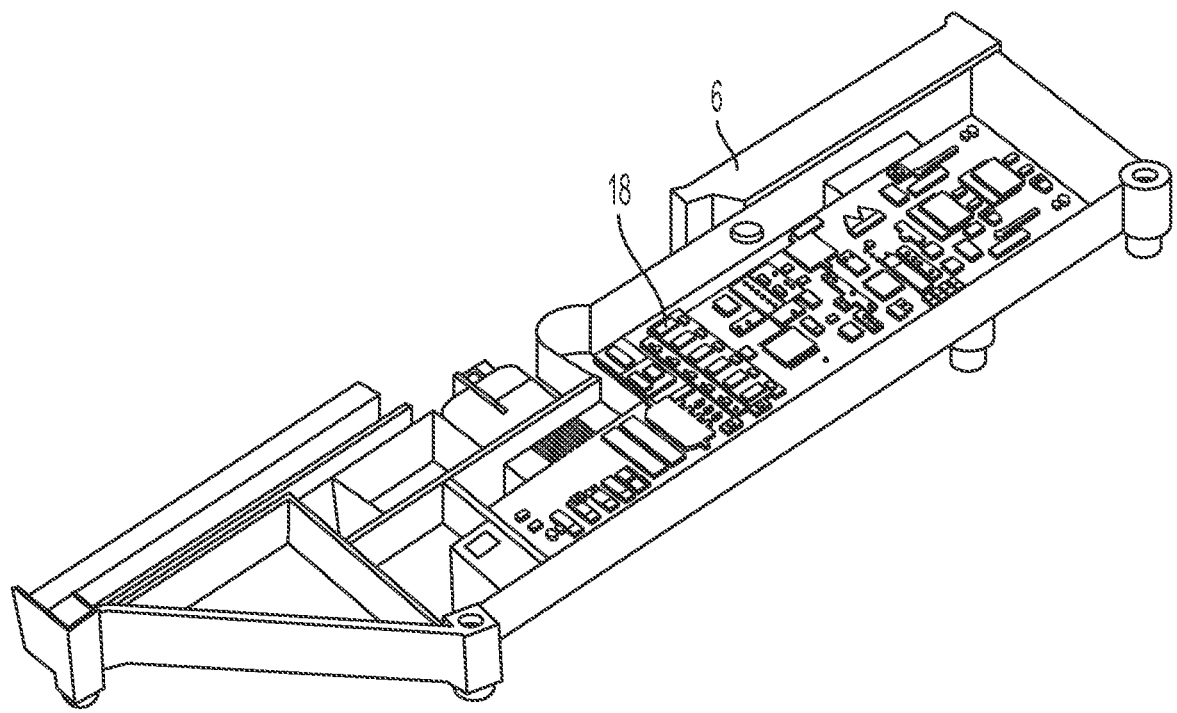
FIG. 19A is a schematic perspective view of a BMU assembly installed in a CMA carrier housing.
Figure 19B:
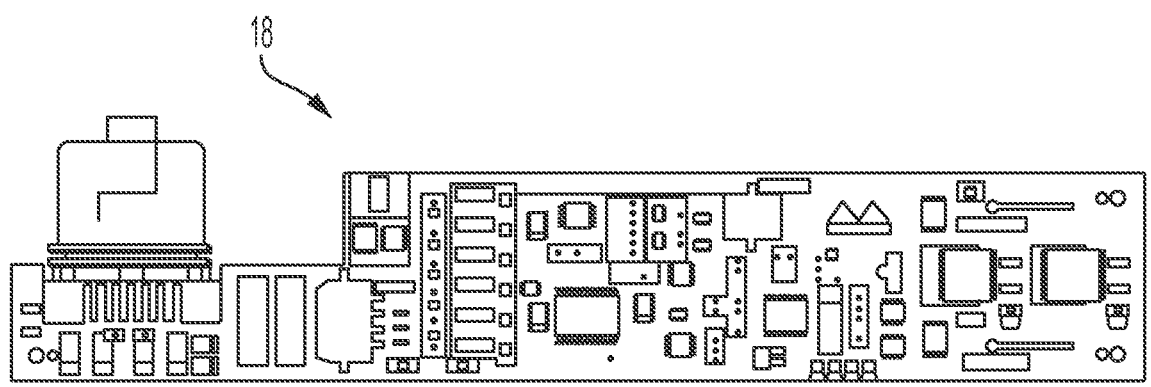
FIG. 19B is schematic view of a BMU.

FIG. 19A shows an exemplary embodiment of a BMU assembly 18 installed in a BMU housing 6, such as the depicted CMA carrier. FIG. 19B shows the BMU by itself. As described previously, the housing, or CMA carrier, secures the assembly onto the CMA and provides mechanical support for the interconnecting sense and heater control wires from the CMA to the BMU assembly. Further, after installing the BMU and connecting the wires from the CMA, the BMU and wires may be encapsulated in a secondary encapsulating process to seal the BMU from the environment. Besides the CMA's power terminals, the BMU right-angle communication connector shown in these figures is the only electrical interface to the system. This connection may be sealed when a system harness is plugged into the connector.

In some embodiments, it may be desirable to provide an outer enclosure for an encapsulated battery pack to either provide additional physical protection and/or to apply pressures to the encapsulated battery pack during use. For example, in comparison to typical electrochemical cells, in some embodiments, the electrochemical cells used within a battery may include electrolytes with a relatively low boiling point and/or cell chemistries that exhibit increased rates of gas generation within the electrochemical cells due to the presence of side reactions that occur more rapidly at elevated temperatures. Accordingly, it may be desirable to apply pressure to such a battery pack during use to prevent excessive swelling of the electrochemical cells contained therein which may help the battery pack to pass various standard tests and/or to improve performance of the battery during use in environments with elevated temperatures. However, it should be understood that such an embodiment may be used with any type of electrochemical cell with any appropriate range of operating temperatures. One such embodiment is described further in regards to FIGS. 20-27. In certain embodiments, the various features and components described in regards to the embodiment described below may be combined in any appropriate manner with the other embodiments described herein.

Figure 20:
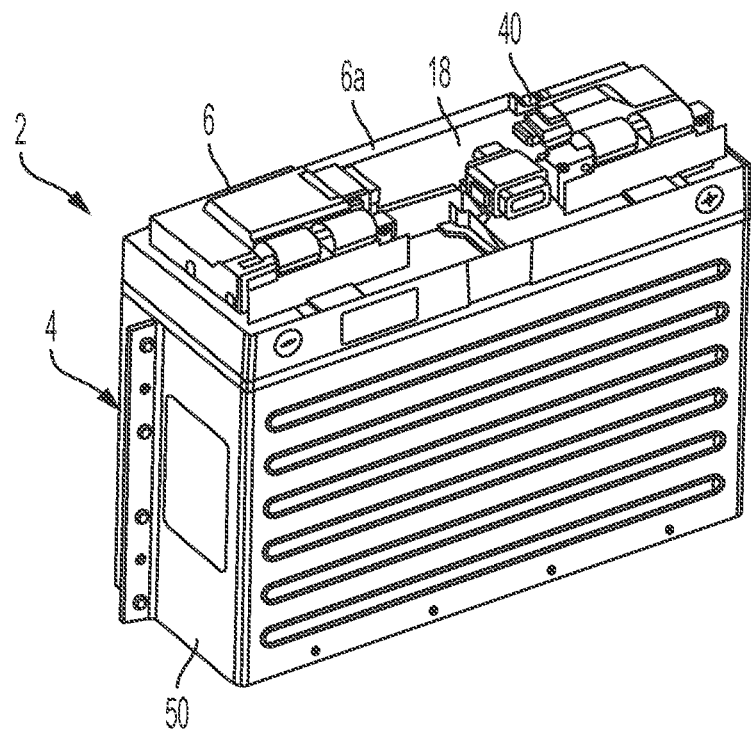
FIG. 20 is a schematic representation of an encapsulated CMA including an outer housing.
Figure 21:
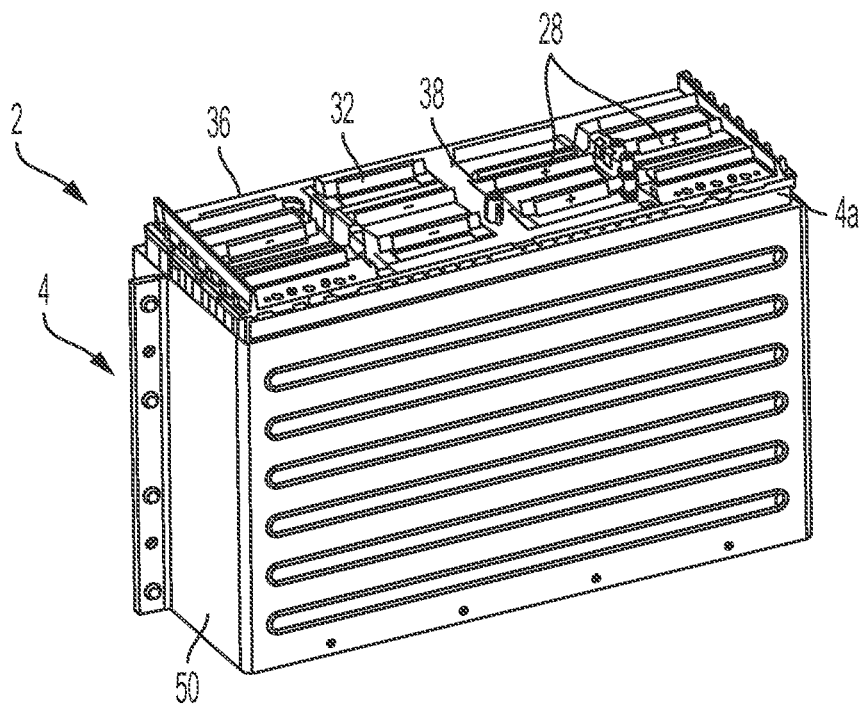
FIG. 21 is a schematic representation of an encapsulated CMA including an outer housing with the BMU housing removed.

Referring to FIGS. 20 and 21, an embodiment of a battery pack 2 including an encapsulated CMA 4 is depicted. As shown in the figure, the encapsulated CMA is at least partially surrounded by a rigid outer housing 50 that includes two opposing faces oriented towards the flattened fronts and backs of the electrochemical cells as well as at least two other opposing faces oriented towards the sides of the electrochemical cells. Accordingly, in some embodiments, the housing may extend around the sides as well as the opposing front and back portions of the battery pack and/or CMA. In other embodiments, the housing extends around other portions of the battery pack, and/or completely surrounds an encapsulated CMA. In addition to the above, it should be understood that the outer housing may be made from any appropriate material that is compatible with the materials used within the battery pack which may include steel, stainless steel, aluminum, and rigid plastics to name a few.

Similar to the other embodiments described herein, a battery pack 2 may include a BMU housing 6 that includes an interior space 6a that receives a BMU 18. In the depicted embodiment, the BMU has been over molded with a polymeric material such that one or more connectors extend out from the overmolded material for attachment to corresponding connectors on the housing and/or with the CMA itself. To facilitate the use of the overmolded BMU, the battery may also include an insertion plate 36 including a plurality of elongated openings 38 formed therein for routing and connection of the associated electrical leads 28 and busbars 32 as previously described. In such an embodiment, the overmolded BMU may be appropriately isolated from contaminants, and in some instances may exhibit improved vibration and shock resistance, without the need for a separate encapsulation procedure. This may also facilitate both the easy installation and removal of the BMU from a battery pack if a CMA is discovered to be defective later on during quality control procedures. However, in certain embodiments, the BMU is encapsulated using the methods and materials described previously.

In the above embodiment, the BMU housing 6 is no longer encapsulated in a separate encapsulation process. Accordingly, it may be desirable to seal the housing to a portion of the associated encapsulated CMA 4 or other portion of the battery pack to provide additional protection against the intrusion of contaminants to the battery pack. In one such embodiment, the BMU housing 6 may be sealed to an exterior surface 4a of the encapsulated CMA and/or to an edge or surface of the depicted outer housing 50. A seal may be formed using any number of different techniques and/or materials. For example, in one embodiment, a seal may be formed using a gasket sandwiched between opposing surfaces of the BMU housing 6 and outer housing 50. Alternatively, adhesives, putties, brazing, welds, or any other appropriate sealing method may be used to form a seal between the BMU housing and one, or both, of the exterior surface of the CMA and the outer housing.

Figure 22:
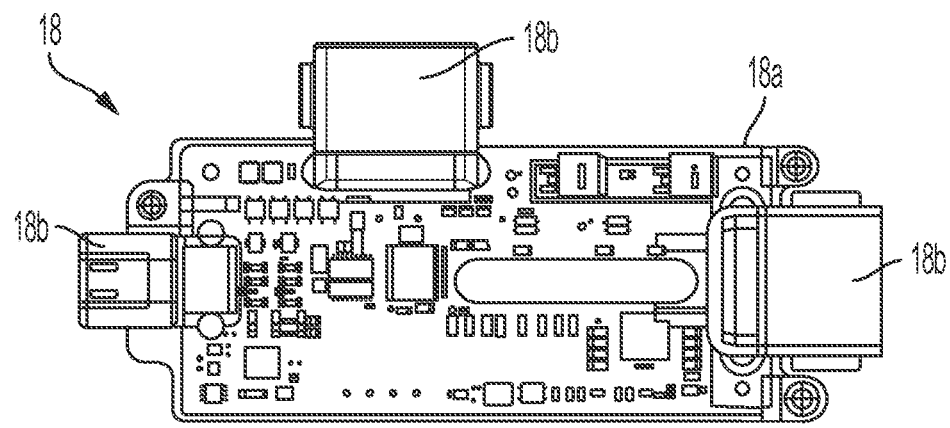
FIG. 22 is a schematic representation of a BMU.
Figure 23:
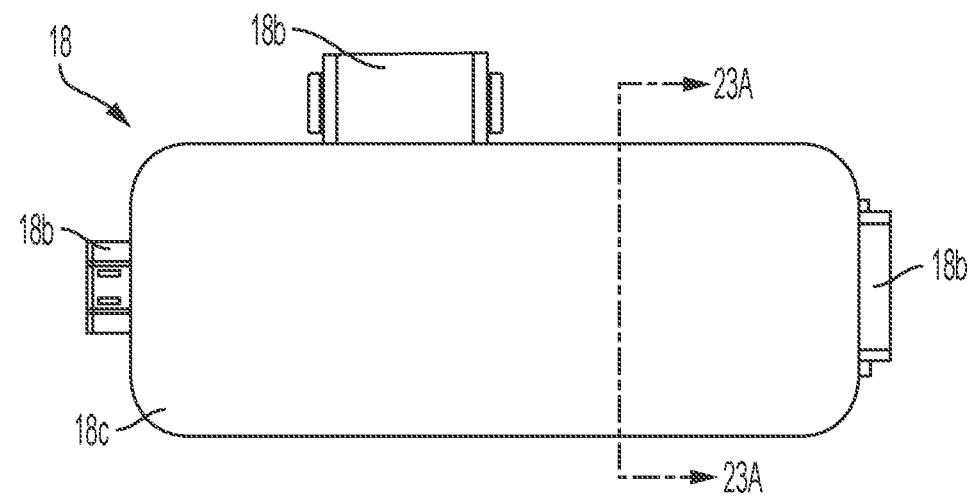
FIG. 23 is a schematic representation of an overmolded BMU.
Figure 23A:
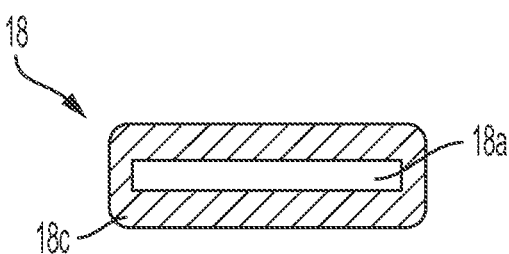
FIG. 23A is a cross sectional view of the overmolded BMU of FIG. 23.

FIGS. 22-23A illustrate one embodiment of an overmolded BMU 18. In the depicted embodiment, the BMU includes a printed circuit board 18a including one or more connectors 18b that are configured for connecting to one or more connectors of a CMA and/or battery pack as previously described. Using any appropriate process including, for example, positioning the BMU in an appropriately shaped and sized injection molding cavity, a polymer may be injection molded, or otherwise applied, to the surface of the PCB such that the PCB is at least partially, and in some instances fully, encapsulated with an overmolded material 18c, see the cross sectional view in FIG. 23A depicting the overmolded material 18c surrounding the PCB 18a. Additionally, the one or more connectors may extend out from the overmolded material 18c such that they may be connected to the one or more connectors of the CMA and/or battery pack as described above.

Figure 24:
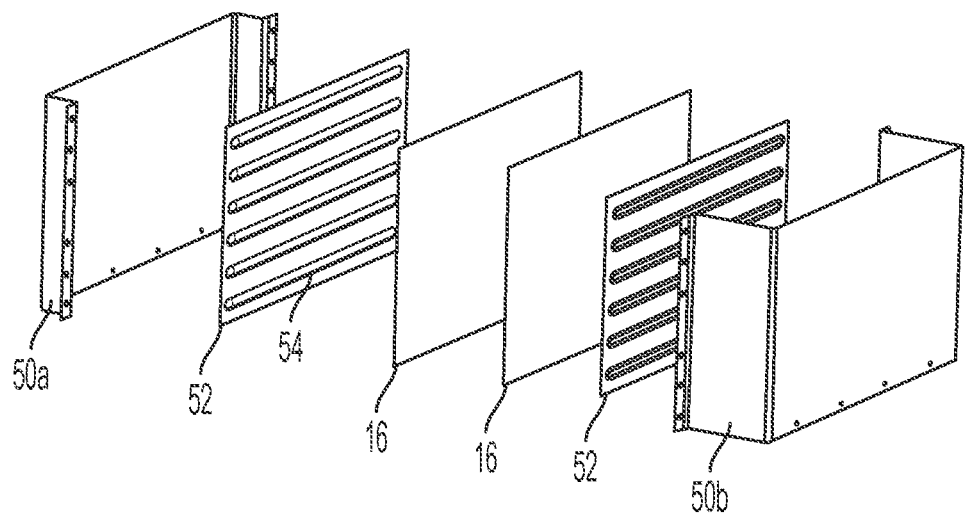
FIG. 24 is a schematic exploded view of one embodiment of a housing and other components contained therein.

FIG. 24 depicts an exploded view of an outer housing 50 of a CMA and/or battery pack as well as several interior plates used for applying pressures to the electrochemical cells during high-temperature operation where swelling of the electrochemical cells may occur due to increased gas generation from side reactions occurring in the cell that may occur more rapidly at higher temperatures and/or due to boiling of the electrolyte. As previously discussed, the assembly may include two opposing end plates 16 positioned on opposing front and back surfaces of the assembled electrochemical cell blocks, not depicted. The assembly may also include two or more opposing rigid plates 52 positioned on opposing sides of the assembly of the electrochemical cell blocks and rigid plates. Additionally, in this particular embodiment, the various components of the CMA are disposed between, and in some instances held in place by, first and second portions 50a and 50b of the outer housing that surround the noted components and are attached to each other along two flanges that extend along opposing sides of the outer housing. The flanges may be attached to each other in any appropriate fashion including for example, bolts, welds, brazing, interlocking mechanical features, adhesives, or using any other appropriate attachment method. Additionally, it should be understood that in some embodiments the outer housing may be made from a single unitary piece without the need to attach separate housing portions together. In such an embodiment, the electrochemical cells, heaters, heat distribution plates, rigid plates, and other components may simply be slid into place within the outer housing during assembly either prior to or after an encapsulation process.

In the above embodiment, the rigid plates have been depicted as including a plurality of ribs 54 that extend in a horizontal direction relative to a base of the CMA. The ridges may extend either partially and/or from one side to an opposing side of the rigid plates (i.e. completely across a face of the rigid plates). The use of the depicted ribs may increase a bending resistance of the plate and/or other component they are formed on which may reduce a deflection of the plate or component when subjected to the outwardly directed forces from electrochemical cell swelling. Without wishing to be bound by theory, reducing the amount of deflection experienced by the components within a battery during use may help to apply a more uniform pressure to the surfaces of the associated electrochemical cells sandwiched between the rigid plates and outer housing. Additionally, while horizontally arranged ribs have been depicted, in other embodiments, the ribs may be arranged in other orientations including, for example, a vertical orientation, and/or a plurality of ribs may be oriented in two or more directions to provide multiple directions of increased stiffness. Further, in certain embodiments the ribs are not used, and a thicker plate, and/or a stiffer material, is used to provide the desired amount of stiffness.

Figure 25:
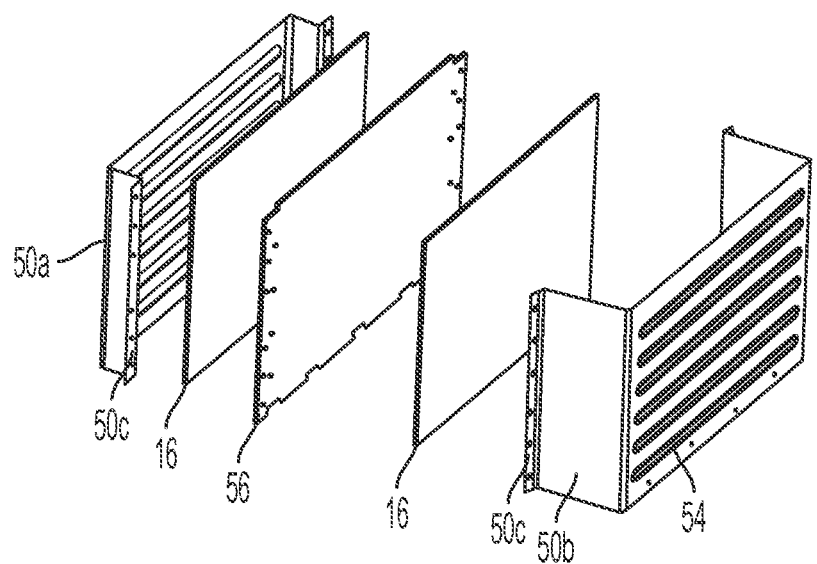
FIG. 25 is a schematic exploded view of another embodiment of a housing and other components contained therein.

FIG. 25 depicts another exploded view of an assembly including first and second portions of an outer housing that are attached to one another. The assembly also includes first and second opposing end plates 16 located on opposing faces of the electrochemical cellblock assembly as previously described. The assembly may also include one or more intermediate plates 56 located between two or more adjacent electrochemical cells, not depicted. While in some embodiments, an intermediate plate may simply be positioned between adjacent electrochemical cells, in the depicted embodiment, the intermediate plate 56 extends between, and is connected to, at least two opposing sides of a first and second portions of the outer housing 50a and 50b as described further below. Without wishing to be bound by theory, in some embodiments, the intermediate plates may help distribute and equalize pressures applied to electrochemical cells within the battery pack. In this particular embodiment, the need for separate rigid plates contained within the outer housing has been eliminated through the use of a thicker outer housing as well as the use of a plurality of ribs formed into the opposing surfaces of the housing oriented towards the flat faces of the associated electrochemical cells. Operation of such a battery pack is described further below.

Figure 26:
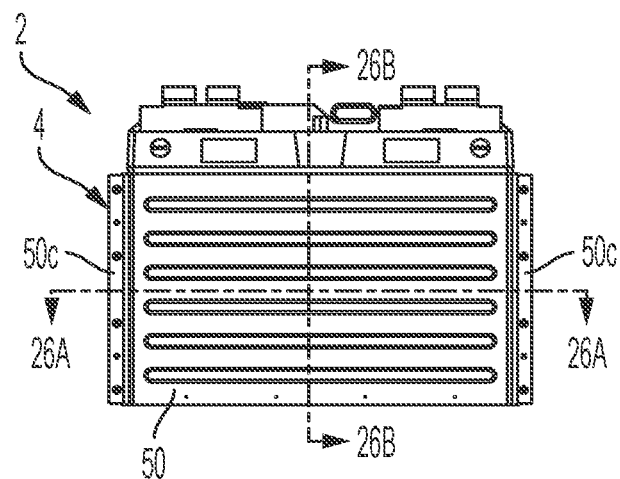
FIG. 26 is a schematic front view of an encapsulated CMA including an outer housing.
Figure 26A:
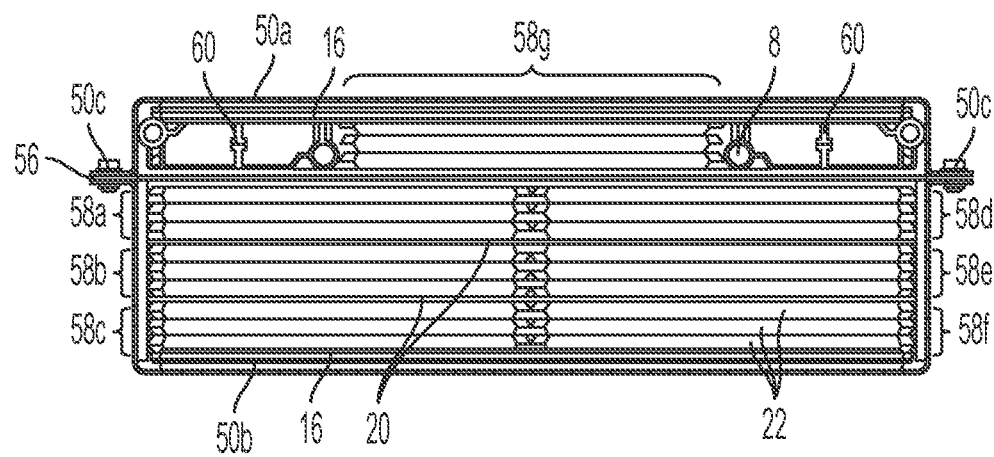
FIG. 26A is a schematic cross-sectional view of the encapsulated CMA of FIG. 26.
Figure 26B:
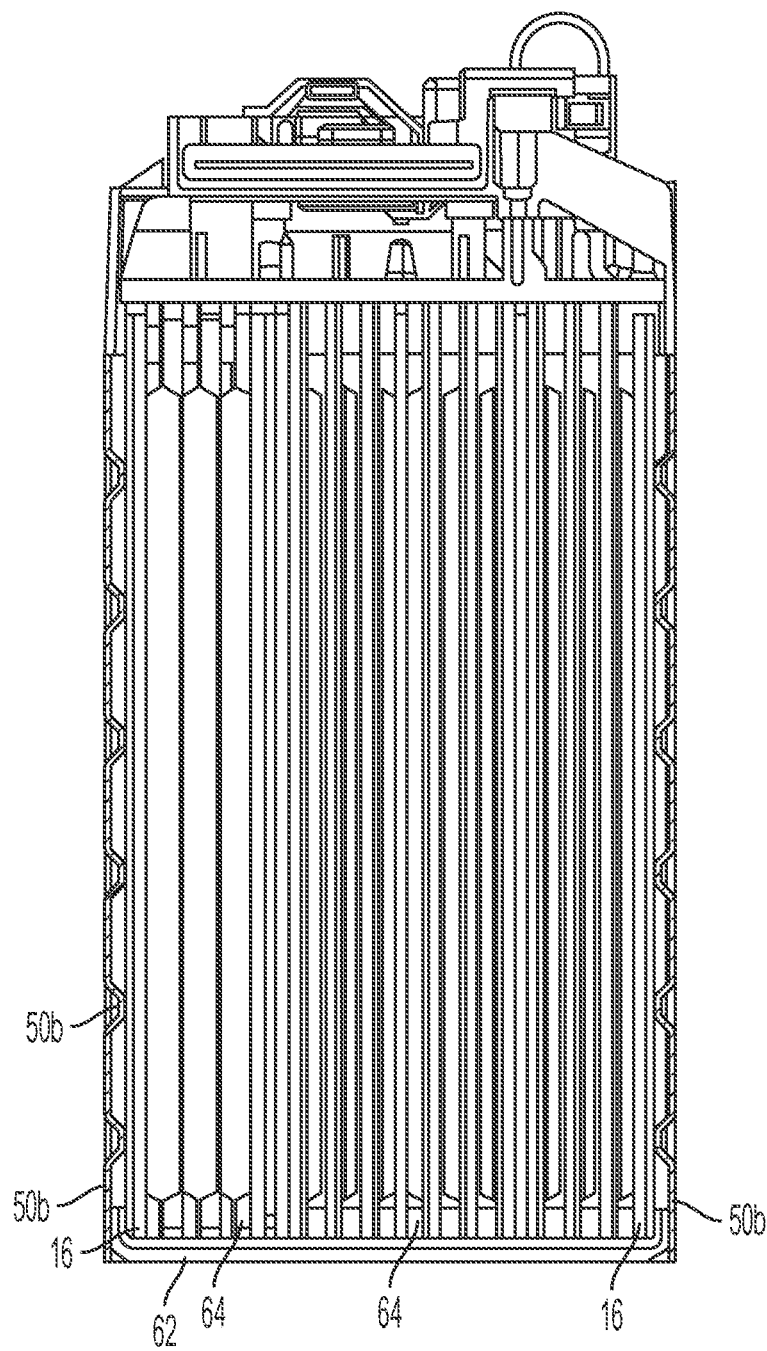
FIG. 26B is a schematic cross-sectional view of the encapsulated CMA of FIG. 26.
Figure 27:
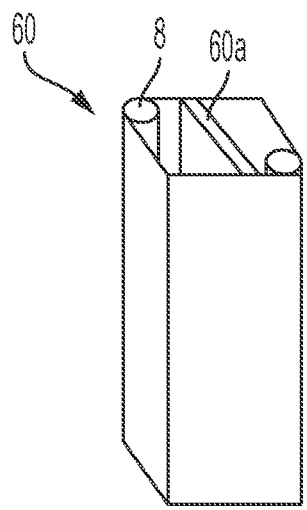
FIG. 27 is a schematic perspective view of a spacer block.

FIGS. 26-26B depict one embodiment of a battery pack 2 including an outer housing 50, along with the opposing end plates 16, and the one or more intermediate plates 56 described above with regards to FIG. 25. As best seen in the cross-section in FIG. 26A, this particular CMA includes seven blocks 58a-58g that are located in series with each block including three electrochemical cells 22 located in parallel which provides a nominal battery pack voltage of about 26 volts. Though it should be understood that any number of cell blocks in series may be used to provide any desired voltage. In this particular embodiment, six of the cell blocks 58a-58f are arranged within the outer housing in two or more stacks located side-by-side to one another where the cells of one cell block are located to the side of a corresponding cell of an adjacent cell block. This forms an arrangement of one or more complete rows of cells blocks within the CMA. Similar to the above-described embodiments, one or more heat distribution plates 20 as well as the associated heaters, foams, and/or other components may be located between the stacked cell blocks as well. The seventh cellblock 58g is stacked on the complete rows of cell blocks in an incomplete row within the outer housing. Once the cells blocks are appropriately arranged, the first and second portions 50a and 50b of the outer housing are attached to one another along flanges 50c so that they at least partially enclose the cell blocks and other components of the CMA within the outer housing.

Depending on the specific number of cell blocks used, it should be understood one or more cell blocks may be located in one or more incomplete rows of cell blocks that are stacked on one or more complete rows of cell blocks within the outer housing. Further, the cell blocks may be located at any position within an incomplete row. However, in some instances, it may be desirable to provide a uniform pressure to the cell blocks located within the complete rows as well as the cell blocks located in the incomplete row. Correspondingly, as previously described, the assembly may include one or more intermediate plates that function as pressure distribution plates. Specifically, in the depicted embodiment, an intermediate plate 56 is disposed between the portion of the housing including the seventh cell block and the portion of the housing including the other cell blocks with the cell blocks in the adjacent rows of cell blocks pressed either directly, or indirectly, against the intermediate plate. Further, the seventh cell block has been positioned within the incomplete row so that it is positioned at a middle of the row such that it is positioned equidistant from each of two opposing sides of the outer housing located to the sides of the cell blocks. Accordingly, the cell blocks within the complete rows transfer a pressure to the one or more cell blocks in the incomplete row through the intermediate plate, which due to its rigidity applies a substantially uniform pressure to the one or more cell blocks in the incomplete row. Thus, the intermediate plate may function as a pressure distribution plate in such an embodiment. Without wishing to be bound by theory, positioning the seventh cell block along the centerline of the outer housing between the two stacks of cell blocks in the complete rows may help to apply a more equal pressure across a face of the seventh cell block as well. However, in other embodiments, the cellblock need not be centered within the housing.

Applying uniform pressures to the different electrochemical cells in a CMA may help to extend a useful life of the CMA. Therefore, in some instances, it may be desirable to limit the amount of deflection the various components within a battery pack and/or CMA experience when pressures are applied to them. Accordingly, in some embodiments, surfaces of the above described outer housing, one or more rigid plates, an intermediate plate, and/or any other appropriate component oriented towards a flat face of a prismatic or pouch electrochemical cell within a battery and/or CMA may experience a deflection that is less than or equal to 5%, 4%, 3%, 2%, 1%, or any other appropriate percentage of a maximum dimension of a portion of the structure oriented towards an opposing flat surface of the cells when the structure is subjected to pressures between or equal to 5 pounds per square inch (psi) and 10 psi. For example, in one specific embodiment, a rigid plate, face of an outer housing, intermediate plate, or other structure, having an area between or equal to 90 square inches (in$^2$) and 150 in$^2$, 100 in$^2$ and 130 in$^2$, or other appropriate area may deflect less than 10 mm, 5 mm, 1 mm, or any other appropriate distance when subjected to a pressure between or equal to 5 psi and 10 psi. While particular ranges of deflections, areas, and pressures have been described above, in other embodiments, a battery pack may include components that experience any other amount of deflection due to battery swelling during normal use and/or use at elevated temperatures.

In certain embodiments, in addition to providing uniform pressures across the faces one or more cells within a cell module assembly, an intermediate plate 56, as depicted in FIGS. 25 and 26A may function to stiffen an outer enclosure or housing of a cell module assembly. For example, as described above, the intermediate plate 56 may extend between, and is attached to at least two opposing sides of the CMA housing formed by the first and second portions 50a and 50b of the outer housing. Specifically, as depicted in the figure, the intermediate plate is sandwiched between the two flanges 50c located on opposing sides of the first and second portions of the housing, though in other embodiments the intermediate plate can be attached at different locations and/or different ways to the housing. In either case, the intermediate plate may help to stiffen the closure by resisting displacement and/or deformation of the portion of the housing it is attached to. For example, when the cells within a CMA swell, the outwardly directed faces of the housing may experience an increased outwards force which may cause the side walls of the housing to deflect inwards towards an interior of the CMA. This correspondingly places the one or more intermediate plates located between the two opposing faces of the CMA housing into a compressive state that resists this deflection of the sidewalls of the housing. Correspondingly, the one or more intermediate plates may be constructed from a material and have appropriate dimensions such that it is capable of supporting these applied loads during use without buckling, plastically deforming, and/or experiencing excessive deformation.

While a flanged connection to two opposing sides of a CMA housing has been depicted in the figures and discussed above, it should be understood that any appropriate type of connection and or any appropriate arrangement of an intermediate plate relative to the different sides of a housing may be used to stiffen a CMA housing. Further, while one or more intermediate plates have been illustrated, other types of stiffening mechanisms to limit the amount of relative movement between opposing sides of the housing may be used including, but not limited to, struts, bolted connections, rods, braces, cross pieces, and/or any other appropriate type of support that extends between and is connected to two or more opposing sides of a CMA housing while being capable of supporting compressive and/or tensile loads to resist deformation of the associated portions of the CMA housing.

In some embodiments, it may be desirable to help maintain a position of one or more cell blocks located in an incomplete row of cell blocks. Correspondingly, as depicted in FIG. 26A, one or more spacer blocks may be located in an incomplete row of electrochemical cells stacked on, or between, one or more complete rows of electrochemical cells. For example, two spacer blocks 60 located on either side of one or more cell blocks contained in an incomplete row, such as the seventh cell block 58g, which may help maintain the one or more cell blocks in a desired position, such as in a middle of the outer housing where the cell block is located equal distance between two opposing sides of the outer housing. In such an arrangement, a width of the one or more spacer blocks may be selected to fill a space between the electrochemical cells and a corresponding side of the outer housing to maintain the cell block position. Additionally, a thickness of the one or more spacer blocks may be selected so that the spacer blocks extend between the outer housing, or an associated rigid plate as discussed above, and the intermediate plate. Accordingly, pressure may be transmitted from the other associated cell blocks through the intermediate plate to the one or more cell blocks and spacer blocks located in the incomplete cell block row. To help equalize a pressure applied to the spacer blocks and the corresponding flat face of the electrochemical cells, a compliance of the spacer blocks may be substantially equal to that of the cell blocks. For example, a compliance of the spacer blocks may be within 10%, 20%, 30%, or any other appropriate percentage of the compliance of the associated cell blocks.

The above described spacer blocks may have any appropriate construction including solid constructions, frames, tubes, interlocking components, I beams, or any other structure suitable for locating a cell block and/or electrochemical cell within a housing. For example, the embodiment depicted in FIGS. 26A and 27 correspond to a hollow rectangular tube that extends from a bottom surface of the CMA to the opposing top surface of the CMA. The tube may also include one or more reinforcing structures 60a such as a strut, brace, cross beam, wall, or other appropriate structure extending between opposing faces of the tube. In other embodiments, any other suitable types of reinforcing structures may also be used.

In some embodiments, the above described battery pack 2 and/or encapsulated cell module assembly 4 may include an encapsulant tube receiver 40 formed in a portion of the BMU housing 6 as previously described, see FIG. 20. Therefore, similar to the prior embodiments, an encapsulation material, such as an appropriate polymeric resin, may be injected into an encapsulant tube in fluid communication with the encapsulant tube receiver. Referring to FIGS. 26-29, to help simplify a CMA manufacturing process, an encapsulant tube 8 may be integrated with the one or more spacer blocks 60 located within the encapsulated CMA 4, and this tube may be placed in fluid communication with the encapsulant tube receiver in any appropriate way. As also shown in the figures, in some embodiments, one or more encapsulant tubes may be integrally formed at two opposing corners of the spacer blocks and extend from a top to a bottom of the spacer block to provide an encapsulant flow path extending from a top of the encapsulated CMA 4 to an opposing bottom side of the CMA. Therefore, injected encapsulant may flow through the encapsulant tube receiver into the associated encapsulant tube formed in the spacer block to an opposing bottom surface of the encapsulated CMA 4 adjacent to a tray 62 the electrochemical cells are disposed on where the tray is sealed to a bottom of the outer housing 50. Similar to the BMU housing 6, the tray may be sealed to the outer housing in any appropriate way. Once the encapsulant is injected the interior space of the encapsulated CMA 4, the encapsulant may flow out of the encapsulant tube and then in a reverse direction towards a top of the CMA as previously described.

Figure 28:
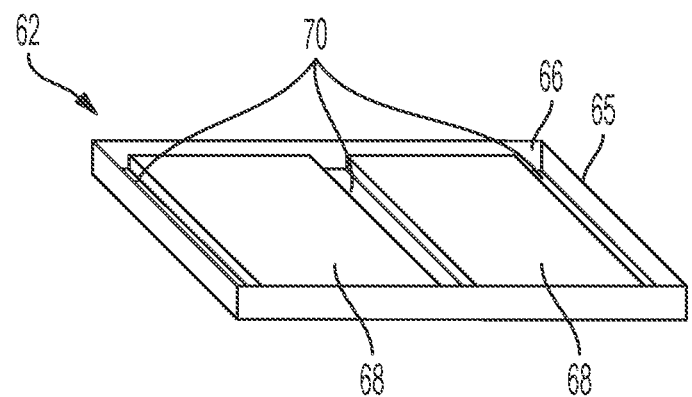
FIG. 28 is a schematic perspective view of a tray.
Figure 29:
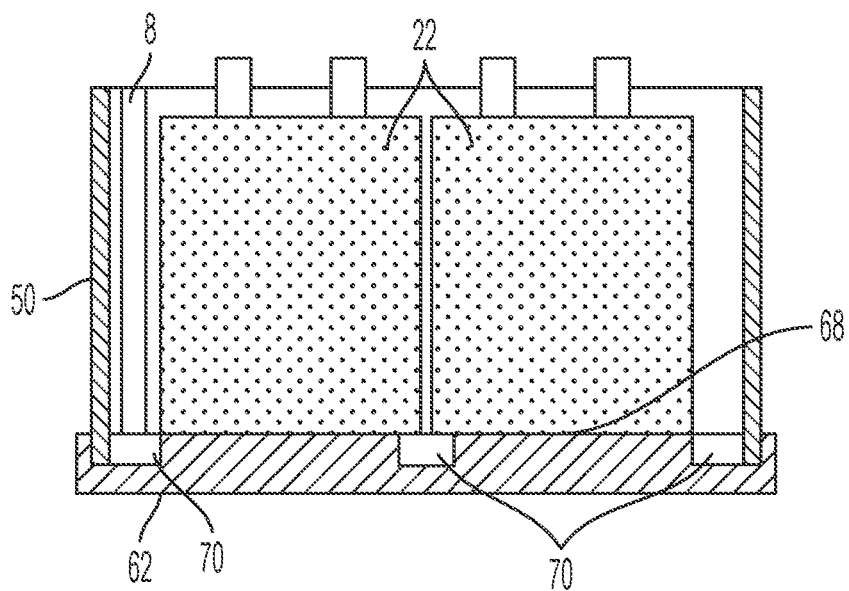
FIG. 29 is a schematic cross-sectional view of an encapsulated CMA within an exterior housing and disposed on a tray.

To facilitate the distribution of encapsulant throughout a CMA and/or battery pack during an encapsulation process, a tray on which the electrochemical cells are disposed may include one or more features formed therein that help to guide a flow of encapsulant from one location within the CMA to another location within the CMA. As illustrated in FIGS. 28 and 29, a tray may a lip 65 forming an upper outer edge of the tray to define a recessed cavity 66 within the tray. The recessed cavity may include one or more raised support surfaces 68 that support the one or more cell blocks in one or more stacked rows. For example, in the depicted embodiment, the two stacks of electrochemical cells 22 are disposed on two adjacent raised support surfaces 68. The tray may also include one or more grooves 70 that are positioned adjacent to, and in some instances between, the one or more raised support surfaces. The grooves 70 extend downwards below a top surface of the raised support surfaces on which the electrochemical cells are disposed. Depending on the particular embodiment, the grooves 70 may also extend at least partially across the tray, and in some embodiments from one side or lip to an opposing side or lip of the tray. As shown in FIG. 26B, the pouch cells corresponding to the illustrated electrochemical cells 22 may include a gap 64 between bottom portions of the electrochemical cells and the tray support surfaces. These gaps extend in a different direction than the grooves 70. Specifically, in the depicted embodiment, the gaps extend in a direction that is substantially orthogonal to the grooves 70. As best shown in FIG. 29, an encapsulant tube 8, which may be integrated with a spacer block as noted above, may also be aligned with a portion of one of the grooves 70.

Again referring to FIG. 29, during an encapsulation process, encapsulant may be injected into the encapsulant tube 8 using any appropriate arrangement including the above-described encapsulant tube receptacle formed in a BMU housing, not depicted. The encapsulant flows through the tube into the corresponding groove 70 formed in the tray. As the encapsulant flows outwards from the tube, it fills the tray and begins to fill the space between the electrochemical cells and an adjacent electrochemical cell and/or the outer housing 50 depending on the particular location of the tube within the CMA assembly. Simultaneously, the encapsulant may also flow through the gaps 64 disposed between the bottoms of the electrochemical cells 22 and tray towards the next groove formed in the tray. The encapsulant may then begin to fill this groove as well as the space between the adjacent electrochemical cells. This process may continue until the encapsulation process has been completed. Thus, the presence of these grooves in the tray and gaps between the tray and electrochemical cells may help to aid in distributing encapsulant across a width and thickness of the CMA assembly as the encapsulant is filled into the volume contained by the outer housing and tray.

While grooves extending in only one direction have been depicted in the figures and described above, in certain embodiments, a plurality of grooves extending in two or more directions along an interior surface of a tray to facilitate distribution of an encapsulant within a CMA are provided. This may be of benefit in embodiments, for example, where there is little, or no, gap located between the bottoms of the electrochemical cells and the one or more surfaces of the tray supporting the electrochemical cells. Additionally, while the CMA has been depicted as being encapsulated while located within an outer housing, in other embodiments, the CMA is encapsulated and subsequently placed into a separate rigid outer housing.

Depending on the particular embodiment, the above described encapsulant may either fully encapsulate the electrochemical cells and associated plates, heaters, foam, and/or other structures, or the CMA may only be partially encapsulated. For instance, in the embodiments depicted in FIGS. 26-26B, 28, and 29, the encapsulant may be located between a side of the housing and an exterior side edge of the stacks of the electrochemical cells. The encapsulant may also partially encapsulate the bottom and/or top edges of the electrochemical cells. However, in instances where flat rigid plates, and/or a flat rigid outer housing have been used, the encapsulant may not be present between the flat surfaces of the electrochemical cells and the corresponding rigid plates, end plates, and/or outer housing that the electrochemical cells are disposed between. Of course in embodiments in which one or more of these components include ribs or other structures to increase their rigidity, the encapsulant may be located in between structures including the noted ribs. It should also be noted that one or more spacers as described above may be located between the outer housing and the electrochemical cells and/or any other appropriate component of the battery pack to permit encapsulate to flow into a desired location during an encapsulation process.

Figure 30:
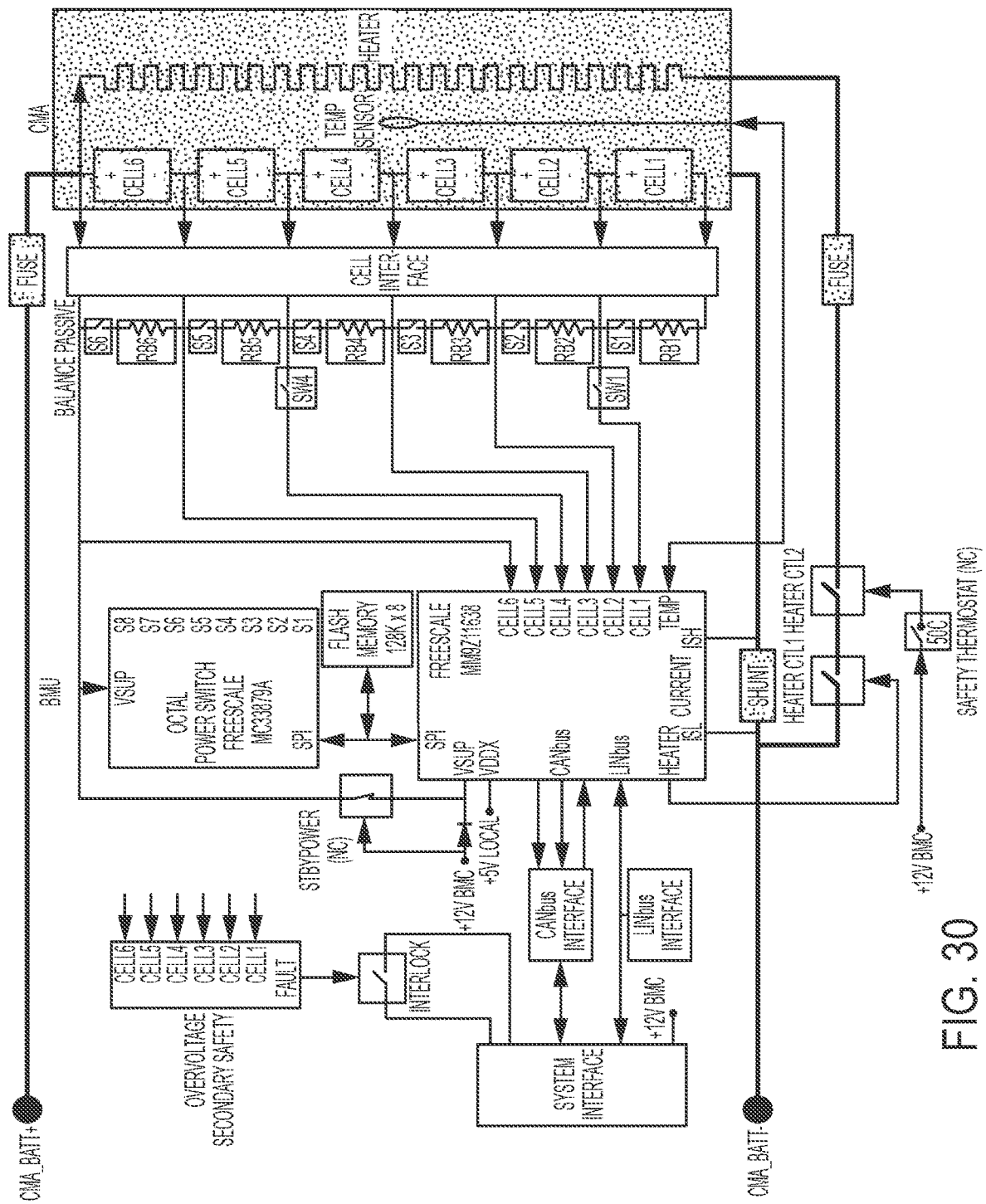
FIG. 30 is a block diagram representation of a BMU and associated CMA.
Figure 31A:
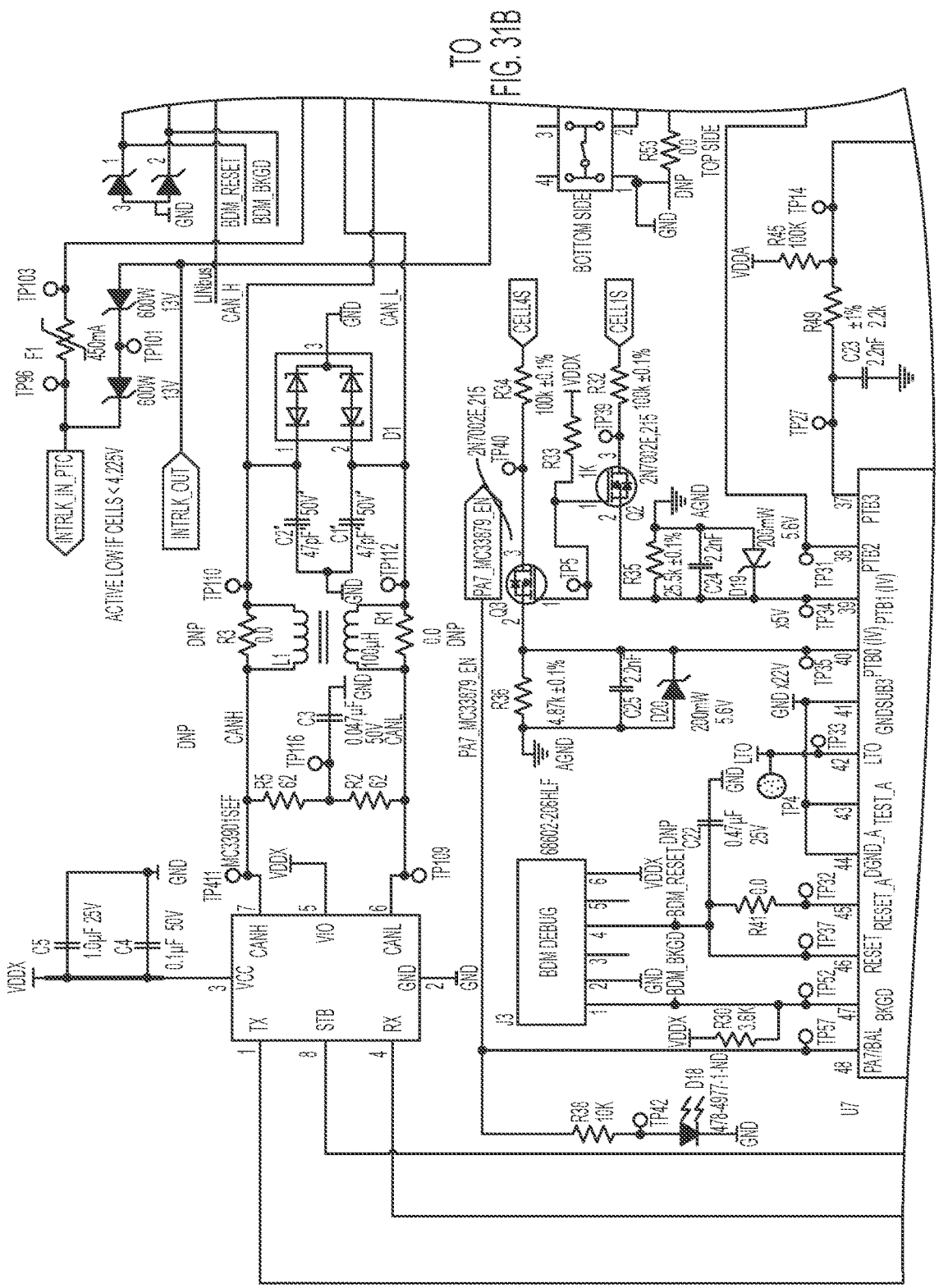
Figure 31C:
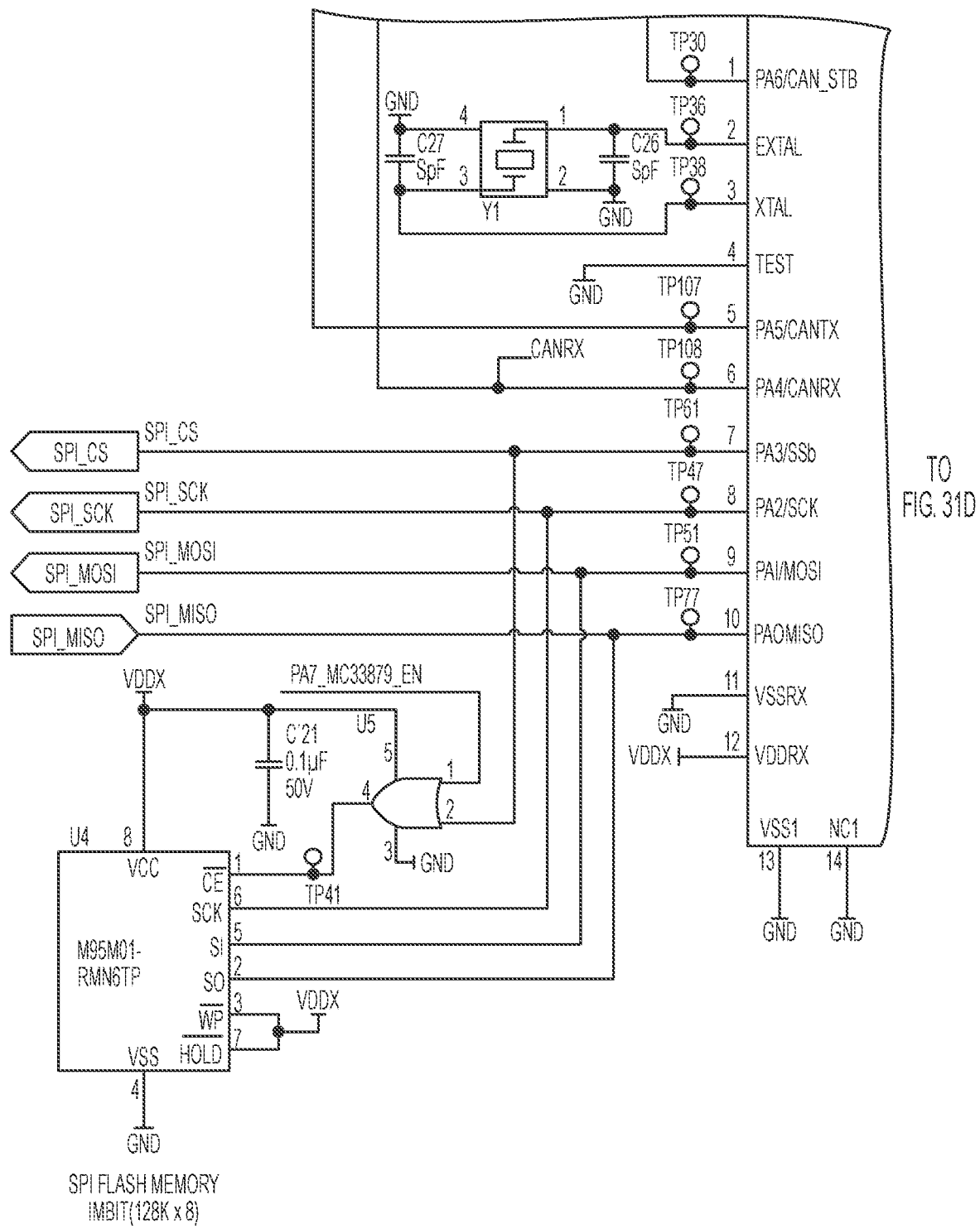
Figure 31D:
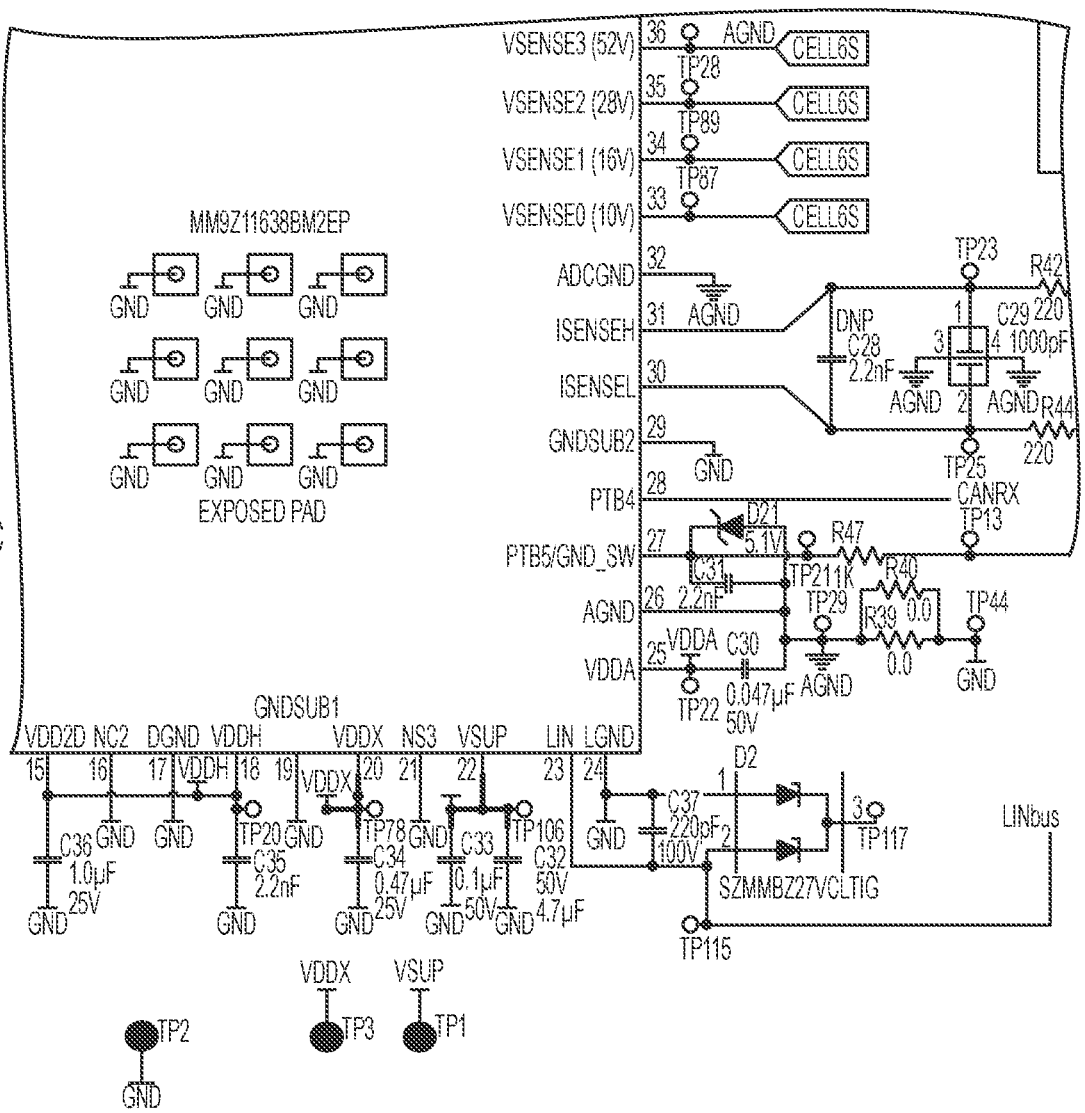
Figure 32A:
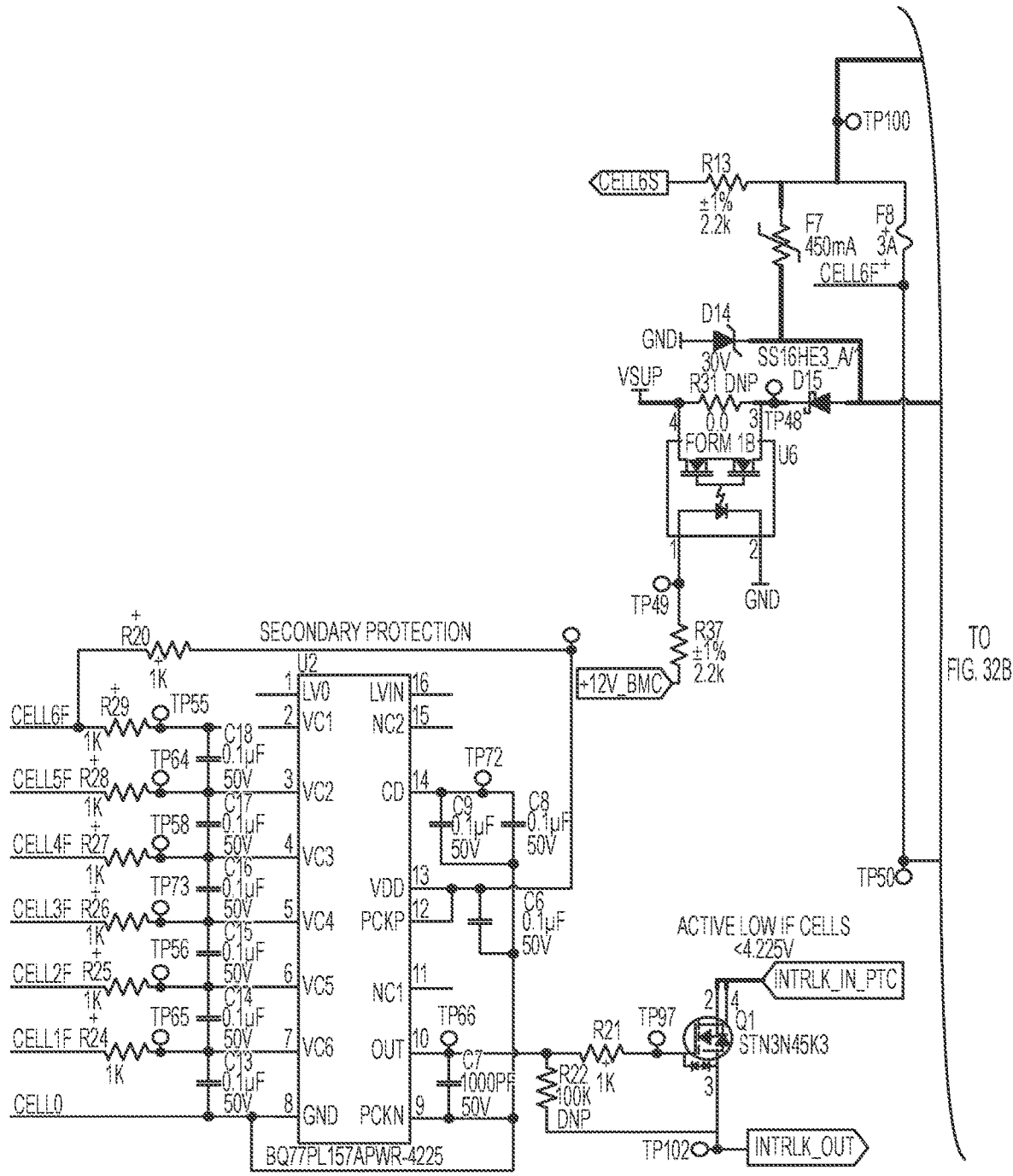
FIGS. 32A-32C are a schematic of an electrical system including Cell Connection, Balance Control, Seconday Overvoltage, and Power Supply switch over circuits.
Figure 32B:
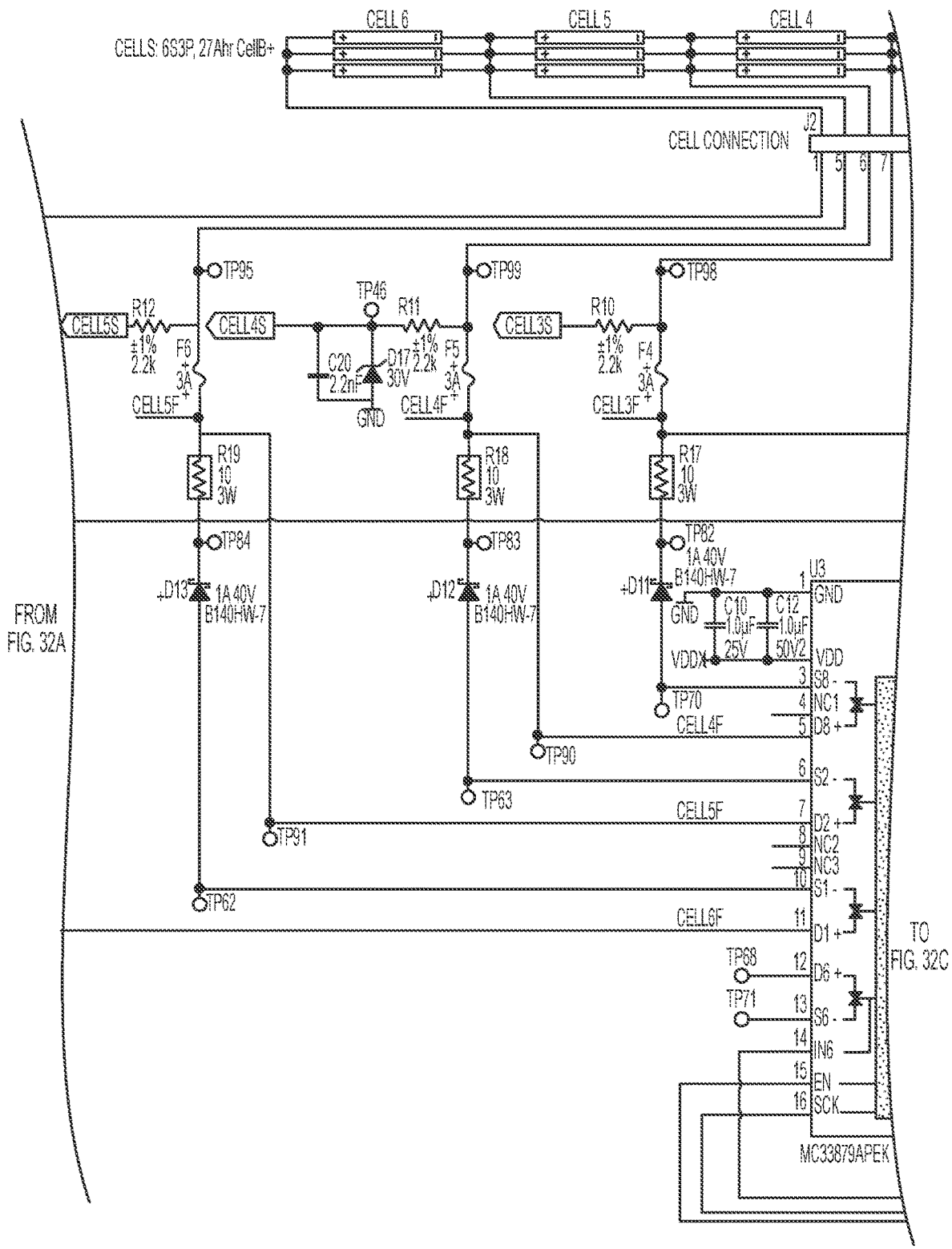
Figure 32C:
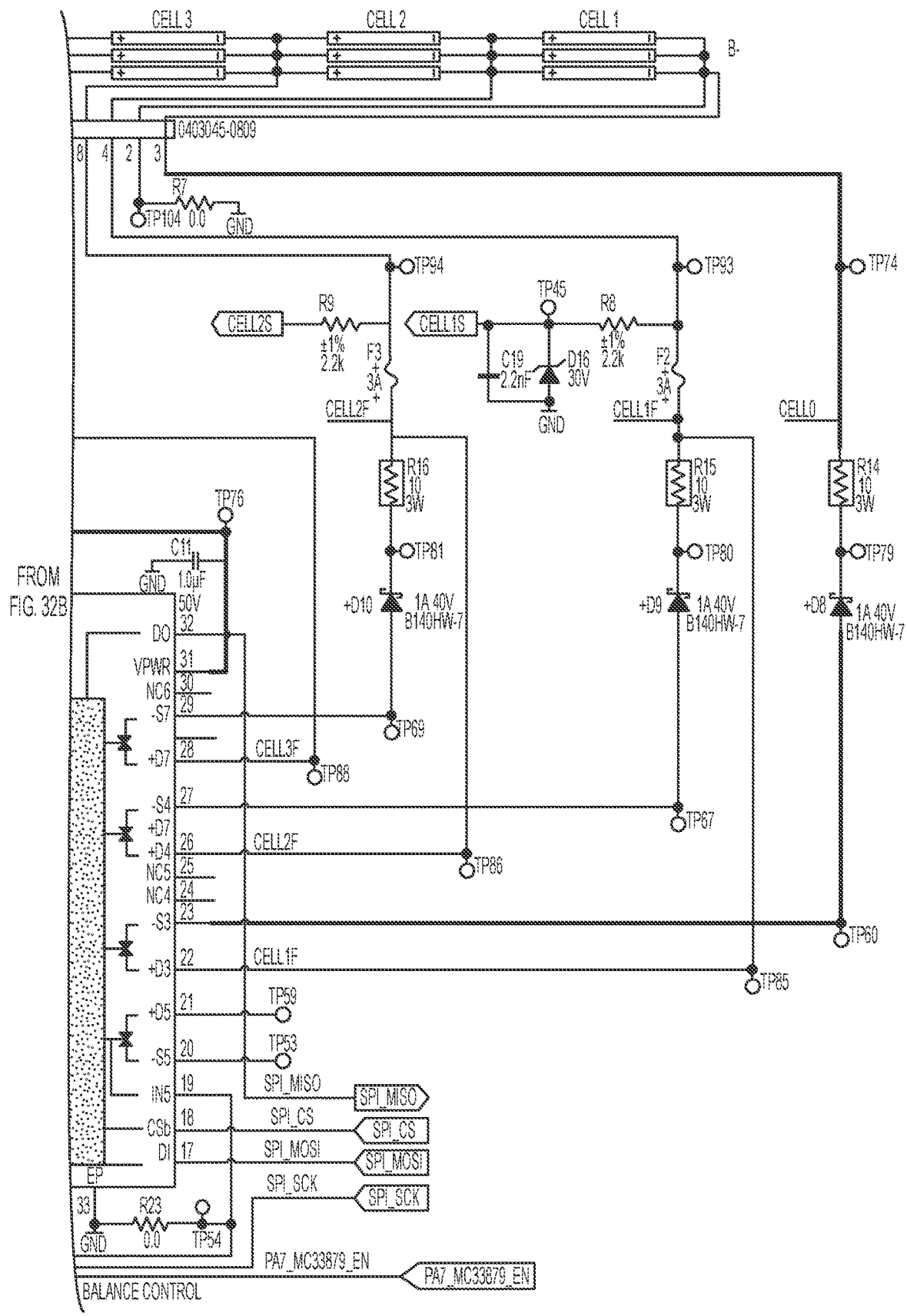

FIG. 30 shows one embodiment of the relationship between a BMU, an associated primary encapsulated CMA, and an interface to a system BMC. It should be noted that FIG. 30 is the block diagram representation of the more detailed full schematics shown in FIGS. 31 and 32. However, all of these figures show the circuits that the BMU of FIG. 30 uses to measure the CMA's individual cell voltages, the current, temperature, control cell balancing, and control the integrated CMA heater. In this embodiment, the measurements are made using a MM9Z1_638 battery sensor running a custom flash software program. The BMU also includes a current SHUNT that is used to coulomb count the energy flowing into and out of the battery module for performing current measurements. In some embodiments, the CMA's state of charge (SOC) may be derived from a combination of individual cell voltage, coulomb count, and/or temperature.

In the depicted embodiment, measurements and/or calculations performed by the BMU are sent over a LINbus physical layer communication interface using an addressed listener-talker protocol. The system is designed to have up to two (2) CMA BMUs. The BMUs are always in a listener mode and only respond to system BMC commands targeted to a specific BMU's address. A factory option provision allows the BMU to communicate via the CANbus if the system application requires. This communication is connected to the system via the SYSTEM INTERFACE block. In certain embodiments, active mode BMU's and/or battery packs include more than 2 CMA BMU's. Additionally, while specific methods for establishing electrical communication between a CMA, BMU, and BMC are described above, in other embodiments, any other appropriate methods including local and/or area network communication link can be employed.

Figure 33:
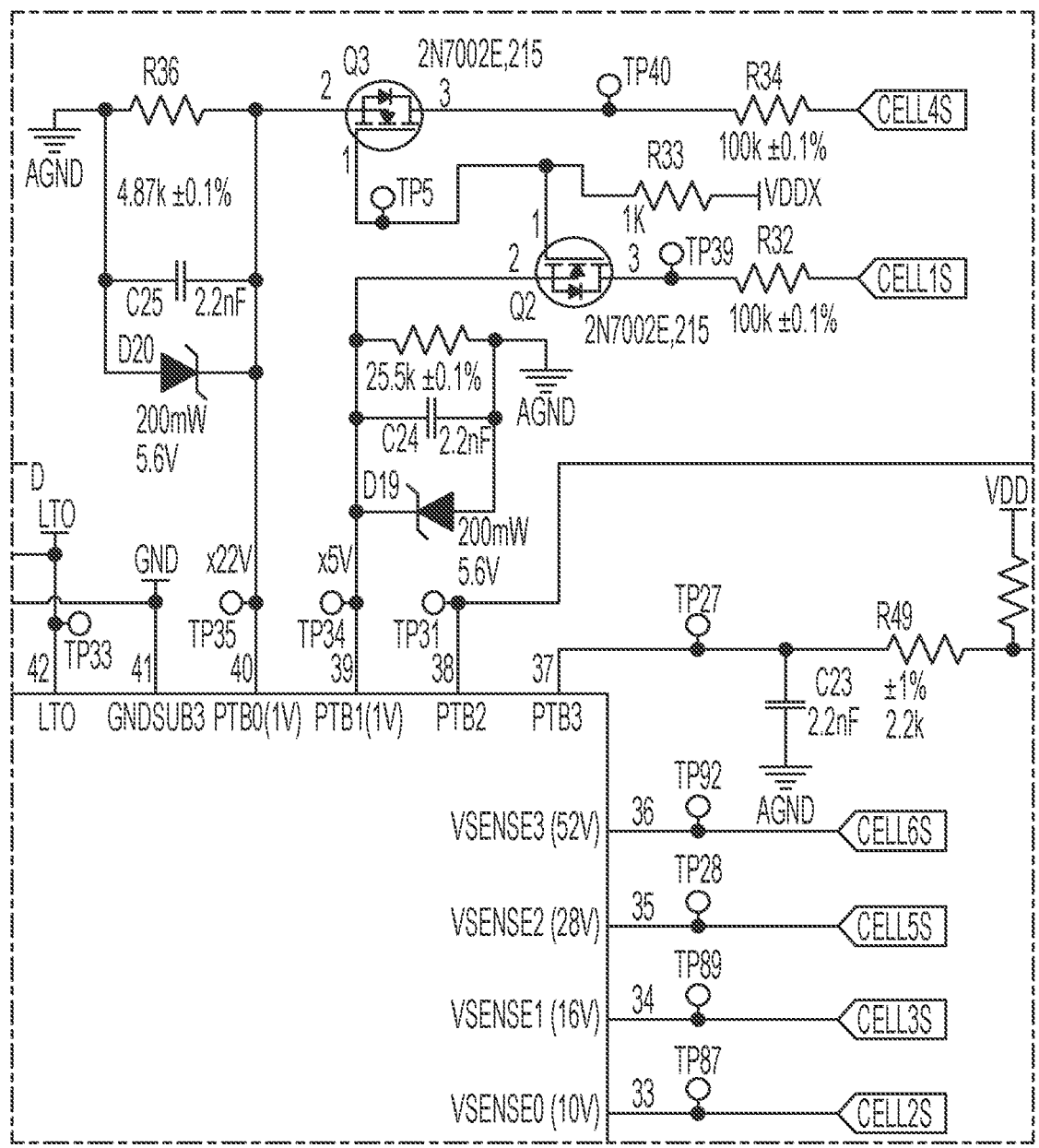
FIG. 33 is a schematic of the circuits used to expand cell voltage sensing from four cells to six cells for a four cell BMU.
Figure 35:
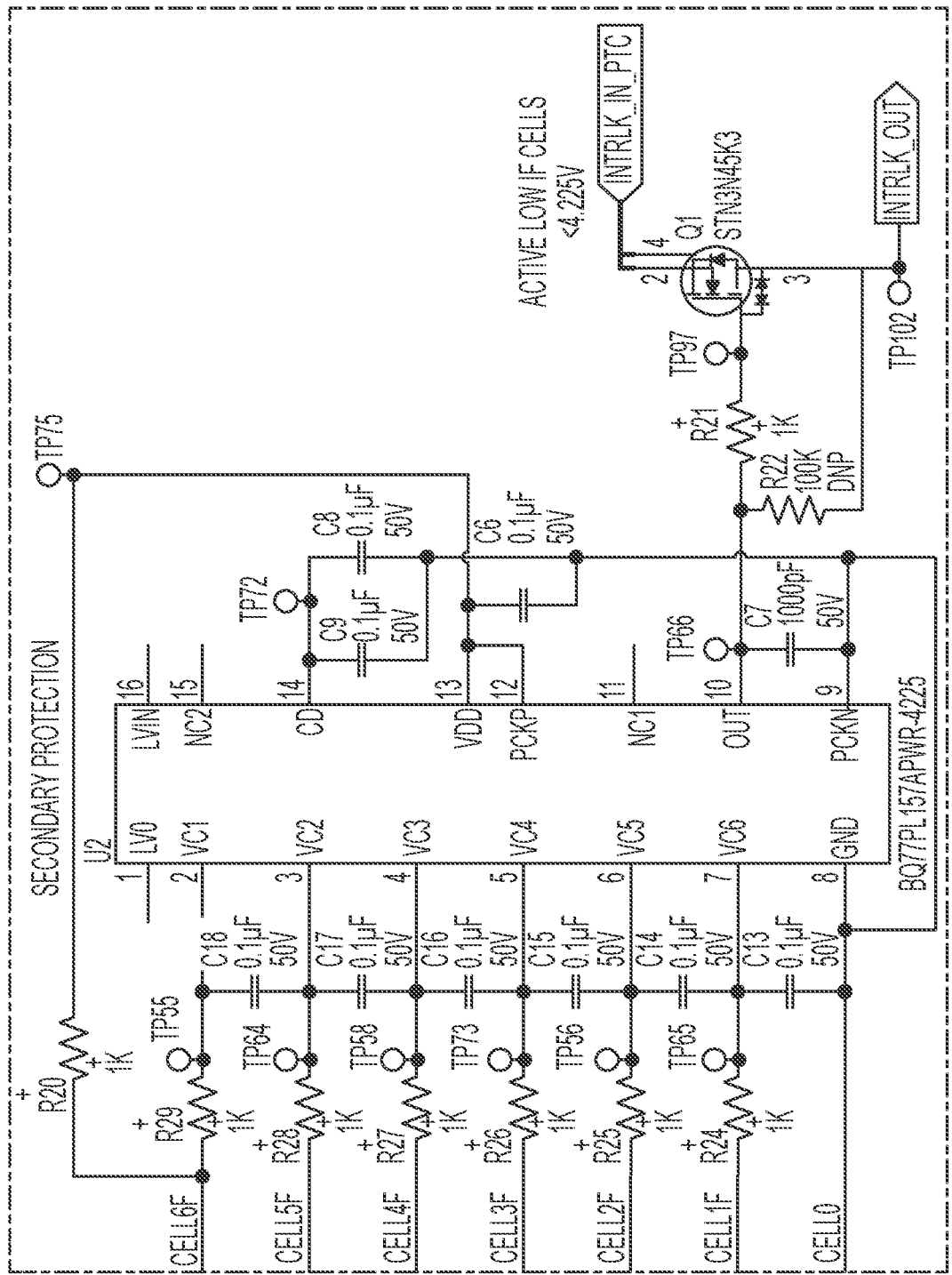
FIG. 35 is a schematic of a Secondary Overvoltage Protection and interlock function.

As noted previously, in some embodiments, a BMU may include a Secondary Overvoltage protection circuit as shown by the Overvoltage Secondary Safety block that works outside the control of an on board microcontroller (MCU) battery controller to control a daisy-chained interlock MOSFET switch, see FIGS. 33 and 35. As seen in these figures, the Overvoltage Secondary Safety controls the daisy-chain Interlock to the system via the SYSTEM INTERFACE block. This is more clearly shown in FIG. 35. Specifically, FIG. 35 shows a Secondary Overvoltage Protection circuit using 6 cell overvoltage supervisory integrated circuit U2. In some instances, the overvoltage supervisory integrated circuit may be configured to monitor the overvoltage condition of lithium-ion cells, though embodiments in which different types of cells are used are also envisioned. In the depicted embodiment, if any of the voltage sense inputs (CELL1 to CELL6) rise above a threshold voltage, such as 4.225V, the output OUT (U2 pin 10) will be driven to second voltage threshold, such as 0V, turning off the interlock MOSFET Q1. When the interlock MOSFET Q1 is off it will interrupt the system interlock daisy-chain, providing an alternate communication signal to the system to indicate a cell, or cells, are overcharged. The system will react to this signal by preventing any current from flowing into the battery module until the overcharged cell voltage is reduced by discharging the battery module.

In some applications it may also be desirable for a BMU to include some form of cell balancing to reduce voltage imbalances between cells located in series and/or parallel. While any number of different balancing schemes may be used, one exemplary balancing scheme is illustrated in FIG. 30. In the depicted embodiment, the BMU includes a cell PASSIVE BALANCE function using an OCTAL POWER SWITCH to apply 10 ohm cell load resistors (RB1-RB6) selectively in order to equalize each cells state of charge relative to the other cells.

In some instances it may be desirable to expand the number cells from which a BMU takes voltage measurements. For example, in certain embodiments, additional analog MCU ports may be used to measure additional cell voltages after a resistance divider reduces the signal to an acceptable input port voltage range. The addition of voltage gating in the illustrated embodiment is provided by additional MOSFETs. FIG. 33 shows one embodiment of a circuit that adds the two additional cell voltage measurements to a BMU that is configured to measure 4 cells using circuits associated with two auxiliary input channels. In the depicted embodiment, two N-Channel MOSFETs (Q2 and Q3) were added to prevent battery current leakage into the MM9Z1_638 MCU during sleep mode. When the MCU enters sleep the +5V supply (Vddx) drops to 0V, the MOSFETs are turned off because the Gate-Source is now 0V. With the MOSFETs open, no leakage can flow into the MCU unpowered analog port pins PTB0 and PTB1. When the MCU is active (Vddx=+5V), each MOSFET's Source-Drain channel are in a low resistance state allowing the resistive divider pairs (R34, R36 and R32, R35) to reduce the sensed battery cell voltages (CELL4S and CELL3S) to within the 1V maximum input range of the analog port. CELL4S is divided down by 22 thus providing a voltage measurement range up to 22V. CELL1S is divided down by 5 thus providing a voltage measurement range up to 5V. These secondary circuits associated with the auxiliary inputs in certain embodiments may be configured to both accept and output different voltages within any suitable voltage range.

Figure 34:
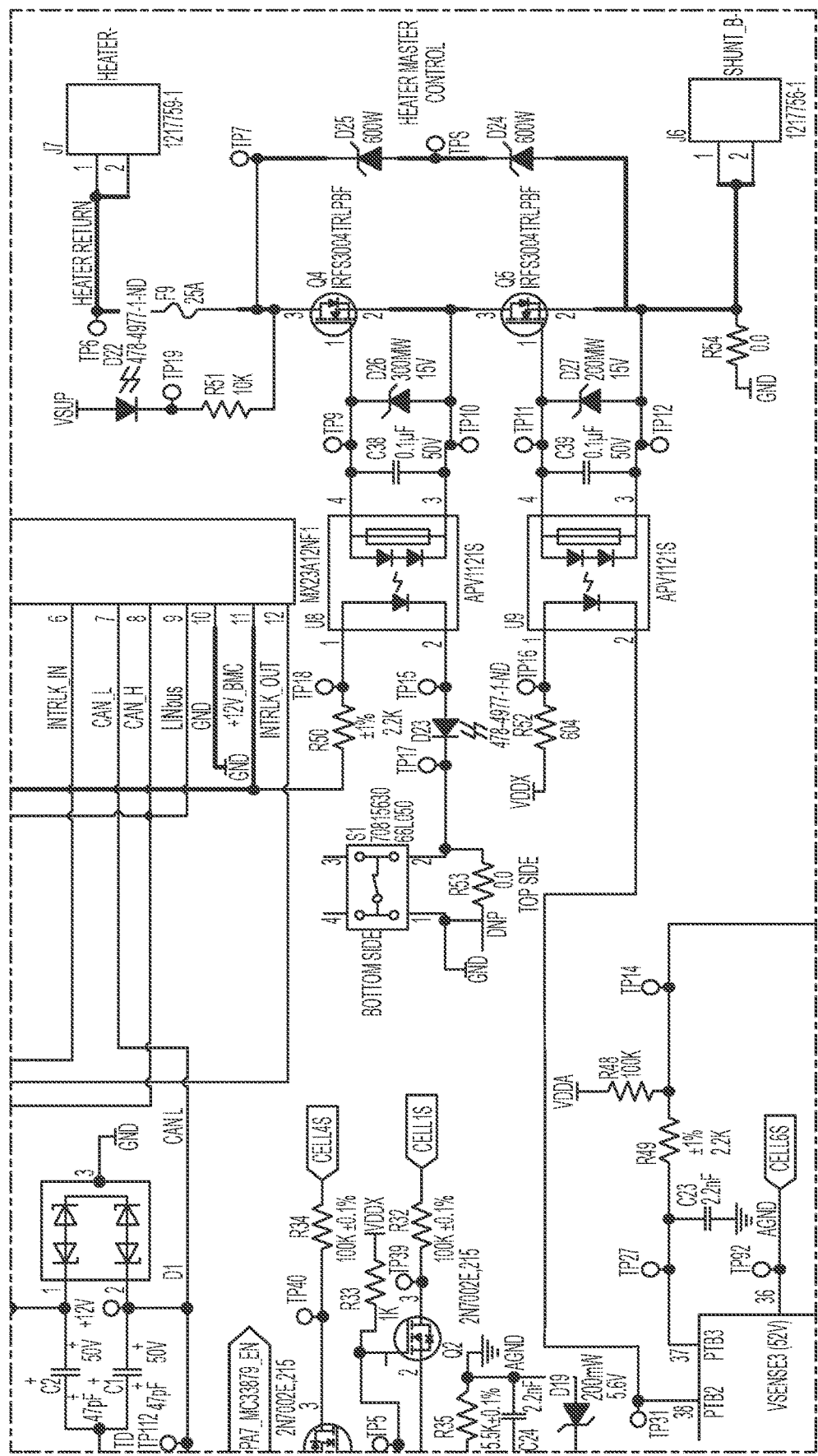
FIG. 34 is a schematic of a CMA heater control.

To heat the battery module, a single point failure protection heater control circuit may be added to a BMU in some embodiments. In certain such embodiments, the heater may be controlled by at least one, two or all of at least three mechanisms including, but not limited to: a MCU, an External System 12V, and Thermostat as shown in the figures. This type of redundant heater control system may help to reduce, or even greatly reduce in certain cases, the probability that a failure of the heater control circuit would over heat or over discharge the battery. FIG. 34 shows the details of one such embodiment of a single point failure protection heater control circuit. Power MOSFETs Q4 and Q5 provide a switchable 25 A current path for the heater. In one exemplary configuration, the heater's maximum current varies with temperature from 18 A at 22° C. to 22A at −30° C. Inside the primary encapsulated CMA, six parallel two terminal heaters are connected to the most positive voltage (Cell6). The other end of the parallel heater connection is brought out of the primary encapsulating compound to connect to the HEATER-(J6) quick-disconnect PCB mounted terminal. Through this connection, the heater current passes through a 25 A fuse (F9) and then through the Q4 and Q5 MOSFET switches. When Q4 and Q5 are activated, this completes the heater current circuit by connecting to the SHUNT B-(J7) to the outside terminal after the current shunt. Connecting to the output terminal allows the heater current to be measured and coulomb counted so heating can be taken into account when evaluating various battery properties such as SOC calculations. The Q4 and Q5 MOSFET switches are each controlled by photo voltaic MOSFET driver devices U8 and U9 which present a voltage (8V) between the MOSFETs Source and Gate when activated. A small current (5 mA) passing through the respective input photo diode activates the photo voltaic outputs of U8 and U9. U9 controls the on state of Q5 under the control of the MCU output pin PTB2. U8 controls the on state of Q4 under the control of both the system active power state (+12V_BMC) and the bottom PCB mounted bi-metallic thermostat that has a threshold temperature of an associated CMA below which the thermostat's contact remains closed allowing the Q4 to be controlled by the system power state. Further, when the CMA is above the threshold temperature, the thermostat will open, effectively not allowing the heater to be turned on. In one embodiment, a thermostat may have a threshold temperature that is between or equal to 40° C. and 50° C., and in some embodiments may be 45° C. In view of the above, it should be appreciated that having two heater switches in series may help to mitigate, and/or prevent, the possibility of a single point failure from overheating or over discharging a battery module including a heater or heaters.

Figure 36:
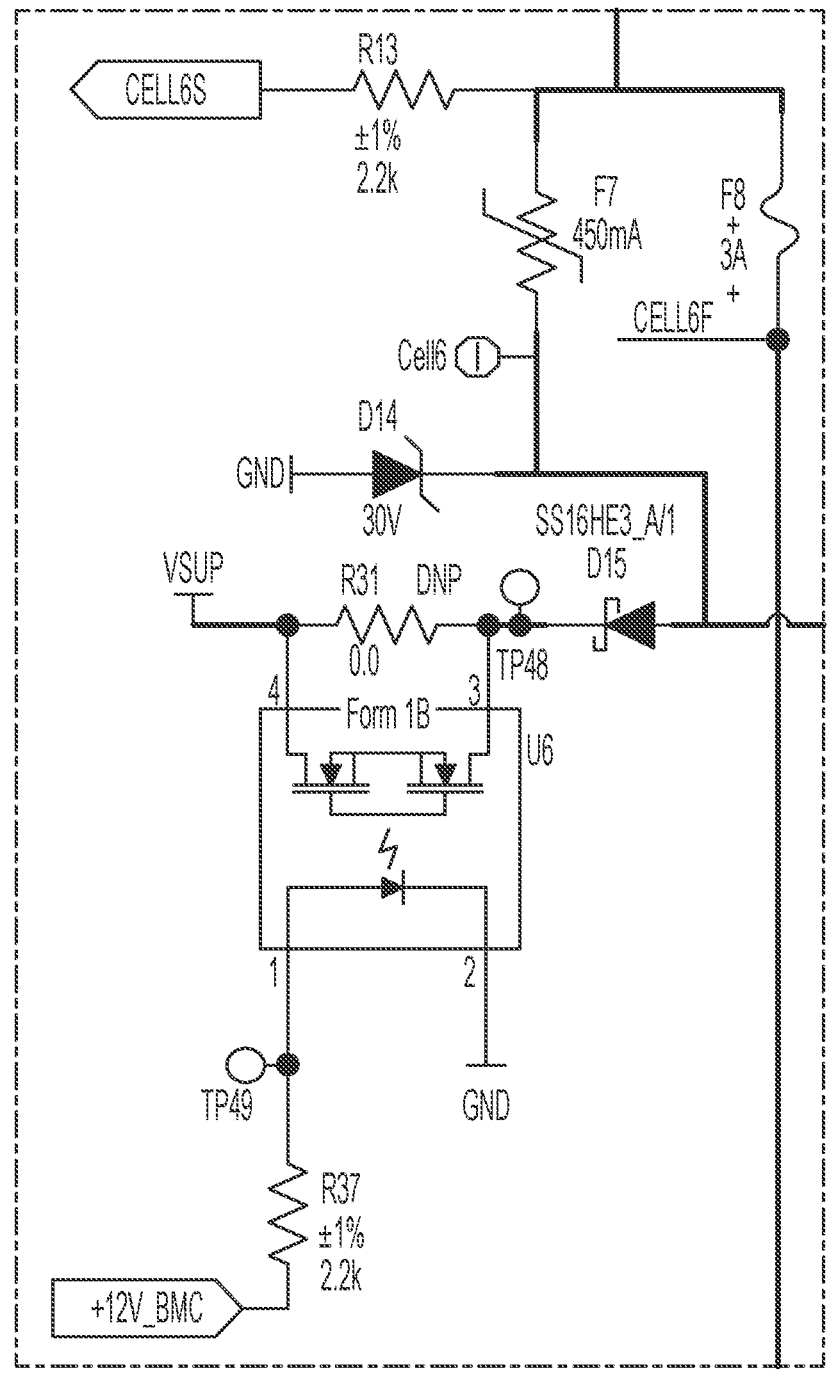
FIG. 36 is a schematic of an active and standby power supply switch over circuit.

In some embodiments, it may be desirable for a BMU to include a power supply switch over circuit to provide low operating power when the system is active while still allowing a low power sleep mode when the system is not active in a full power mode (e.g. 22V-25V nominal operating voltages). FIG. 36 depicts one embodiment of an active and standby power supply switch-over circuit. When the system is in standby or sleep, the +12V_BMC signal is not present. Absence of this signal in standby allows the normally closed (Form 1b) opto-isolated solid state relay (SSR) (U6) to source the full battery voltage to the VSUP to bias the BMUs sleep circuits. When the +12V_BMC signal is present in the active system state, the U6 SSR will have a small current flowing through the input opto diode, opening the SSR (pins 3 and 4) removing the full battery voltage from the BMU. D2 and D3 diodes on the BMU connect the +12V_BMC to the same VSUP BMU supply, this then allows the BMU circuits to be powered by this lower system voltage. This allows a lower power dissipation from the BMU circuitry when active.

Having described several different types of circuits for implementing protections for a cell module assembly and/or battery, several different types of protection methods for operating a cell module assembly and/or battery described in further detail below regards to FIGS. 37-40.

FIG. 37 illustrates one embodiment of a method for controlling the over voltage protection of a CMA or battery using an over voltage protection circuit such as that described above. In the depicted embodiment, any appropriate type of voltage sensing circuit may be used to sense a voltage of one or more cells of a cell module assembly and/or an overall voltage for a CMA at 101. In either case the detected voltage may be compared to a cell and/or CMA over voltage threshold at 103. If the sensed voltage is less than the over voltage threshold, normal operation of the CMA may continue. Alternatively, if the sensed voltage is greater than the over voltage threshold, a controller of the CMA may disable an associated charging circuit to prevent further charging of the CMA while one or more cells are at the sensed overvoltage, see 105. The associated controller may then continue to sense the voltage of the one or more cells and/or the CMA at 107. Once the sensed cell and/or CMA voltage is less than a reset voltage threshold, which is less than the over voltage threshold, the associated controller may re-enable the charging circuit to permit charging of the cells and/or CMA, at 109 and 111. For example, in one specific embodiment, voltage level sensing of individual cells may be done via sensing circuitry located on a BMU. If any of the individual cell voltages should exceed 4.225 volts, the ground return path of charging enable relays of a BMC may be opened to prevent charging of the CMA. Subsequently, when all the monitored cell voltages are reduced to below a reset voltage threshold of 3.8 volts, the BMC may re-energize the charging relays, thus enabling the associated charging circuit. While the over voltage protection described above uses individual cell voltages, in other embodiments, an average cell voltage is used.

FIG. 38 illustrates one embodiment of an undervoltage protection method. In the depicted embodiment, an appropriate voltage sensing circuit is used to monitor the voltage of one or more cells and/or a cell module assembly of a battery at 121. An associated controller may determine if the detected voltage is less than an under voltage threshold for the one or more cells and/or CMA at 122. If the detected voltage is less than the noted under voltage threshold, the associated controller may disable a charging circuit associated with the one or more cells and/or CMA at 125. The associated controller may then continue to sense the voltage of the one or more cells and/or the CMA at 127. Once the sensed cell and/or CMA voltage is greater than a reset voltage threshold, which is greater than the under voltage threshold, the associated controller may re-enable the charging circuit to permit charging of the cells and CMA, at 128 and 130. However, due to the charging circuit being disabled, this may involve manual charging, removal and replacement, and/or other appropriate maintenance of the one or more cells and/or CMA. In one such embodiment, a lithium ion battery may have an under voltage threshold of 2.5 V per cell and a reset voltage threshold of 3.1 V per cell. These thresholds may either be evaluated as an absolute voltage measurement for each cell and/or may they may be compared to the average voltage of the one or more cells by comparing the total CMA voltage to the expected voltage threshold for that number of cells (i.e. the CMA threshold is equal to the individual cell threshold multiplied by the number of cells located in series). For example, if seven cell blocks were arranged in series for a typical lithium ion battery this would result in an undervoltage protection system that disables charging if the CMA voltage falls below a total voltage of 15 V and then re-enables charging once the voltage is above about 22 V.

While particular voltage thresholds are noted above, it should be understood that different chemistries and different operating parameters may be used. Accordingly, different voltage thresholds than those noted above may also be used in certain embodiments.

Figures 39, 40:
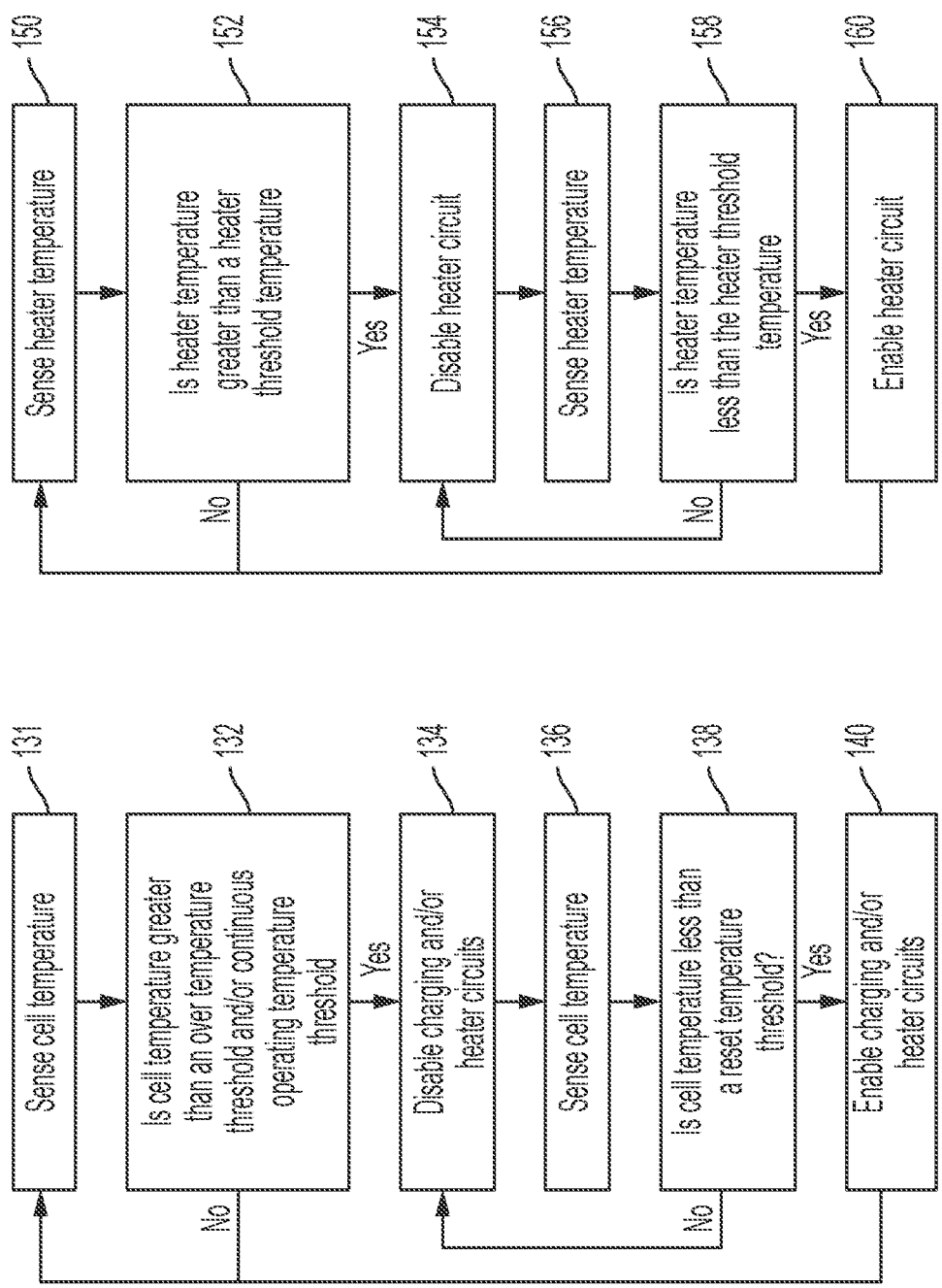
FIG. 39 is a flow diagram of one embodiment of a method for providing over temperature protection for a battery.
FIG. 40 is a flow diagram of one embodiment of a method for preventing excessive heater temperature.

In addition to the use of physical thermostats, it may be desirable to enable cell overtemperature protection using one or more control methods associated with a controller of a CMA and/or battery. For example, as shown in FIG. 39 one embodiment for a method of over temperature protection is depicted. In the depicted embodiment, one or more temperature sensors are used to detect the temperature of one or more cells of a CMA and/or battery at 131. Appropriate types of temperature sensors include, but are not limited to, thermistors, thermocouples, and other any other sensor capable of detecting a temperature of an object. In one particular embodiment, the temperature of one or more inner cells, such as those located towards a center of a CMA and/or battery, may be measured. Without wishing to be bound by theory, this may correspond to the highest measured temperature within a CMA and/or battery during operational cycling. However, it should be understood that other positions for measuring a temperature of cells within a CMA and/or battery may also be implemented.

At 132 the detected temperature of the one or more cells is compared to an over temperature threshold. If the detected temperature is less than the over temperature threshold, normal operation of the CMA and/or battery may continue. However, if the detected temperature is greater than the over temperature threshold and/or if the detected temperature is greater than a continuous operating temperature threshold, an associated controller may disable the heater and/or charging circuit for the system to avoid additional heat and/or energy from being input into the CMA and/or battery, see 134. For example, a solid state temperature sensing circuit may inhibit the charging enable relays of an associated charging circuit when the temperature exceeds an over temperature threshold. Once the charging and/or heater circuits have been disabled, the associated controller may continue to sense the one or more cell temperatures at 136 until the detected temperature has decreased to be less than a desired reset temperature threshold at 138. In some instances, the reset temperature threshold may be less than the over temperature threshold and continuous operating temperature threshold 136 and 138. Once the detected temperature is less than the reset temperature, the controller may re-enable the charging and/or heater circuits at 140.

Similar to the thermostat described above, the various thresholds may correspond to any appropriate temperature dependent on rated operating temperatures for the particular battery chemistry and/or application. However, in one embodiment, an over temperature threshold may be between or equal to 40° C. and 50°, and in some embodiments may be 45° C. or any other temperature corresponding to the maximum rated charging and/or operating temperature of a particular cell. Correspondingly, the system may have a continuous operating temperature threshold that is between or equal to 40° C. and 45° C. including, for example, 42° C. Additionally, the reset temperature threshold may be between about 35° C. and 45° C., and in one embodiment may be 40° C. In other embodiments, temperature thresholds and times both greater and less than those noted above are employed.

In some instances, a battery and/or CMA may be exposed to high operating and/or storage temperatures, after which it may be desirable to permanently disable operation of the CMA and/or battery. In such an embodiment, a BMU integrated with a CMA and/or a BMC associated with the overall battery may include one or more features that permanently disable an associated charging circuit when a temperature of the CMA and/or battery exceeds a maximum operating temperature threshold. While any appropriate method may be used, in one embodiment, a system may include a thermal cutoff fuse (TCO) configured to open and permanently disable operation of a charging circuit when exposed to temperatures above the maximum operating temperature threshold. Again while any appropriate maximum operating temperature may be used based on the particular application and cell type being used, in one embodiment, the maximum operating temperature threshold may be between or equal to about 70° C. and 80° C. including, for example, 72° C.

Similar to controlling the temperature of the one or more cells within a CMA and/or battery, in some embodiments, it may also be desirable to monitor and control the temperature of one or more heaters located within a CMA and/or battery to avoid applying excessive temperatures to the cells contained therein. For example, as shown in FIG. 40, at 150 one or more sensors may be used to monitor the temperature of one or more heaters. In one such embodiment, the same temperature sensors used to monitor the temperature of one or more cells may also be used to monitor the temperature of the heater either directly, or indirectly through calculation, look up tables, and/or any other appropriate method. Additionally, in some embodiments, a location of the one or more sensors may be selected to either directly measure, be correlated with, or otherwise permit measurement of a surface temperature of the one or more heaters. In either case, the detected heater temperature may be compared to a heater threshold temperature at 152. If the detected temperature is greater than the heater threshold temperature, a controller of the CMA and/or battery may disable a heater circuit at 154 to prevent additional heating of the heating elements. For example, in the BMU embodiment previously described above, two solid state switching elements, which may be connected in series with the ground return of the heater elements, may be opened to de-energize the internal heaters, though other type of control circuits may also be used. The controller may then continue to sense the heater temperature at 156. Once the sensed heater temperature is less than the heater threshold temperature at 158, the controller may re-enable the heater circuit at 160.

In the above embodiment, any appropriate heater threshold temperature may be used depending on the particular application and electrochemistry being used. However, in one embodiment, a heater threshold temperature may be between or equal to 40° C. and 50° C., including for example, 45° C. In other embodiments, temperature thresholds both greater and less than those noted above are used.

The above embodiments of various protection systems such as overcharge protection, over temperature protection, internal heater over temperature protection, undervoltage protection and battery overtemperature protection have been described as using a single circuit to provide the desired protection. However, in some embodiments, it may be desirable to include one or more redundancies to provide more reliable protection for a CMA and/or battery system. Accordingly, a controller including any one or more of the above noted protection systems may include two or more parallel sensing and control circuits. In such an embodiment, parameters measured by the two or more parallel sensing circuits' inputs may be processed separately and used to control two or more redundant control systems such as two or more solid state switching elements (e.g. switching relays) arranged in a series output configuration to control operation of a particular circuit and/or device. These redundant control systems may open their respective load circuits upon the detection of a fault condition acting on that particular circuit related to the fault and may remain open until such time as the fault condition is corrected as previously described. Thus, the use of redundant protection circuits may help to minimize the occurrence of a fault without the control system appropriately responding to the fault.

Figure 41:
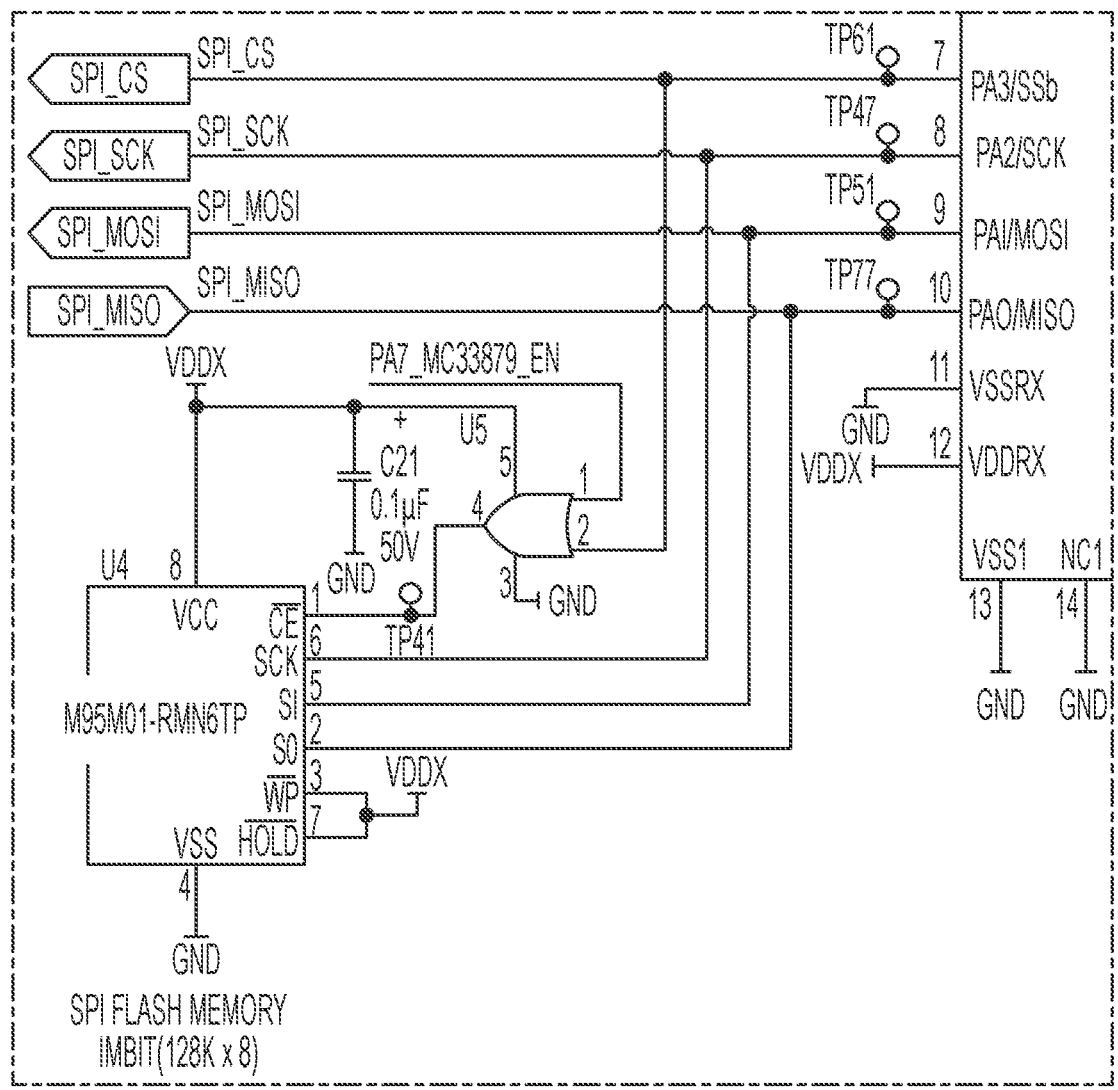
FIG. 41 is a schematic of an external Flash Memory used for more secure program bootloading.
Figure 42:
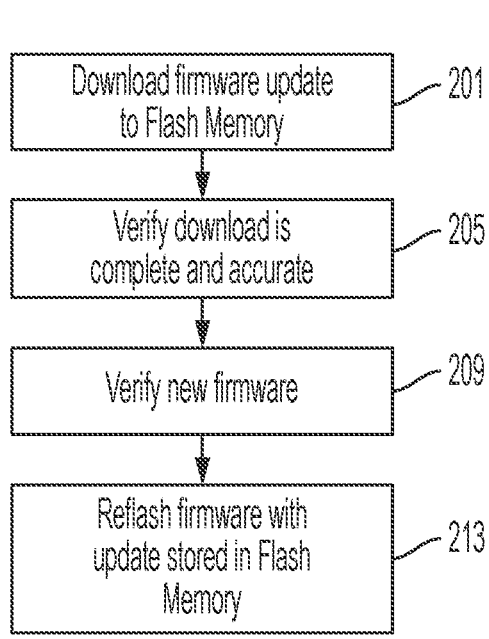
FIG. 42 is a flow diagram of one embodiment of a method of using an external flash memory for secure program bootloading.

In certain embodiments, a separate Flash Memory, such as a flash memory located externally to a desired controller, may be used to enable more secure program bootloading in the field. For example, when releasing firmware updates in the field, it may be desirable to not interrupt the re-flashing of a software update. If any disruption of the BMU system serial communications occurs during the re-flashing, the BMU may become unrecoverable. Referring to FIG. 42, with the Flash Memory, the updated firmware is first loaded into the flash memory at 201. The associated controller then verifies at 209 the accuracy and completeness of the firmware update located in the flash memory after serial communication has been completed at 205. Once the downloaded firmware update is verified at 209, a controller, such as an MCU, of the BMU may then use the firmware update located on the flash memory to re-flash itself at 213. FIG. 41 shows an embodiment of a battery pack including an separate Flash Memory used for a more secure program bootloading feature. The MM9Z1_638 (U7) MCU communicates with this external 128 k byte Flash Memory U4 via the industry standard Serial Peripheral Interface (SPI) bus. This SPI bus is also used to control the cell balancing Octal Power Switch (U2), so the OR gate (U5) is used to switch which peripheral the MCU controls. While an embodiment including a particular type of circuit and components has been illustrated, the above noted concept may be used with any appropriate circuit and for any desired application where a controller of a device re-flashes itself.

Without wishing to be bound by theory, the ability of an electrochemical cell to either provide (e.g. during discharge) or accept (e.g. during continuous charge or regenerative charging) a current may vary with the state of charge and temperature of the cell. For example, lower temperatures may lower the available current draw from a cell and/or the ability of the cell to charge at a given current. This may be due to the reduced mobility of charge carriers, such as ionic species (e.g. lithium ions within lithium ion batteries), within the electrolyte and their reduced ability to intercalate with the electrochemical materials at lower temperatures. Correspondingly, at higher temperatures more current may generally be available due to increased mobility of these charge carriers within the electrolyte and electrochemical materials of the cells. However, at temperatures approaching a continuous operating temperature threshold and/or maximum operating temperature threshold of an electrochemical cell, it may be desirable to reduce a maximum current during either charge and/or discharge to prevent excessive heating and/or damage to the cell. In addition to temperature considerations, larger current draws may be possible at higher states of charge for an electrochemical cell due to it being easier to extract charge carriers from the associated electroactive materials at these higher states of charge. Conversely, the ability to charge a cell may decrease with increasing states of charge due to it being more difficult to intercalate ions into the anode of an electrochemical device at higher states of charge. Thus, larger states of charge may be associated with correspondingly reduced charging currents.

Figure 43:
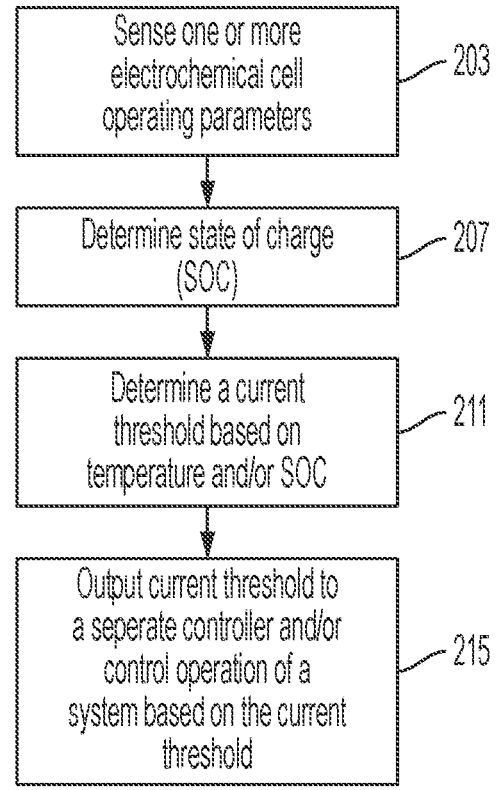
FIG. 43 is a flow diagram of one embodiment of a method for determining and using a current threshold for one or more electrochemical cells.

Due to the differences in the ability of an electrochemical cell to output or accept a desired current at different temperatures and/or states of charge, in some embodiments, it may be desirable to limit the current drawn from, or provided to, an electrochemical cell when exposed to different conditions to avoid unnecessary damage or degradation of the electrochemical cell. Accordingly, as depicted in FIG. 43, a controller, such as a BMC, BMU, and/or any other appropriate controller associated with one or more electrochemical cells, may sense a temperature of the one or more electrochemical cells at 203. The controller may then determine the state of charge (SOC) of the one or more electrochemical cells at 207 using an operating parameter related to SOC and/or charge counting methods using voltage and current measurements. In certain embodiments, however, a controller only uses one of the above noted states. At 211, the controller may then determine a current threshold based at least in part on the temperature and/or SOC of the one or more electrochemical cells. The current threshold may be determined using any appropriate method including, but not limited to, functional relationships, lookup tables, or any other appropriate method capable of determining a desired current threshold based on the operating conditions.

At 215 the controller associated with the one or more electrochemical cells may output a signal including the determined current threshold to a separate controller which may control a system the electrochemical cells are used to power. For example, the separate controller may correspond to a controller of a passenger vehicle, a motorcycle, a forklift, an airplane, or any other appropriate type of device including a battery. Depending on the particular application, the external controller may take one or more actions based on the current threshold. For example, the external controller may simply limit a current drawn from, or supplied to, the one or more electrochemical cells to be less than the determined current threshold. However, due to any number of reasons, including safety and/or performance concerns, in some embodiments, during at least some modes of operation the separate controller may not reduce a current to be less than the determined current thresholds in at least one mode of operation. For example, it may not be desirable to limit the available current during a vehicle acceleration, take off or landing of an aircraft, or other similar type performance or safety driven application. Instead, the external controller may permit the current to exceed the determined current threshold during one or modes of operation after which it may reduce the current to be less than the determined current thresholds. Alternatively, the external control may not control the current, and may instead simply output an indication to a user that the current has exceeded the determined current threshold and should be reduced to avoid damage to the one or more electrochemical cells (e.g. an indicator light, dial, text output, GUI output, or other indicator visible to a user during use).

Figure 44:
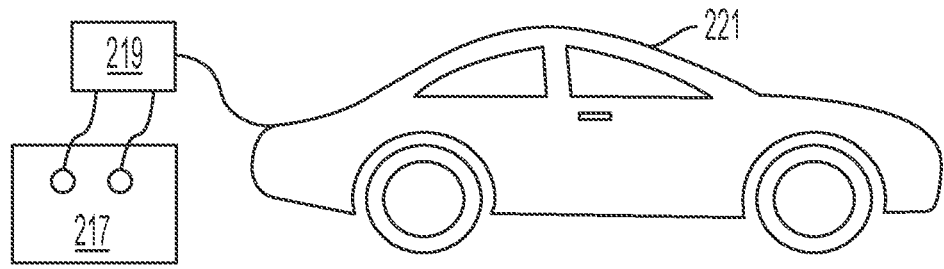
FIG. 44 is a schematic of a system including a power source with one or more electrochemical cells and a controller that determines a current threshold for the one or more electrochemical cells.

FIG. 44 illustrates one embodiment of a system that may implement the above described method. In the figure, one or more electrochemical cells are included in a power source 217 such as a battery and/or CMA. One or more sensors 244 output one or more detected signals related to one or more operating parameters of the one or more electrochemical cells to a controller 219, such as a BMC and/or BMU. While the detected signals may correspond to any appropriate parameter, in at least one embodiments the signals may include information related to voltage, current, temperature, and/or any other appropriate operating parameter of the electrochemical cells. In embodiments where a controller determines a state of charge of the one or more electrochemical cells, the controller may use any appropriate operating parameter or state of the electrochemical cells. For example, a controller may determine an SOC of the cells by using the detected parameters to estimate the state of charge (e.g. an estimated SOC based on measured cell voltage); tracking power into and out of the one or more electrochemical cells based on charge counting methods using voltage and current measurements; and/or using any other appropriate method of determining a state of charge of the one or more electrochemical cells. In either case, the controller 219 may be in electrical communication with an external controller of a system 221 such as the depicted vehicle in the figure. However, as noted above, the system 221 may correspond to any appropriate system or device including a battery.

In the above described embodiments, different modes of operation of the one or more electrochemical cells may have different threshold currents to avoid excessive damage or degradation to the one or more electrochemical cells. For example, an acceptable current applied during discharge may be larger than a corresponding acceptable current provided by an electrochemical cell during charge. Additionally, due to the intermittent and short-lived duration of regenerative charging (e.g. charging from electric braking of a vehicle), acceptable currents from regenerative charging may be larger than corresponding normal charging currents which are applied over a longer duration. Accordingly, a controller associated with the one or more electrochemical cells described above, may determine, and implement the use of, different current thresholds from one or more of a continuous charging operating mode, a regenerative charging operating mode, and/or a discharging operating mode. However, in certain embodiments a controller only determines and uses a single current threshold.

The above embodiments have been directed to determining a current threshold for one or more electrochemical cells. Accordingly, certain embodiments may utilize a single electrochemical cell used by itself, while certain embodiments comprise cell module assemblies and full batteries including a plurality of electrochemical cells.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone or any other suitable portable or fixed electronic device.

Also, a computing device may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Such computing devices may be interconnected by one or more networks in any suitable form, including as a local area network, a controller area network, or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosed embodiments may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Example: Current Versus Operating Condition

FIGS. 45-46 are tables that illustrate exemplary current thresholds during discharge, regenerative charging, and continuous charging for a battery operated at different temperatures and states of charge. The exemplary currents provided in the tables correspond to the current thresholds for a lithium ion CMA including seven cell blocks arranged in series with one another. Each cell block includes three electrochemical cells each with 26 Ahr capacities.

Referring to FIG. 45, during discharge, the current threshold increased with increasing temperature though the current threshold at lower states of charge decreased again as the continuous operating temperature and or maximum operating temperatures were approached at 50° C. Additionally, the current threshold for discharge increased with increasing state of charge as expected. Similarly, in FIGS. 46 and 47, the current threshold during regenerative and continuous charging initially increased with increasing temperature. However, with further increases in temperature, the permissible current threshold may be reduced as the continuous operating temperature is approached and/or set to 0 at the maximum operating temperature, which in this embodiment was at 50° C. However, in contrast to the discharge current thresholds, the permissible regenerative and continuous charging currents increased with decreasing state of charge due to it being easier to charge the one or more electrochemical cells at lower states of charge. As shown in the tables, the regenerative current thresholds may be less than, greater than, or approximately the same as the corresponding discharge current thresholds under the same operating conditions. However, the depicted continuous charging current thresholds were generally less than the corresponding regenerative charging and discharging current thresholds as shown in FIG. 47 though in certain embodiments only a single current threshold can be used for all operating modes.

While the above example provides particular current thresholds and relationships versus temperature and SOC, it should be understood that appropriate current thresholds for an electrochemical device will depend on the specific electrochemistry, application, cell capacity, number of cells, cell construction, and pack construction to name a few parameters. Therefore, it should be understood that the above numbers have been provided simply as an example and in other embodiments, current thresholds different from the specifically disclosed current thresholds above may be employed. Further, the currently disclosed methods may be applied to the control and use of any number of different electrochemical devices.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:
1. A battery pack comprising:
a housing;
a plurality of electrochemical cells mounted within the housing;

an encapsulant flow path extending from a first portion of the battery pack to a second portion of the battery pack; and a tray having a plurality of raised support surfaces, each raised support surface having an uppermost surface that is in contact with and supports at least one of the plurality of electrochemical cells, and one or more gaps located between the plurality of raised support surfaces;

wherein the encapsulant flow path is aligned with at least one groove formed in the tray, the at least one groove having a total area and extending below the uppermost surface of the raised support surface;

wherein a total area of the uppermost surface is greater than the total area of the at least one groove; and wherein the at least one groove and the one or more gaps are all configured to receive encapsulant from the encapsulant flow path.

2. The battery pack of claim 1, wherein the flow path extends between an upper surface of the electrochemical cells and a lower opposing surface of the electrochemical cells.

3. The battery pack of claim 1, wherein the one or more gaps extend in a direction that is substantially orthogonal to the at least one groove.

4. The battery pack of claim 1, further comprising the encapsulant at least partially encapsulating the plurality of electrochemical cells and filling the encapsulant flow path, the at least one groove and the one or more gaps.

5. The battery pack of claim 1, wherein the plurality of electrochemical cells are disposed on the tray.

6. The battery pack of claim 1, wherein the plurality of electrochemical cells form a stack having an outer surface, a bottom edge and a top edge.

7. The battery pack of claim 6, further comprising the encapsulant fully encapsulating the outer surface of the stack of electrochemical cells.

* * * * *